(12) United States Patent
Ober et al.

(10) Patent No.: US 7,887,926 B2
(45) Date of Patent: Feb. 15, 2011

(54) TRIBLOCK POLYMERS AND POLYMER COATINGS

(75) Inventors: Christopher K. Ober, Ithaca, NY (US);
Craig Jonathan Weinman, Mesa, AZ (US); Daewon Park, Pittsburgh, PA (US); Dale L. Handlin, Shelby, NC (US); Carl Lesley Willis, Houston, TX (US)

(73) Assignees: Cornell University, Ithaca, NY (US); Kraton Polymers, Houston, TX (US)

( * ) Notice: Subject to any disclaimer, the term of this patent is extended or adjusted under 35 U.S.C. 154(b) by 155 days.

(21) Appl. No.: 12/397,976

(22) Filed: Mar. 4, 2009

(65) Prior Publication Data

US 2009/0232764 A1    Sep. 17, 2009

Related U.S. Application Data

(60) Provisional application No. 61/033,664, filed on Mar. 4, 2008.

(51) Int. Cl.
*B32B 27/32* (2006.01)
*B32B 9/04* (2006.01)
*A61K 31/74* (2006.01)
*C08F 8/00* (2006.01)
*C08F 210/02* (2006.01)

(52) U.S. Cl. ............ 428/523; 428/411.1; 428/421; 428/447; 424/78.09; 525/326.1; 525/331.9; 525/332.8; 525/332.9; 525/342; 525/383; 525/384

(58) Field of Classification Search ............ 424/78.09; 428/411.1, 421, 446, 447, 523; 525/242, 525/313, 314, 319, 324, 326.1, 331.9, 332.8, 525/332.9, 333.3, 342, 383, 384, 387, 355, 525/359.1, 359.3, 385, 50, 55, 333.1, 93
See application file for complete search history.

(56) References Cited

U.S. PATENT DOCUMENTS

| | | | |
|---|---|---|---|
| 5,096,973 A | 3/1992 | Herrmann et al. | |
| 5,262,496 A | 11/1993 | Bening et al. | |
| 5,393,841 A * | 2/1995 | Himes et al. | 525/314 |
| 5,639,830 A | 6/1997 | Hoxmeier | |
| 5,750,622 A * | 5/1998 | Himes | 525/92 D |
| 5,756,580 A | 5/1998 | Natori et al. | |
| 5,830,965 A | 11/1998 | Imaizumi et al. | |
| 5,907,017 A | 5/1999 | Ober et al. | |
| 6,114,467 A | 9/2000 | Ober et al. | |
| 6,265,486 B1 | 7/2001 | Shaffer et al. | |
| 6,489,367 B1 | 12/2002 | Meinert | |
| 6,750,296 B2 | 6/2004 | Ober et al. | |
| 6,903,173 B2 | 6/2005 | Cernohous | |
| 2002/0161147 A1 | 10/2002 | Ober et al. | |
| 2005/0214379 A1 | 9/2005 | Mecozzi et al. | |
| 2006/0083854 A1 | 4/2006 | Ober et al. | |
| 2007/0053867 A1 | 3/2007 | Ober et al. | |
| 2007/0106040 A1 | 5/2007 | Ober et al. | |
| 2007/0154431 A1 | 7/2007 | Nagai et al. | |
| 2007/0191814 A1 | 8/2007 | Chen et al. | |
| 2007/0299195 A1 | 12/2007 | de Keyzer et al. | |
| 2008/0194500 A1 | 8/2008 | Mecozzi et al. | |

FOREIGN PATENT DOCUMENTS

| | | |
|---|---|---|
| EP | 0027606 A1 | 4/1981 |
| EP | 0328774 B1 | 10/1993 |
| WO | WO-00/42084 A1 | 7/2000 |
| WO | WO-01/31404 A1 | 5/2001 |
| WO | WO-02/066530 A1 | 8/2002 |
| WO | WO-2005/067517 A2 | 7/2005 |
| WO | WO-2007/039435 A1 | 4/2007 |
| WO | WO-2007/075244 A1 | 7/2007 |
| WO | WO-2008/015136 A1 | 2/2008 |
| WO | WO-2009/111023 A2 | 9/2009 |

OTHER PUBLICATIONS

"International Application Serial No. PCT/US2009/001373, International Search Report mailed Oct. 29, 2009", 3 pgs.
"International Application Serial No. PCT/US2009/001373, Written Opinion mailed Oct. 29, 2009", 3 pgs.
Epps, T. H, et al., "Phase Behavior and Block Sequence Effects in Lithium Perchlorate-Doped Poly(isoprene-b-styrene-b-ethylene oxide) and Poly(styrene-b-isoprene-b-ethylene oxide) Triblock Copolymers", *Macromolecules*, 36(8), (Mar. 2003), 2873-2881.
Finlay, J. A., et al., "Settlement of Ulva Zoospores on Patterned Fluorinated and PEGylated Monolayer Surfaces", *Langmuir*, 24(2), (2008), 503-510.

* cited by examiner

*Primary Examiner*—Irina S. Zemel
*Assistant Examiner*—Jeffrey Lenihan
(74) *Attorney, Agent, or Firm*—Schwegman, Lundberg & Woessner, P.A.

(57) ABSTRACT

The invention provides novel polymers, including triblock polymers, as well as methods of preparing the polymers, and compositions that include such polymers. The polymers can include at least three blocks, the first block that includes poly(styrene), the second block that includes a random arrangement of poly(ethylene) and poly(butylene), and a third block that includes functionalized poly(isoprene). Units of the functionalized poly(isoprene) block can include hydroxyl groups and one or more ether linked side chains comprising $R^1$, $R^2$, $R^3$, $R^4$, $R^5$, $R^6$, as defined herein, or a combination thereof. The polymers can be used to provide antifouling coatings, for example, for marine ship hulls.

21 Claims, 14 Drawing Sheets

US 7,887,926 B2

TRIBLOCK POLYMERS AND POLYMER COATINGS

RELATED APPLICATIONS

This application claims priority under 35 U.S.C. §119(e) to U.S. Provisional Patent Application No. 61/033,664, filed Mar. 4, 2008, which application is incorporated herein by reference in its entirety.

GOVERNMENT SUPPORT

This invention was made with Government support under Grant Number WP-1454 awarded by the Strategic Environmental Research and Development Program (SERDP) of the United States Department of Defense and Grant Number N00014-02-1-0170 awarded by the Office of Naval Research (ONR). The United States Government has certain rights in this invention.

BACKGROUND OF THE INVENTION

Marine biofouling is the build up of microbial slimes, plants and animals on any surface immersed in seawater. Biofouling adds to the operational costs of shipping throughout the world. The additional drag on marine vessels caused by biofouling significantly increases operating and maintenance costs. For example, biofouling can raise fuel consumption by as much as 30%. Because many traditional antifouling coatings containing metal-derived biocides have been linked to harmful effects on non-target organisms, environmentally friendly alternatives are being sought.

Antifouling paints containing tin and copper biocides are currently used because they are effective against most forms of marine fouling. Many of these biocidal organometallic compounds are environmentally persistent. They can cause damage to the ecosystem and enter the food chain. Most countries around the world are adopting measures to limit or ban the presence of tributyltin antifoulants on vessel hulls, and copper-based coatings are expected to face similar restrictions in the near future.

Non-toxic "fouling-release" or "fouling-repellant" coatings are one class of alternatives to biocidal coatings. Silicone-based paints are commercially available, but may not satisfy many desired performance characteristics. The soft silicones, as well as many other commercially available coating systems, lack the toughness required to withstand the rigorous demands of the marine environment, do not sufficiently and consistently self-clean, or, due to polymer restructuring or other degradation pathways, lose many of the desirable surface properties with time and exposure to marine organisms.

Accordingly, materials that lower the strength of adhesion between fouling organisms and a surface, for example, a marine surface, are currently sought by governments and industries involved in shipping. A surface that is resistant to marine biofouling, for example, fouling by marine organisms such as zoospores and diatoms (unicellular algae), is also sought. The diversity of fouling organisms and environmental conditions worldwide makes developing a coating that resists fouling a challenging task. Thus, novel non-toxic solutions to the problems of biofouling are needed.

SUMMARY

Amphiphilic marine antifouling/fouling-release coatings have been developed by chemical modification of triblock copolymers. Polystyrene-block-poly(ethylene-ran-butylene)-block-polyisoprene ABC triblock copolymers were modified by functionalizing the polyisoprene block with various side chains, such as hydrophilic PEG550, hydrophobic F10H10, and amphiphilic ethoxylated fluoroalkyl side chains. The resultant polymers can be used to form a multilayer coating comprising one or more of 1) a substrate, for example, steel; 2) a primer, for example, epoxy; 3) a functional block polymer layer selected to adhere to the primer, for example, a maleated block copolymer; 4) a thick, tough elastomeric layer, for example, a polystyrene-poly(ethylene-ran-butylene)-block-polystyrene; and 5) a thin layer of a side chain functional surface active block copolymer as described herein.

The invention provides the novel polymers described herein, methods of preparing the polymers, and compositions that include the polymers. The polymers can be used to form antifouling coatings.

In an aspect, a polymer includes at least three blocks, the first block including poly(styrene), the second block including a random arrangement of poly(ethylene) and poly(butylene), and a third block including functionalized poly(isoprene). The repeating units of the functionalized poly(isoprene) block can include hydroxyl groups and one or more ether linked side chains comprising $R^1$, $R^2$, $R^3$, $R^4$, $R^5$, $R^6$, or a combination thereof. $R^1$ may be $-(OCH_2CH_2)_nOCH_3$ with each n independently being 8-16. $R^2$ may be $-O(CH_2)_x(CF_2)_yF$ with each x and y are independently 2-12; $R^3$ may be $-(OCH_2CH_2)_q(CF_2CF_2)_rF$ with each q being independently 1 to about 25 and each r is independently 0 to about 18; $R^4$ may be $-(OCH_2OCH_2)_nOC_6H_4(CH_2)_nCH_3$ with each n being independently 6-16; $R^5$ may be $-(OCH_2OCH_2)_n(CH_2)_nCH_3$ with each n being independently 8-16; and/or $R^6$ may be $-(OCH_2OCH_2)_n(CH_2)_3Si(CH_3)(OSi(CH_3)_3)_2$ with each n being independently 8-16.

In one embodiment, the poly(styrene) block of the polymers described herein can have a molecular weight of about 4,000 to about 12,000, the poly(ethylene) random poly(butylene) block can have a molecular weight of about 15,000 to about 50,000, and the functionalized poly(isoprene) block can have derived from a poly(isoprene) block of a molecular weight of about 5,000 to about 25,000. The molecular weights can be average weight molecular weight.

In another embodiment, the one or more ether linked side chains have at least $R^1$ and $R^2$, and at least about 5% of the repeating units of the functionalized poly(isoprene) block have $R^1$ side chains and at least about 3% of the repeating units of the functionalized poly(isoprene) block have $R^2$ side chains.

In yet another embodiment, the one or more ether linked side chains have at least $R^1$, and n of $R^1$ is about 12. In another embodiment, the one or more ether linked side chains have at least $R^2$, and each x and each y of $R^2$ are about 10. In another embodiment, the one or more ether linked side chains have at least $R^2$, and each x and each y of $R^2$ are independently about 2, 4, 6, 8, or 10. In an another embodiment, the one or more ether linked side chains have at least $R^3$, and each q and each r of $R^3$ are about 3 to about 15. In a further embodiment, the one or more ether linked side chains have at least $R^4$, $R^5$, and $R^6$, and each n of $R^4$ is about 7 to about 10; each n of $R^5$ is about 10 to about 15; and each n of $R^6$ is about 10.

In one embodiment, about 5% to about 40% of the repeating units of the functionalized poly(isoprene) block have $R^1$ side chains. In another embodiment, about 3% to about 60% of the repeating units of the functionalized poly(isoprene) block have $R^2$ side chains.

In one embodiment, the one or more ether linked side chains have at least $R^1$ and $R^2$, and the functionalized poly (isoprene) block has a higher percentage of $R^1$ side chains than $R^2$ side chains, and the coating promotes release of *Ulva* sporelings from the coating in a marine environment. In another embodiment, the one or more ether linked side chains have at least $R^1$ and $R^2$, and the functionalized poly(isoprene)

block is derived from a poly(isoprene) block of a molecular weight of about 8,000 to about 22,000, the functionalized poly(isoprene) block has a higher percentage of $R^1$ side chains than $R^2$ side chains, and the coating resists settlement of *Ulva* spores to a greater extent than poly(dimethylsiloxane) coatings.

In a further embodiment, the one or more ether linked side chains have at least $R^1$ and $R^2$, and the functionalized poly(isoprene) block has a higher percentage of $R^2$ side chains than $R^1$ side chains, and the coating promotes detachment of *Navicula* diatoms from the coating in a marine environment. In another embodiment, an antifouling coating having a polymer described above results in less barnacle cyprid larvae settlement than poly(styrene-ethylene-butylene-styrene) polymer surfaces or poly(dimethylsiloxane) surfaces in a marine environment.

In another aspect, the invention also provides a polymer comprising formula I:

various embodiments, at least 1% of $R^a$ and $R^b$ groups, combined, are $R^1$, $R^2$, $R^3$, $R^4$, $R^5$, $R^6$, or a combination thereof. In other embodiments, at least about 2%, about 3%, about 4%, or about 5% of $R^a$ and $R^b$ groups, combined, are one or more of $R^1$, $R^2$, $R^3$, $R^4$, $R^5$, and $R^6$.

In another aspect, the invention provides a polymer including at least three blocks, the first block including poly(styrene), the second block including a random arrangement of poly(ethylene) and poly(butylene), and a third block including functionalized poly(isoprene), with repeating units of the functionalized poly(isoprene) block including hydroxyl groups and ether linked side chains $R^1$ and $R^2$. $R^1$ is —$(OCH_2CH_2)_nOCH_3$ with each n being independently 8-16, and $R^2$ is —$O(CH_2)_x(CF_2)_yF$ with each x and y being independently 4-12. In some embodiments, the one or more ether

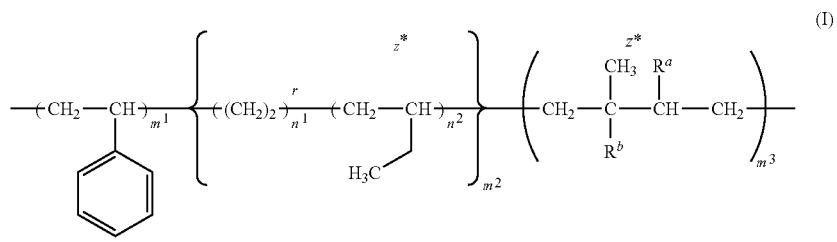

(I)

wherein $m^1$ is about 50 to about 120;

$n^1$ and $n^2$ are selected so that block $m^2$ has a molecular weight of about 15,000 to about 50,000;

$m^3$ is about 75 to about 375;

r indicates that the arrangement of individual n and n units within block $m^2$ is random;

linked side chains include at least $R^1$ and $R^2$ and at least about 5% of the repeating units of the functionalized poly(isoprene) block have $R^1$ side chains and at least about 3% of the repeating units of the functionalized poly(isoprene) block have $R^2$ side chains.

In another aspect, the invention provides a polymer comprising formula II:

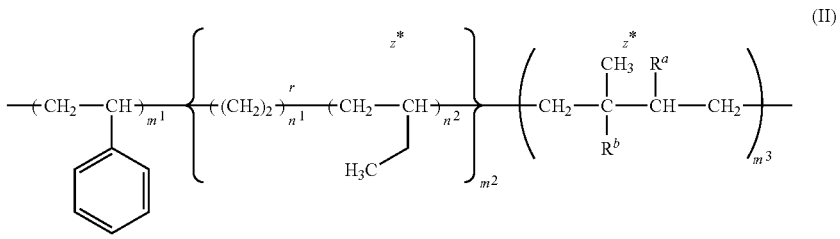

(II)

z* indicates that the arrangement of individual $n^2$ units and $m^3$ units is reversible such that the ethyl side group may reside on either carbon of the $n^2$ unit, and $R^a$ may reside on either of the internal carbons of the $m^3$ unit;

in each individual subunit $m^3$, one of $R^a$ and $R^b$ is —OH and the other is $R^1$, $R^2$, $R^3$, $R^4$, $R^5$, $R^6$, H, or OH; where $R^1$, $R^2$, $R^3$, $R^4$, $R^5$, and $R^6$ are as defined above. At least some of $R^a$ and $R^b$ is one or more of $R^1$, $R^2$, $R^3$, $R^4$, $R^5$, and $R^6$. In with $m^1$ being about 50 to about 120. $n^1$ and $n^2$ are selected so that block $m^2$ has a molecular weight of about 15,000 to about 50,000. $m^3$ is about 75 to about 375. r indicates that the arrangement of individual $n^1$ and $n^2$ units within block $m^2$ is random. z* indicates that the arrangement of individual $n^2$ units and $m^3$ units is reversible such that the ethyl side group may reside on either carbon of the $n^2$ unit, and $R^a$ may reside on either of the internal carbons of the $m^3$ unit. In each individual subunit $m^3$, one of $R^a$ and $R^b$ is —OH and the other is $R^1$, $R^2$, H, or OH. $R^1$ is —$(OCH_2CH_2)_nOCH_3$ where n is 8-16, and $R^2$ is —$O(CH_2)_x(CF_2)_yF$ where x and y are each independently 4-12. In some embodiments, the one or more ether linked side chains comprise at least $R^1$ and $R^2$, and at least about 5% of $m^3$ is units have $R^1$ side chains and at least about 3% of $m^3$ units have $R^2$ side chains.

In an aspect, the invention also provides a polymer including at least three blocks, the first block including poly(styrene), the second block including a random arrangement of poly(ethylene) and poly(butylene), and a third block including functionalized poly(isoprene). Repeating units of the functionalized poly(isoprene) block include hydroxyl groups and ether linked side chains $R^3$. $R^3$ is —$(OCH_2CH_2)_q(CF_2CF_2)_rF$ where each q is independently 1 to about 25 and each r is independently 1 to about 18. At least about 3% of the repeating units of the functionalized poly(isoprene) block have $R^3$ side chains.

In another aspect, the invention provides a polymer comprising formula III:

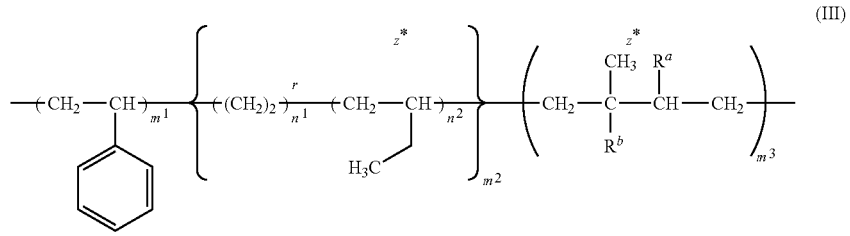

(III)

with $m^1$ being about 50 to about 120. $n^1$ and $n^2$ are selected so that block m/z has a molecular weight of about 20,000 to about 30,000; $m^3$ is about 75 to about 375. r indicates that the arrangement of individual $n^1$ and $n^2$ units within block $m^2$ is random. z* indicates that the arrangement of individual $n^2$ units and $m^3$ units is reversible such that the ethyl side group may reside on either carbon of the $n^2$ unit, and $R^a$ may reside on either of the internal carbons of the $m^3$ unit. In each individual subunit $m^3$, one of $R^a$ and $R^b$ is —OH and the other is $R^3$, H, or OH. $R^3$ is —$(OCH_2CH_2)_q(CF_2CF_2)_rF$ with each q being independently 1 to about 25 and each r is independently 1 to about 18. At least about 3% of $m^3$ is units have $R^3$ side chains.

In an aspect, the invention includes an antifouling coating including a surface layer including any one of the polymers described above, and a base layer including a thermoplastic elastomeric polymer, for example, an elastomeric polymer having a Young's modulus of less than about 5 MPa. Additionally, the polymers described herein, such as those defined above, can be used to provide antifouling coatings. The coatings can be monolayer, bilayer, or multilayer coatings. The coating can include a surface layer of a polymer of the invention and a base layer that is a thermoplastic elastomeric polymer, and optionally other layers or adhesives, for example, to adhere the base layer to the surface to be protected from fouling. The antifouling coatings can exhibit antifouling properties toward marine organisms such as marine algae, algal spores or sporelings, bacterial cells, diatoms, protozoa, barnacles, or combinations thereof, for example, when the coating is in a marine environment.

BRIEF DESCRIPTION OF THE DRAWINGS

The following drawings form part of the specification and are included to further describe various aspects or properties of certain embodiments of the invention.

For FIGS. 1-8, the line and bar labels refer to the corresponding polymers described in Table 1-1 of Example 1.

For FIGS. 10-14, K3A, K3F, and K3P refer to amphiphilic, fluorinated, and pegylated PS-b-P(E/B)-b-PI triblock polymers, respectively, with a 10K isoprene block. K4A refers to an amphiphilic PS-b-P(E/B)-b-PI triblock polymer with the 20K isoprene block. Each of these polymers is described in Example 3.

Figure 10:
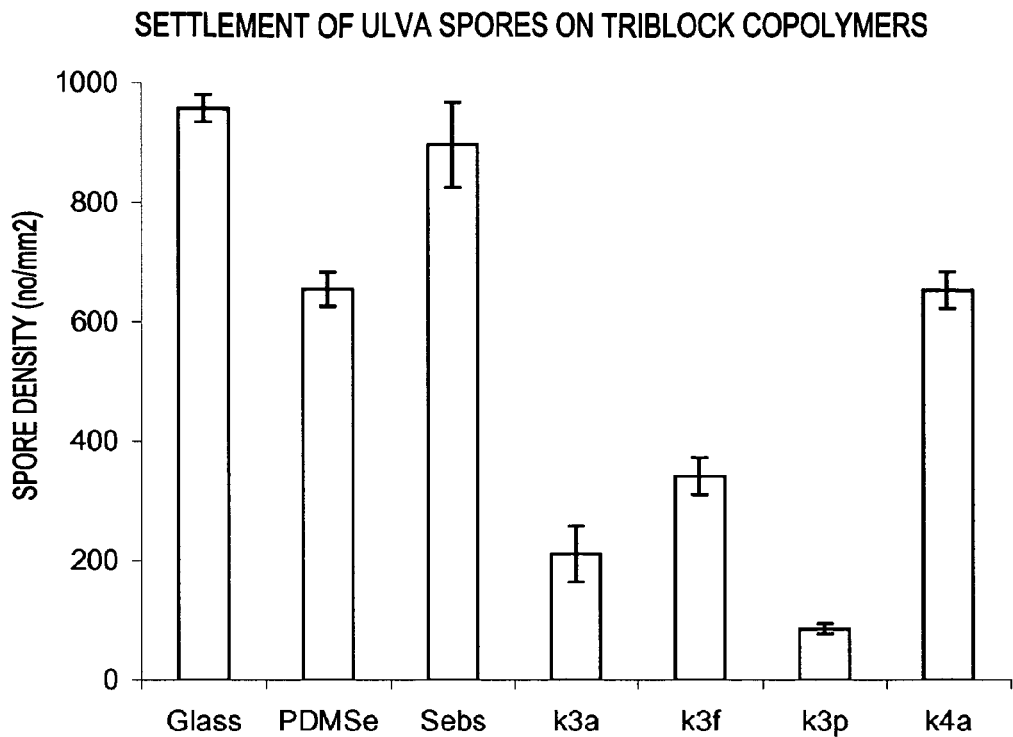

FIG. 10 illustrates the settlement of Ulva spores on surface active triblock copolymer coatings. Each point is the mean from 90 counts on 3 replicate slides. Bars show 95% confidence limits.

Figure 11:
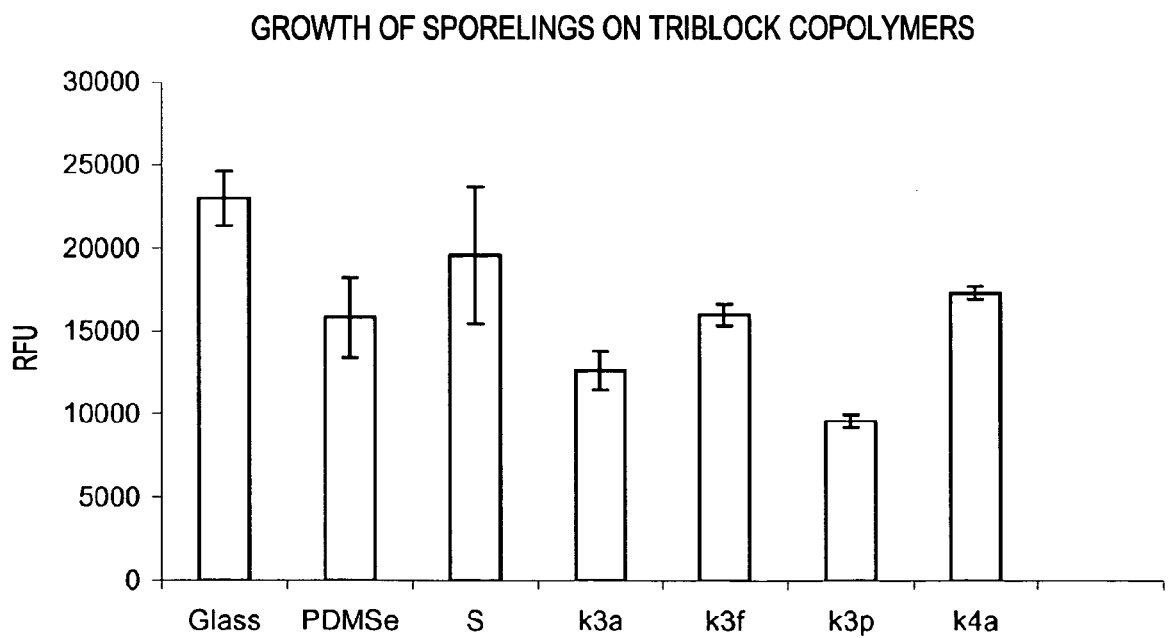

FIG. 11 illustrates the growth of Ulva sporelings on surface active triblock copolymer coatings after 7 days. Each point is the mean biomass from 6 replicate slides measured using a fluorescence plate reader (RFU; relative fluorescence unit). Bars show standard error of the mean.

Figure 12:
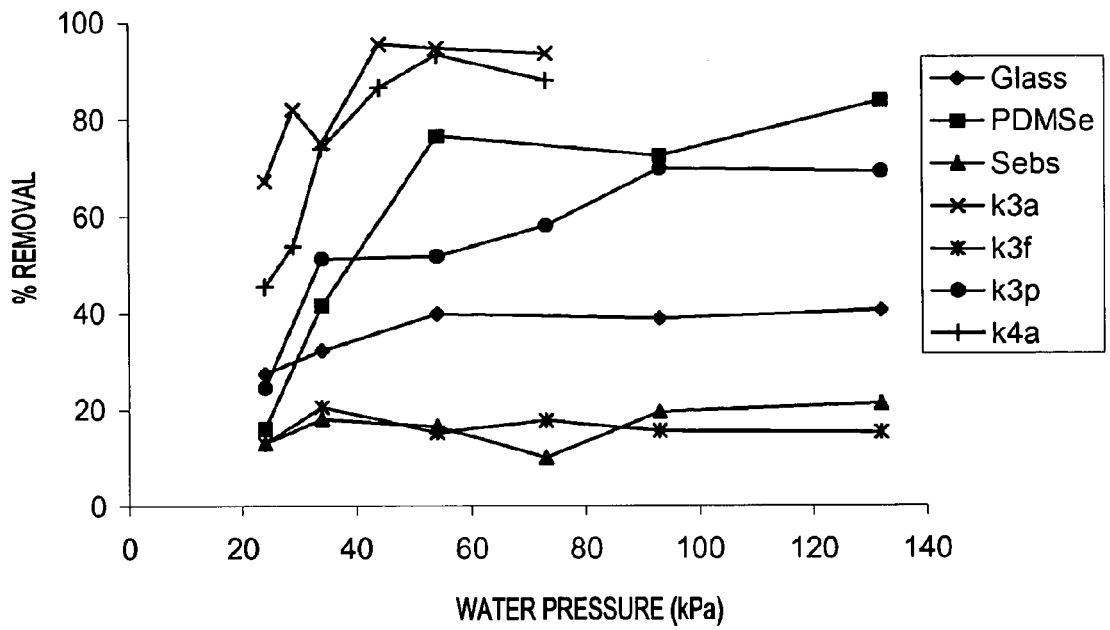

FIG. 12 illustrates the detachment of Ulva sporelings from surface active triblock copolymer coatings. Slides were exposed to the water jet over a range of water pressures. One slide was used at each pressure.

Figure 13:
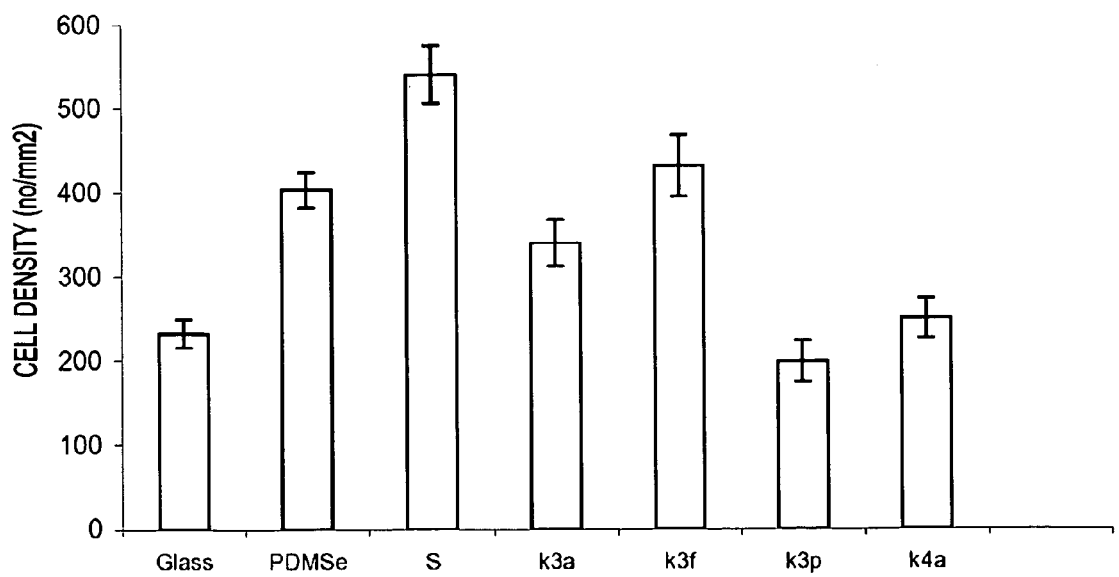

FIG. 13 illustrates the initial attachment after gentle washing of Navicula to surface active triblock copolymers. Each point is the mean from 90 counts on 3 replicate slides. Bars show 95% confidence limits. The label S refers to a SEBs base coating.

Figure 14:
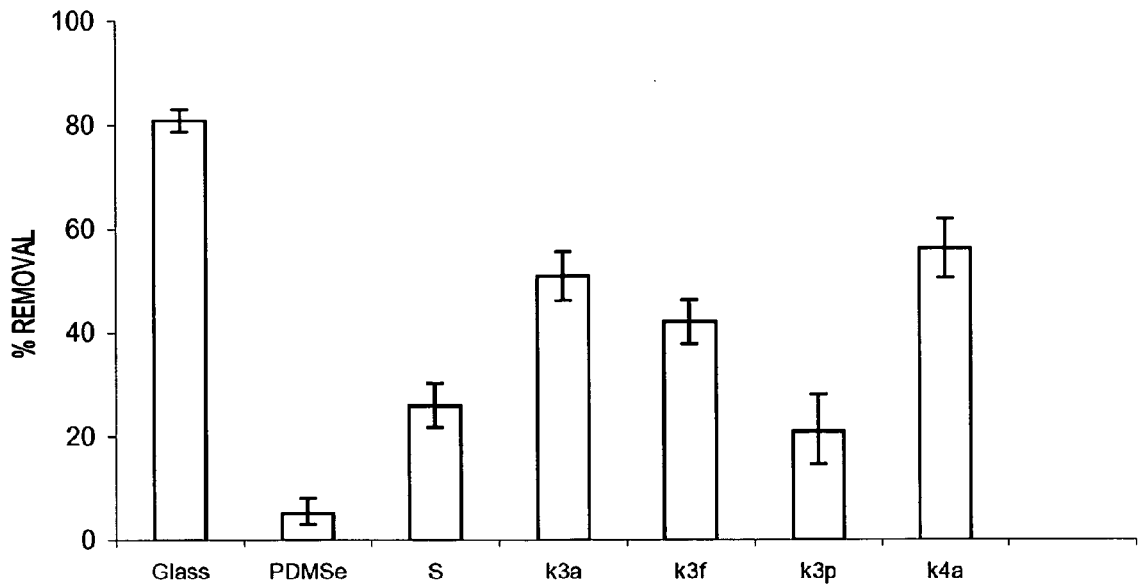

FIG. 14 illustrates detachment of Navicula from surface active triblock copolymers. Each point represents the mean percentage removal from 90 counts from 3 replicate slides. Bars represent 95% confidence limits derived from arcsine transformed data.

For FIGS. 15-22, the line and bar labels refer to the corresponding polymers described in Table 3-4 of Example 3.

Figure 15:
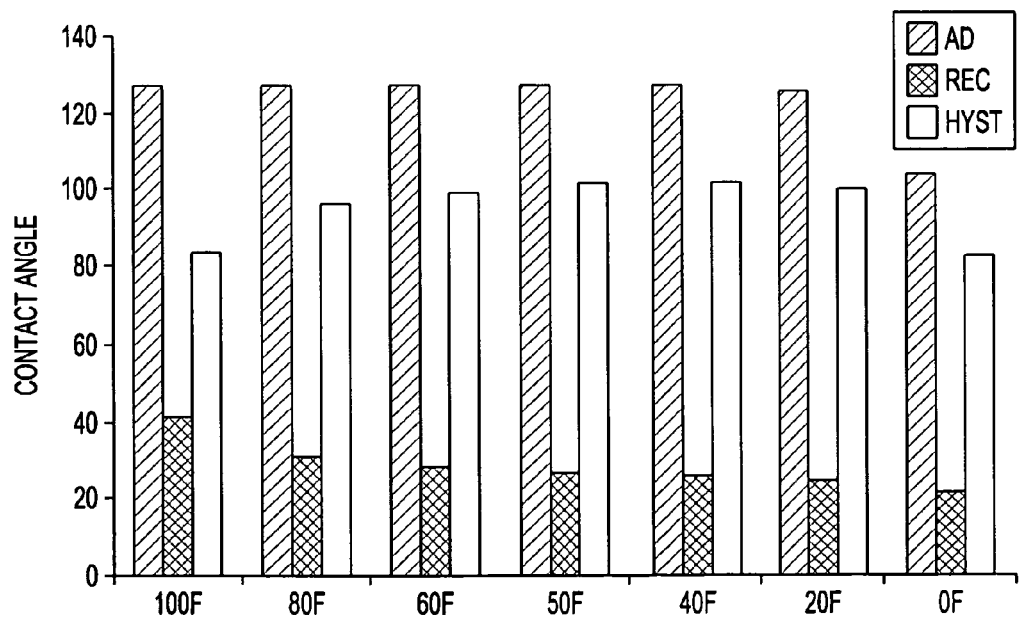
Figure 18:
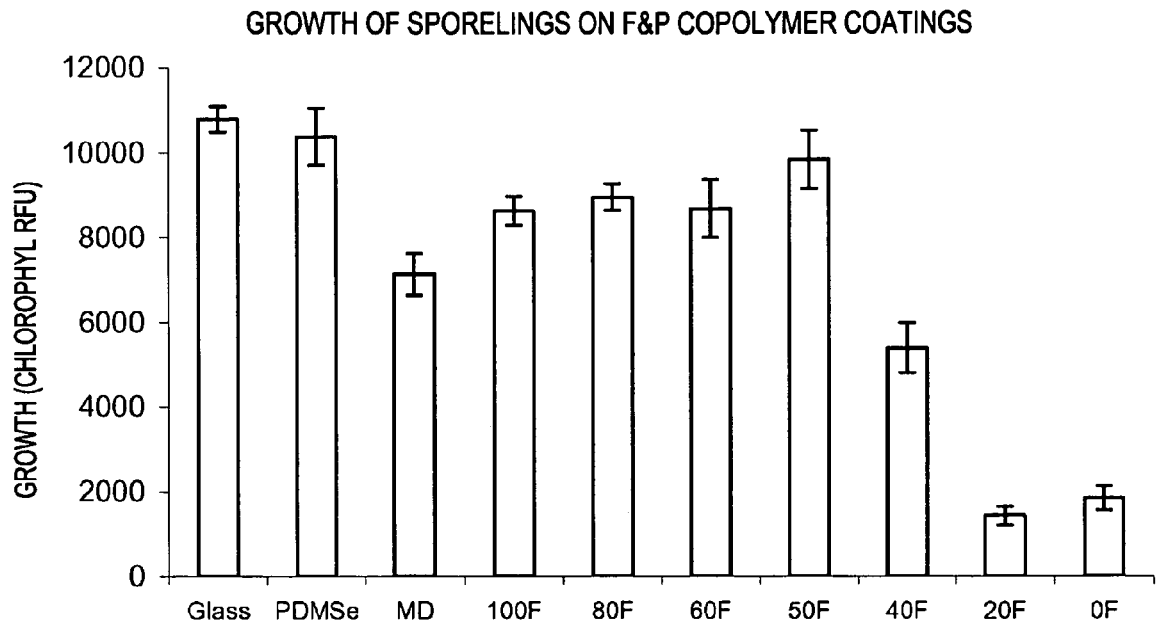
Figure 19:
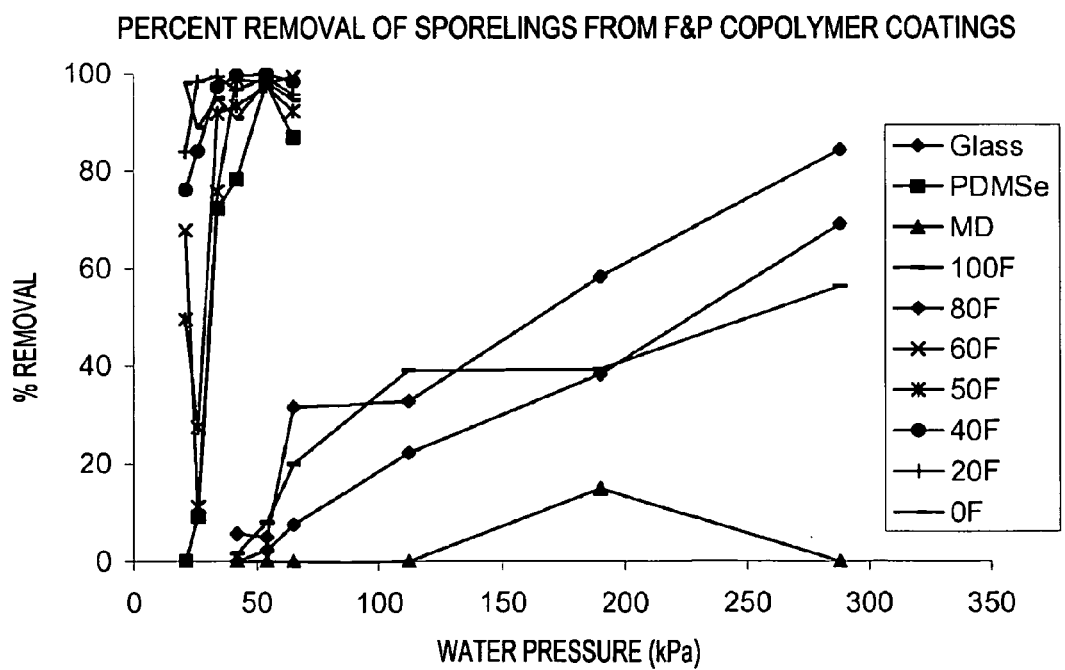
Figure 20:
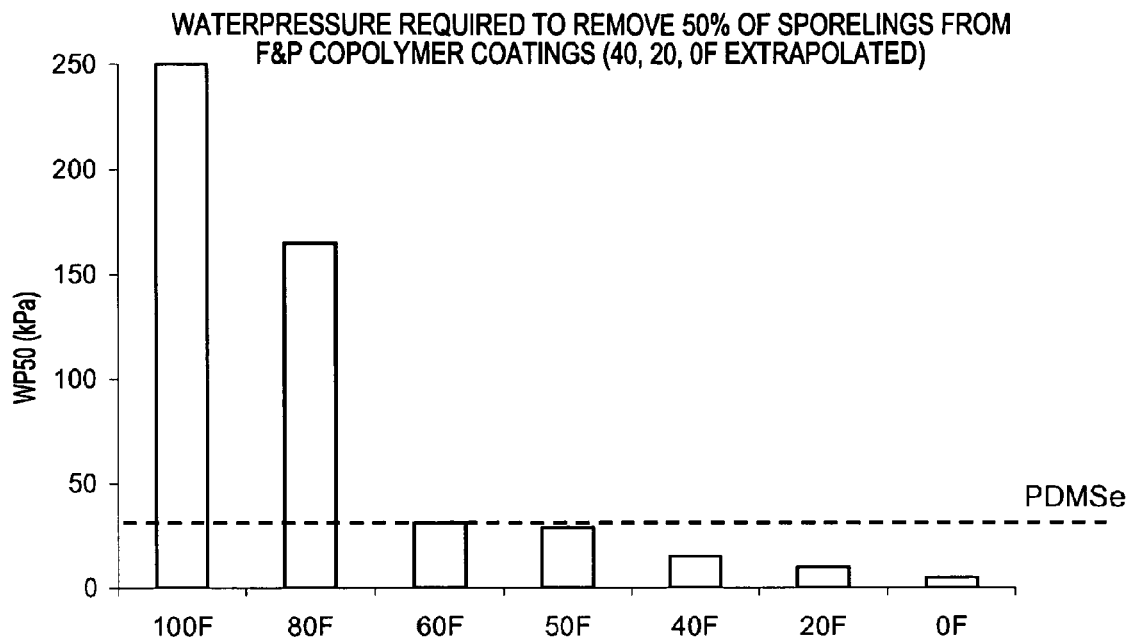

FIG. 15 illustrates contact angles for sprayed coatings of Table 4-5; data was plotted to allow comparison with FIGS. 18-20

Figure 16:
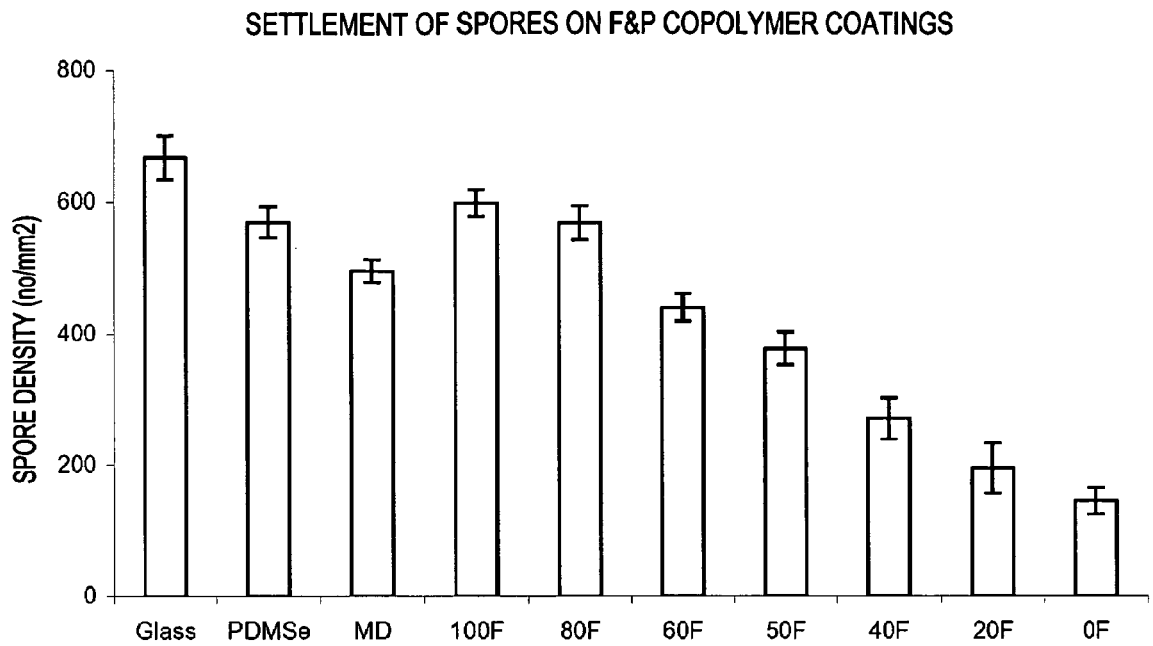

FIG. 16 illustrates the settlement densities of Ulva spores on fluorinated and PEGylated triblock copolymer coatings. Each point is the mean from 90 counts on 3 replicate slides. Bars show 95% confidence limits.

Figure 17:
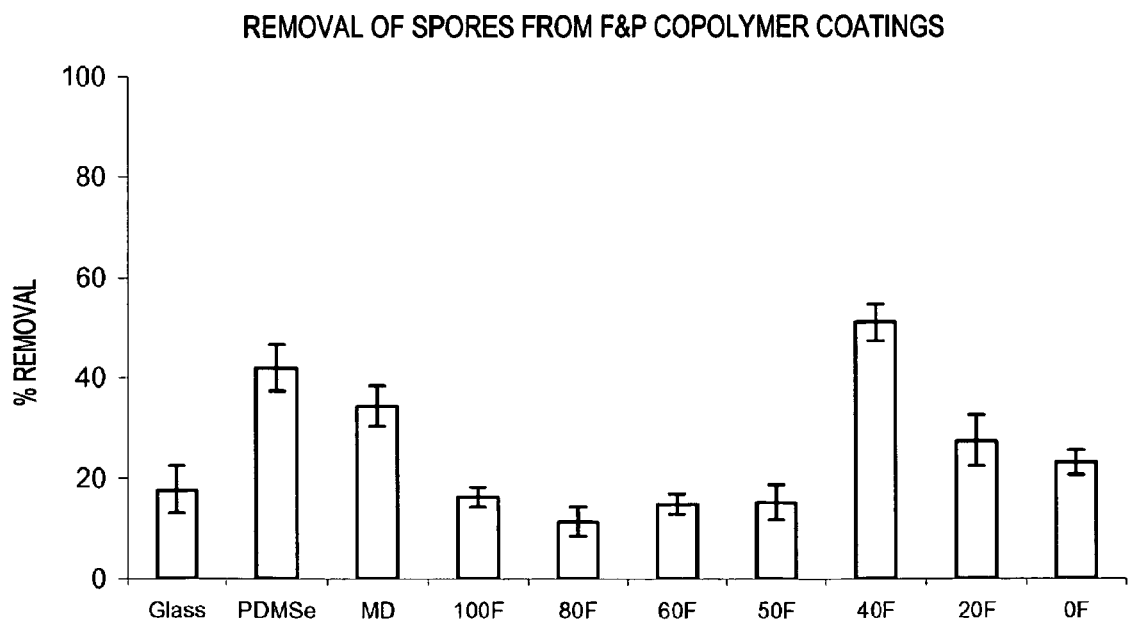

FIG. 17 illustrates the removal of Ulva spores from fluorinated and PEGylated triblock copolymer coatings. Each point is the mean from 90 counts on 3 replicate slides. Bars show 95% confidence limits derived from arc-sine transformed data.

FIG. 18 illustrates the growth of Ulva sporelings on fluorinated and PEGylated triblock copolymer coatings after 7 days. Each point is the mean biomass from 6 replicate slides measured using a fluorescence plate reader (RFU; relative fluorescence unit). Bars show standard error of the mean.

FIG. 19 illustrates detachment of Ulva sporelings from fluorinated and PEGylated triblock copolymer coatings. Coated slides were exposed to the water jet over a range of water pressures. One slide was used at each pressure.

FIG. 20 illustrates critical surface water pressures for 50% removal of sporeling biofilms (WP50) derived from curves in FIG. 16. The line below the PDMSe text represents the critical water pressure to remove 50% of sporelings from PDMSe.

Figure 21:
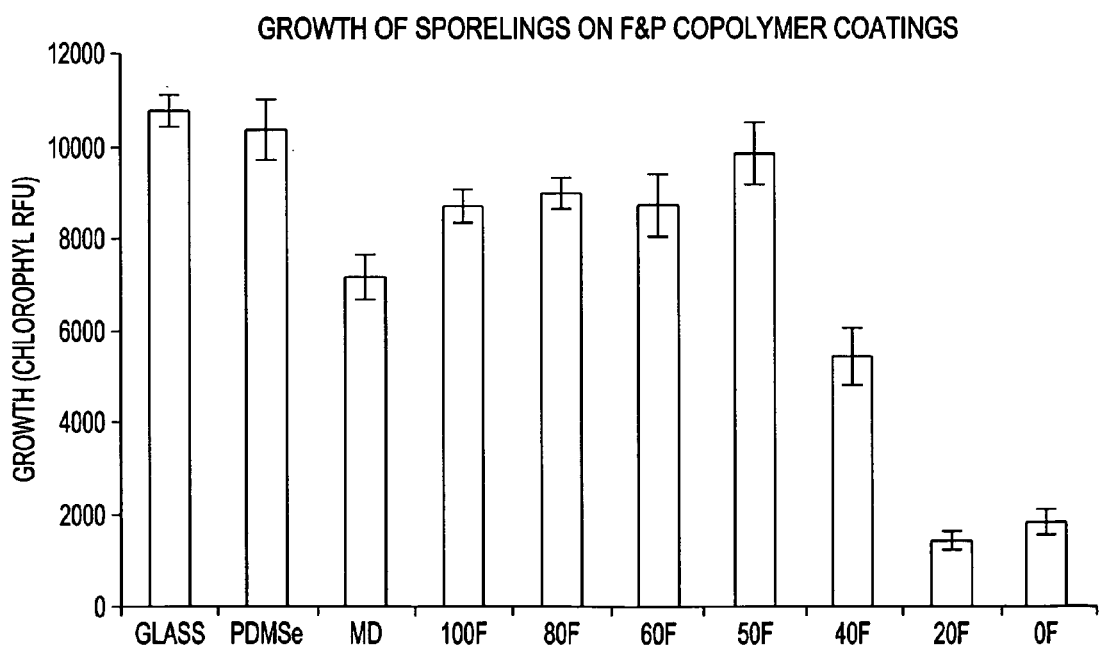

FIG. 21 illustrates data for typical growth of Ulva sporelings on fluorinated and PEGylated triblock copolymer coatings after 7 days. From left; Glass, PDMSe, MD, 100F, 80F, 60F, 50F, 40F, 20F, 0F.

Figure 22:
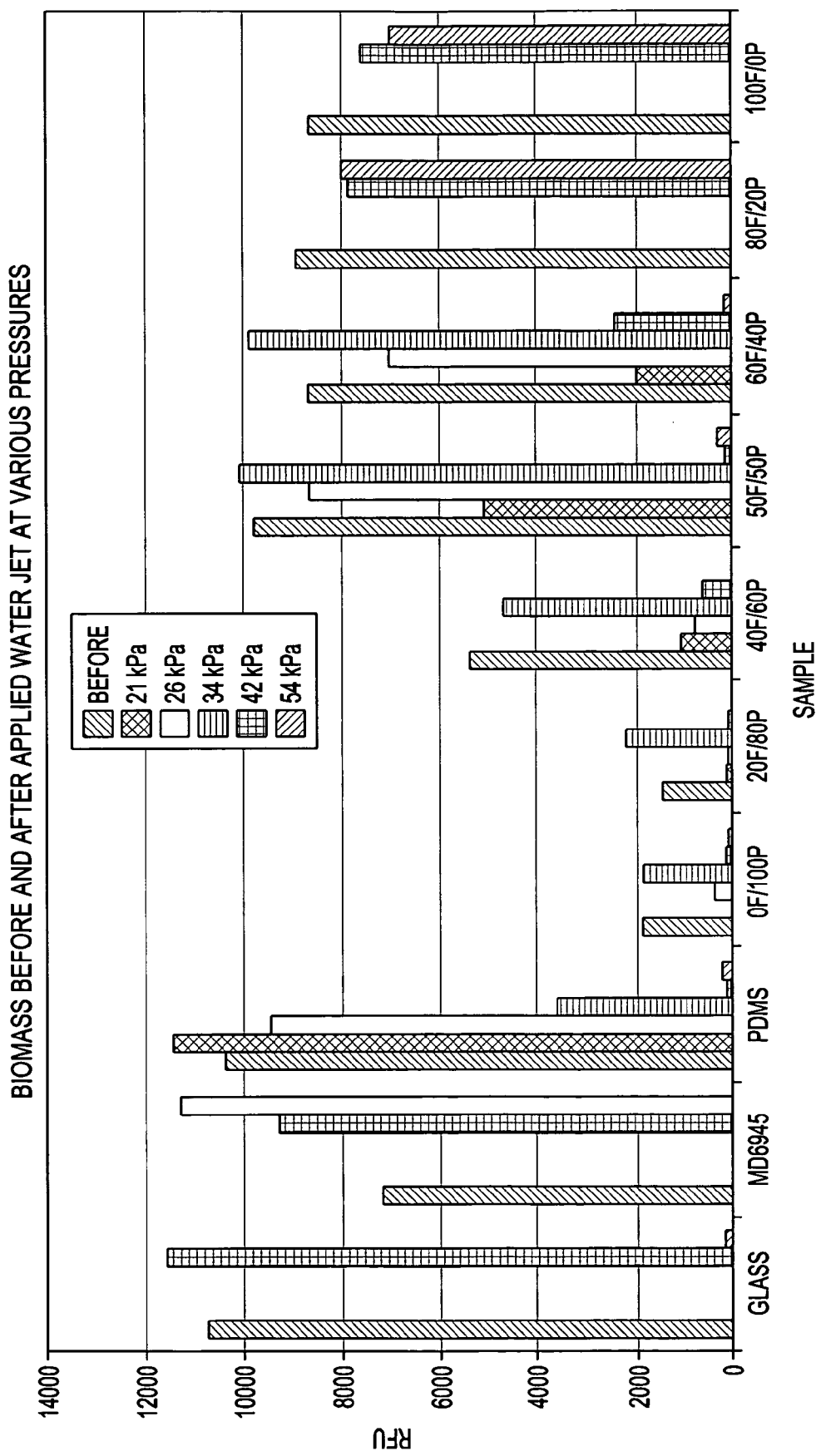

FIG. 22 illustrates data of removal of Ulva sporelings from fluorinated and PEGylated triblock copolymer coatings after exposure to water pressure of 42 kPa. From left; Glass, PDMSe, MD, 100F, 80F, 60F, 50F, 40F, 20F, 0F.

DETAILED DESCRIPTION

Marine Biofouling

Marine surfaces have a tendency to rapidly accumulate colonizing organisms that may range from microscopic bacteria, cyanobacteria, spores of algae and unicellular eukaryotes such as diatoms, to larger larvae of invertebrates. Colonization can start within minutes to hours of immersion of the surface in water, which can be followed by the formation of a biofilm consisting of firmly attached cells. Attached algal spores or invertebrate larvae can rapidly grow into macroscopic adults. Accumulation of biomass on a ship hull is significantly detrimental to marine locomotion, causing higher hydrodynamic drag, which results in lower operational speeds and/or increased fuel consumption.

Certain toxic paints used to prevent biofouling have raised environmental concerns. Bio-accumulating metals in the paints can leach into marine environments, adversely affecting the marine ecosystem. A more environmentally friendly approach is to use non-toxic coatings that can resist colonization by fouling organisms or minimize the strength of adhesion of those organisms that do attach and grow on the surface.

Although settlement of zoospores may be promoted by hydrophobic poly(dimethyl siloxane) (PDMS) surfaces, attachment strength of both the spores and sporelings can be weaker than on a hydrophilic glass substrate, which is a favorable property of the currently used PDMS antifouling coatings. PDMS elastomers are used in commercial foul-release coatings due to their properties such as low surface-energy, low micro-roughness and low modulus. Ulva sporelings generally release readily from PDMS. In contrast, diatoms (unicellular algae) show strong adhesion to PDMS. Thus, marine biofilms dominated by diatoms do not release easily from PDMS-based fouling-release coatings. A goal of marine antifouling research, therefore, is to find a surface that is resistant to fouling by both organisms.

Recently, several amphiphilic fouling release coatings have been reported that combine hydrophobic, low surface energy fluorinated moieties with protein resistant hydrophilic PEG containing groups. Gudipati et al. reported on the development of coatings consisting of an amphiphilic network of hyperbranched fluoropolymer groups combined with linear PEG moieties that showed better release of Ulva sporelings than PDMS controls (*Langmuir*, 2005, 21, 3044). Additionally, in two separate studies, Krishnan et al. (*Langmuir*, 2006, 22, 5075) and Martinelli et al. (*Langmuir*, 2008, 24, 13138) reported on side chain block copolymers containing grafted ethoxylated fluoroalkyl groups that were capable of facile release of both sporelings of the green alga *Ulva* and *Navicula* diatoms. This suggests that amphiphilic fouling release coatings have the potential to resist settlement and adhesion by a wider range of organisms than other coatings currently in use. Due to the significant global demand for practical solutions to marine fouling control, additional study in this area is needed.

Polymers and Coatings

Several series of amphiphilic triblock surface active block copolymers (SABCs) were synthesized through chemical modification of polystyrene-block-poly(ethylene-ran-butylene)-block-polyisoprene ABC triblock copolymer precursors. Poly(ethylene glycol) methyl ether with $M_n$ ca. ~550 kDa (PEG550) and semifluorinated decyl alcohol (F10H10OH) were attached at different molar ratios to impart both hydrophobic and hydrophilic groups to the poly(isoprene) block of the polymer back-bones. Amphiphilic coatings incorporating substantially homogenous ethoxylated fluoroalkyl side chains (e.g., Zonyl® surfactants) were also evaluated.

The modified polymer surfaces were characterized using a combination of infrared spectroscopy, $^1$H NMR spectroscopy and elemental analysis, confirming a broad range of different relative amounts side chain incorporation. The surfaces of the polymers showed high water contact angle hysteresis indicating a dynamic surface capable of significant reorganization. An increase in the incorporation of F10H10 side-chains to the polymer resulted in an increase in the intensity of the —$CF_2$— and —$CF_3$ peaks for C 1 s XPS analysis and 1s→σ*$_{C-F}$ resonance for C 1s NEXAFS measurements, indicating segregation of this low surface energy moiety to the surface. Similar properties were observed for polymers that included amphiphilic ethoxylated fluoroalkyl side chains.

Bilayer coatings on glass slides consisting of a thin layer of an amphiphilic SABC deposited on a thicker layer of a polystyrene-block-poly(ethylene-ran-butylene)-block-poly(styrene) ("SEBS") thermoplastic elastomer were prepared for biofouling assays. Clear differences in surface structure were realized as the composition of attached side chains was varied.

Polymers disclosed herein showed resistance to the settlement of, and facilitated the removal of *Ulva* spores/sporelings and *Navicula* diatoms. In the biofouling assays, a slight increase in spore settlement of the green alga *Ulva* was found on surfaces with greater incorporation of the hydrophobic F10H10 side chains, while PEG550 side chains inhibited settlement. In general, the lowest settlement for *Ulva* spores was seen for coatings with large amounts of PEG550 sidechain incorporation. *Ulva* sporeling release assays did not show a similar trend. However, amphiphilic SABCs incorporating a mixture of PEG550 and F10H10 side chains performed surprisingly well. Analysis of *Ulva* spore removal using a flow channel and *Ulva* sporeling removal using a water jet indicated that an optimal mixture of hydrophobic and hydrophilic side chains, biased towards a majority incorporation of PEG550, can be achieved.

There were no significant differences in the settlement of *Navicula* diatoms, a unicellular alga, across these two sets of coatings, potentially due to their mechanism of gravitational settlement. However, in fouling release assays, removal of *Navicula* increased with increasing the ratio of the hydrophobic F10H10 side chains, contrary to previous reports. Performance of the coating system can thus be optimized to obtain fouling release performance better than that of PDMS, a known fouling-release material.

Additionally, sporeling strength of attachment on SABCs that included ethoxylated fluoroalkyl side chains was lower than on PDMSe standards. Diatom attachment strength was also very low on these amphiphilic ethoxylated fluoroalkyl SABCs. Thus, the exceptional foul-release performance of both types of amphiphilic polymer coatings demonstrates the utility of these polymers for use as antifouling coatings.

DEFINITIONS

As used herein, the following terms have the meanings provided. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", "an example embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect such aspect, feature, structure, moiety, or characteristic in connection with other embodiments, whether or not explicitly described.

The term "and/or" means any one of the items, any combination of the items, or all of the items with which this term is associated.

The singular forms "a," "an," and "the" include plural reference unless the context clearly dictates otherwise. Thus, for example, a reference to "a polymer" includes a plurality of such polymers, so that a polymer X includes a plurality of polymers X.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer. Unless indicated otherwise herein, the term "about" is intended to include values, e.g., weight percents, proximate to the recited range that are equivalent in terms of the functionality of the individual ingredient, the composition, or the embodiment. In addition, unless indicated otherwise herein, a recited range (e.g., weight percents or carbon groups) includes each specific value, integer, decimal, or identity within the range.

The phrase "one or more" is readily understood by one of skill in the art, particularly when read in context of its usage. For example, one or more substituents on a phenyl ring refers to one to five, or one to up to four, for example if the phenyl ring is disubstituted. One or more subunits of a polymer can refer to about 5 to about 5,000, or any increment of about 100 or about 1,000 within that range. In other embodiments, one or more refers to 1 to about 50, 1 to about 30, 1 to about 20, 1 to about 12, 1 to about 10, 1 to about 8, 1 to about 5, 1 to about 3, or 2, or any range referred to herein.

When referring to the molecular weigh of a polymer, the recited weight typically refers to the weight average molecular weight, unless the context of the recitation indicates otherwise. In some embodiments, the recited weight can refer to the number average molecular weight.

It will be appreciated by those skilled in the art that compounds or polymers of some embodiments of invention having a chiral center may exist in and be isolated in optically active and racemic forms. Aspects of the invention encompasses any racemic, optically-active, polymorphic, or stereoisomeric form, or mixtures thereof, of a compound of the invention, which possess the useful properties described herein, it being well known in the art how to prepare optically active forms (for example, by synthesis from optically-active starting materials, by using resolution of the racemic form by recrystallization techniques, by chiral synthesis, or by chromatographic separation using a chiral stationary phase). Thus, the compounds and polymers disclosed herein include all stereochemical isomers arising from the various structural variations of these compounds.

"Substituted" is intended to indicate that one or more hydrogens on a group indicated in the expression using "substituted" can be replaced with a selection suitable groups, provided that the indicated atom's normal valency is not exceeded, and that the substitution results in a stable compound. Suitable groups include, e.g., alkyl, alkoxy, halo, hydroxy, hydroxyalkyl, aryl, heteroaryl, heterocycle, cycloalkyl, amino, alkylamino, nitro, trifluoromethyl, trifluoromethoxy, carboxy, carboxyalkyl, keto, thioxo, cyano, acetoxy, acetyl, benzoyl, benzoylamino, benzoyloxy, benzyl, benzyloxy, benzyloxycarbonyl, ethylene glycol, $NR^xR^y$ and/or $COOR^x$, where each $R^x$ and $R^y$ are independently H, alkyl, alkenyl, aryl, heteroaryl, heterocycle, cycloalkyl or hydroxy. As would be readily understood by one skilled in the art, when a substituent is keto (i.e., $=O$) or thioxo (i.e., $=S$), or the like, then two hydrogen atoms on the substituted atom are replaced. The substituent can be separated from the substituted atom by an alkyl chain or ethylene glycol chain, and can be terminated by an alkyl group.

Specific values described for radicals, substituents, and ranges, as well as specific embodiments of the invention described herein, are for illustration only; they do not exclude other defined values or other values within defined ranges, as would be recognized by one skilled in the art.

As used herein, the term "alkyl" refers to a branched, unbranched, or cyclic hydrocarbon having, for example, from 1 to about 20 carbon atoms, and often 1 to about 15, or 1 to about 12 carbon atoms. Examples include, but are not limited to, methyl, ethyl, 1-propyl, 2-propyl, 1-butyl, 2-methyl-1-propyl, 2-butyl, 2-methyl-2-propyl, 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl 4-methyl-2-pentyl, 3-methyl-3-pentyl, 2-methyl-3-pentyl, 2,3-dimethyl-2-butyl, and 3,3-dimethyl-2-butyl, hexyl, octyl, decyl, or dodecyl. The alkyl can be unsubstituted or substituted. The alkyl can also be optionally partially or fully unsaturated. As such, the recitation of an alkyl group includes both alkenyl and alkynyl groups. The alkyl can be a monovalent hydrocarbon radical, as described and exemplified above, or it can be a divalent hydrocarbon radical (i.e., alkylene).

Alkoxy can be ($C_1$-$C_{12}$)alkoxy, such as, for example, methoxy, ethoxy, propoxy, isopropoxy, butoxy, iso-butoxy, sec-butoxy, pentoxy, 3-pentoxy, hexyloxy, or octyloxy. Any available carbon atom of an alkyl or alkoxy (including an "alkoxy"-carbonyl) can be optionally unsubstituted or substituted.

The term "halo" or "halide" refers to fluoro, chloro, bromo, or iodo.

As used herein, the terms "unit", "mer" or "mers" refers to a portion of a polymer derived from a particular monomer. For example, a styrene mer refers to a segment of a polymer that was prepared from styrene to form polystyrene, e.g., a phenethyl group where the ethyl group is a 1,2-diradical. Accordingly, a mer can refer to a specific unit derived from an unsaturated monomer, thus indicating, for example, a phenethyl diradical within the polymerized chain.

The term "ethoxylated" refers to a group that includes one or more ethoxy (—O—$CH_2$—$CH_2$—) groups, for example, about 2 to about 24, or about 3 to about 12, about 6 to about 12, about 8 to about 12, or about 10 ethoxy groups. An ethoxylated group that has two or more ethoxy or ethylene glycol groups can be referred to as a polyethylene glycol, or PEG group. Ethoxylated or PEG groups can be terminated in an optionally substituted alkyl, for example, a methyl, or they can terminate with hydrogen or hydroxy, e.g., a 2-hydroxyethoxy group.

The terms "semifluorinated" and "at least partially fluorinated" refer to an alkyl group that has at least one hydrogen atom replaced by a fluorine atom. Semifluorinated groups include any carbon chains, or carbon chains that are interrupted by one or more heteroatoms (for example, oxygen), that contain one or more fluorine atoms. Typically the semifluorinated group will have one or more —$CF_2$— groups and can optionally terminate in a —$CF_3$ group. For example, a semifluorinated group can be a group of the formula:

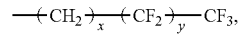

where each x is independently about 2 to about 20, or about 2 to about 12, and each y is independently 0 to about 20, typically 1 to about 15, or about 2 to about 12. In other embodiments, x can be about 2 or 4 to about 10 or 12, and y can be about 2 or 4 to about 10 or 12.

Zonyl® surfactants refer to ethoxylated fluoroalkyl chains with an oxygen or hydroxyl at one end of the group. These surfactants can be attached to appropriately functionalized block copolymers via the hydroxyl group, or via a halo group which has replaced the hydroxyl group. Accordingly, polymers having ethoxylated fluoroalkyl side chains can be prepared using any appropriate Zonyl® surfactant. One example of a suitable Zonyl® surfactant that can be used to prepare ethoxylated fluoroalkyl side chain-containing block copolymers is Zonyl® FSO-100 [CAS # 122525-99-9]. Other suitable Zonyl® surfactants include Zonyl® FSN, Zonyl® FSN-100, and Zonyl® FSO. Zonyl® surfactants can be obtained from DuPont (Wilmington, Del.).

Ethoxylated fluoroalkyl groups that can be used in various embodiments of the invention include moieties of formula Z:

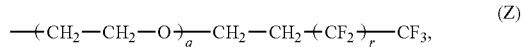

where each q is independently 0 to about 25; each r is independently 0 to about 18; and the moiety of formula Z is attached to a polymer chain or chain substituent through an ether linkage.

The term "contacting" refers to the act of touching, making contact, or of bringing to immediate or close proximity, including at the molecular level, for example, to bring about a chemical reaction or physical change, e.g., in a solution or other reaction mixture, or as in coating a surface.

The term "coating" refers to a manufacturing process or preparation for applying an adherent layer to a workpiece or substrate web. A coating can also be a layer of material that at least partially covers an underlying surface or substrate, such as that of a marine vessel, for example, a boat hull, pontoon, or any other surface in need of a coating. The coating can also be a bilayer, which refers to any coating that includes two or more layers.

The term "sporeling" refers to young plants derived from quadriflagellate, motile, pear-shaped, and asexual zoospores of Ulva that can settle on a surface by a process of selection, and germinate after attachment.

The term "SEBS G1652 thermoplastic elastomer" refers to a polystyrene-block-poly(ethylene-ran-butylene)-block-polystyrene ABA triblock copolymer with a ratio of polystyrene block to rubber block of about 31:69, which is a typical thermoplastic elastomer. The rubber block is a random ethylene/butylene copolymer made by hydrogenating polybutadiene with an amount of 1,2 additions typical for an SEBS polymer. SEBS G1652 is available from Kraton Polymers.

The term "MD6945 thermoplastic elastomer" refers to a polystyrene-block-poly(ethylene-ran-butylene)-block-polystyrene ABA triblock copolymer with a ratio of polystyrene block to rubber block of about 12:82. The rubber block is a random ethylene/butylene copolymer made by hydrogenating polybutadiene with an amount of 1,2 additions higher than typical for an SEBS polymer. MD6945 thermoplastic elastomer is available from Kraton Polymers.

The term "soft base layer" refers to a base layer formed from an elastomer that has a Young's modulus of less than about 5 MPa, for example, MD6945, which has a Young's modulus of 1.6 MPa.

The term "hard base layer" refer to a base layer formed from an elastomer that has a Young's modulus of more than about 6 MPa, for example, G1652, which has a Young's modulus of 13 MPa.

Polymer Embodiments of the Invention

As summarized above, one embodiment provides a polymer comprising at least three blocks, the first block comprising poly(styrene), the second block comprising a random arrangement of poly(ethylene) and poly(butylene), and a third block comprising functionalized poly(isoprene). Repeating units of the functionalized poly(isoprene) block can include hydroxyl groups and one or more ether linked side chains. The side chains can be R groups such as $R^1$, $R^2$, $R^3$, $R^4$, $R^5$, $R^6$, or a combination thereof. In various embodiments, the definitions of $R^1$-$R^6$ include the following definitions.

$R^1$ can be —$(OCH_2CH_2)_nOCH_3$ where each n is independently 8-16;

$R^2$ can be —$O(CH_2)_x(CF_2)_yF$ where each x and y are independently 2-12;

$R^3$ can be —$(OCH_2CH_2)_q(CF_2CF_2)_rF$ where each q is independently 1 to about 25 and each r is independently 0 to about 18;

$R^4$ can be —$(OCH_2OCH_2)_nOC_6H_4(CH_2)_nCH_3$ where each n is independently 6-16;

$R^5$ can be —$(OCH_2OCH_2)_n(CH_2)_nCH_3$ where each n is independently 8-16; and/or $R^6$ can be —$(OCH_2OCH_2)_n(CH_2)_3Si(CH_3)(OSi(CH_3)_3)_2$ where each n is independently 8-16.

In one embodiment, each n of $R^4$ is about 7 to about 10; each n of $R^5$ is about 10 to about 15; and each n of $R^6$ is about 10. In another embodiment, x is about 6 and y is about 8 for variable $R^2$. In some embodiments, the ratio of x and y for variable $R^2$ may range from about 4/10 to about 10/4, such as, for example, about 4/8, about 6/6, about 6/8, about 8/10, about 10/6, about 8/6, and about 8/4.

In certain specific embodiments, $R^1$-$R^6$ include the following definitions.

$R^1$ can be —$(OCH_2CH_2)_nOCH_3$ where each n is about 12;

$R^2$ can be —$O(CH_2)_x(CF_2)_yF$ where each x is about 2, 4, 6, 8, or 10, and each y is about 2, 4, 6, 8, or 10;

$R^3$ can be —$(OCH_2CH_2)_q(CF_2CF_2)_rF$ where each q and r are independently about 3 to about 15;

$R^4$ can be —$(OCH_2OCH_2)_9OC_6H_4(CH_2)_8CH_3$;

$R^5$ can be —$(OCH_2OCH_2)_{10}(CH_2)_{15}CH_3$; and/or $R^6$ can be —$(OCH_2OCH_2)_{11}(CH_2)_3Si(CH_3)(OSi(CH_3)_3)_2$.

The polymer can be a triblock polymer where the poly(styrene) block has a molecular weight of about 4,000 to about 12,000, the poly(ethylene) random poly(butylene) block has a molecular weight of about 15,000 to about 50,000, or about 20,000 to about 30,000, and the functionalized poly(isoprene) block is derived from a poly(isoprene) block of a molecular weight of about 5,000 to about 25,000, about 8,000 to about 12,000, or about 18,000 to about 22,000.

Blocks of the polymer can be prepared in various desired molecular weights, for example, average molecular weights of increments of 1,000 between each of the aforementioned ranges, inclusive of the recited outer values. For example, in one embodiment, the triblock polymer can include a poly(styrene) block that has a molecular weight of about 8,000, a poly(ethylene) random poly(butylene) block that has a molecular weight of about 25,000, and a functionalized poly(isoprene) block that is derived from a poly(isoprene) block of a molecular weight of about 10,000 or about 20,000.

Accordingly, the poly(isoprene) block can include approximately 75 units to about 375 units, or any increment of about 25 units within the range. Side chains $R^1$-$R^6$ can be present on certain percentages of the units of the poly(isoprene) block. For example, side chains can be present on any percentage of isoprene derived units from about 1%, up to about 90%.

In some embodiments, at least about 5% of the repeating units of the functionalized poly(isoprene) block may have one set of specific R side chains and at least about 3% of the repeating units of the functionalized poly(isoprene) block may have another set of specific side chains. For example, in one embodiment, the polymer can include at least about 5% of the repeating units of the functionalized poly(isoprene) block having $R^1$ side chains and at least about 3% of the repeating units of the functionalized poly(isoprene) block having $R^2$ side chains. In other embodiments, other R groups can have similar values, for example, increments of about 5% ranging from 5% to about 90%.

Additionally, the polymer can include various ranges of specific R groups. For example, in one embodiment, the polymer can include about 5% to about 40% of the repeating units of the functionalized poly(isoprene) block that have $R^1$ side chains. In another embodiment, about 3% to about 60% of the repeating units of the functionalized poly(isoprene) block may have $R^2$ side chains. In others embodiments, other R groups can have similar values, for example, increments of about 5% ranging from 5% to about 95%. Other values for % attachment of various R groups include those recited in the Examples below.

The group $R^2$ can be varied and tuned according to desired properties. The $R^2$ precursor (i.e., the semifluorinated alcohol) can be prepared by linking an appropriately functionalized alkyl chain with a 1-iodofluoroalkane. For example, an alkenol having the alkene and alcohol moieties at opposite end can be combined in the presence of a radical initiator, such as AIBN. The internal iodo substituent of the resulting semifluorinated alkanol can be removed by treatment with a radical initiator and a hydrogen source, such as tributyl tin hydride. Using such reactions, $R^2$ groups of any desired lengths can be obtained, including $R^2$ (—O(CH$_2$)$_x$(CF$_2$)$_y$F) where x is 2, 3, 4, 5, 6, 7, 8, 9, 10, 11, or 12, and y is 1, 2, 3, 4, 5, 6, 7, 8, 9, 10, 11, or 12. For example, in one specific embodiment, x is 6 and y is 8; in another embodiment, x is 6 and y is 6. Numerous examples of these groups have been prepared, and these groups can be used in place of the specific $R^2$ groups described in the Examples below.

The polymers can provide a sufficiently hydrophilic surface to prevent adsorption of extracellular matrices of settling organisms. Examples of such organisms may include marine algae, algal spores or sporelings, bacterial cells, diatoms, protozoa, and barnacles, such as barnacle cyprid larvae. The extracellular matrices can include proteins, glycoproteins, peptidoglycans, and nucleic acids that the organisms secrete for adhesion.

The amphiphilic nature of several of the side chains described herein minimizes the adhesion strength of marine organisms. Some embodiments of the disclosed polymers are readily soluble in common solvents such as THF, toluene, α,α,α-trifluorotoluene, methylene chloride, and chloroform. The polymers typically have good film forming properties, as understood by one skilled in the art. The polymers can have minimal or no solubility or swelling in water for under-water applications, and minimal or no toxicity.

Some embodiments provide novel amphiphilic polymers and methods to prepare them. Amphiphilic surfaces prepared from the polymers described herein can result in low adhesion strength of marine organisms such as *Ulva* and *Navicula*.

Coating Compositions

One embodiment provides antifouling coatings where the surface layer of the coating is an amphiphilic polymer described herein. The coating can be the amphiphilic polymer alone, or in combination with other ingredients. Such ingredients may include, for example, adhesive polymers, paints, water, one or more solvents, additives, stabilizers, colorants, dispersants, or combinations thereof, to form a paint, lacquer, or other coating composition. Procedures for coating a surface may include brushing, immersing, pouring, solvent-casting, spin-coating, or spray-coating the surface with the composition. Accordingly, some embodiments provide a method of protecting a substrate, for example, the hull of a marine vessel, from biofouling by coating the substrate with a composition that includes an amphiphilic polymer disclosed herein.

Antifouling coatings can also include a surface layer of a polymer described herein, and a base layer, for example, a base layer of a thermoplastic elastomeric polymer, thereby forming a bilayer. Bilayer coatings can be formed from two or more different polymers by sequentially coating a surface with the polymers by various techniques well known to those of skill in the art. For example, a bilayer can be formed by annealing at a temperature above the glass transition temperature of polystyrene blocks of the polymers in the bilayer. The coating can result in a top layer of about 30 nm to about 500 μm in thickness, about 40 nm to about 150 μm in thickness, or about 50 nm to about 25 μm in thickness. The base layer can have a thickness of about 0.01 mm to about 5 mm, typically about 0.05 mm to about 1 mm. The average-weight molecular weight of the polystyrene block of the amphiphilic polymer surface layer can be within about 50%, about 25%, about 20%, about 15%, about 10%, or about 5% of the average-weight molecular weight of the polystyrene block or blocks of a polymer that forms the base layer.

In one embodiment, the modulus and surface chemistry of the coatings can be independently controlled by using a bilayer coating strategy. A sufficiently thick polymer film can thus be obtained without using excessive amounts of the surface-active block copolymer (SABC). The bottom layer of this coating can be a thermoplastic elastomer, such as polystyrene-block-poly(ethylene-ran-butylene)-block-polystyrene (SEBS, KRATON G1652 or MD6945), polystyrene-block-poly(ethylene-ran-propylene)-block-polystyrene (SEPS), or polystyrene-block-poly(ethylene-ran-butylene-ran-propylene)-block-polystyrene (SEBEPS). The top layer can be a polymer as described herein, such as in the Examples below. The polystyrene block in the SABC can increase the compatibility of the SEBS or SEPS and SABC layers by entrapment in the cylindrical polystyrene domains at the surface of the base layer.

Multi-layer coatings can be prepared by forming a bilayer coating on aluminum plates, preferably after sand blasting, primed with epoxy, and coated with a maleated adhesion layer. Additionally, lab scale test coatings produced on glass slides, primed with an epoxy silane and a maleated adhesion layer may be utilized. A thicker layer of a polystyrene-block-poly(ethylene-ran-butylene)-block-poly(styrene) thermoplastic elastomer can be fixed to the adhesion layer, followed by application of a thin layer of an amphiphilic SABC, for example, a polymer as described herein.

In one embodiment, the surface layer of the antifouling coating can include an amphiphilic SABC as described herein where the functionalized poly(isoprene) block has a higher percentage of $R^1$ side chains than $R^2$ side chains, where the coating promotes release of *Ulva* sporelings from the coating in a marine environment. In another embodiment, the coating includes a polymer where the functionalized poly(isoprene) block is derived from a poly(isoprene) block of about 5,000 to about 25,000, about 8,000 to about 22,000, about 8,000 to about 12,000, or about 18,000 to about 22,000. The functionalized poly(isoprene) block can have a higher percentage of $R^1$ side chains than $R^2$ side chains, and the coating resists settlement of *Ulva* spores to a greater extent than other coatings, such as a poly(dimethylsiloxane) coating. Other embodiments may include other pairs of R group attached in proportions greater or lesser than one another.

In another embodiment, the antifouling coating can include an amphiphilic SABC where the functionalized poly (isoprene) block has a higher percentage of $R^2$ side chains than $R^1$ side chains, where the coating promotes detachment of *Navicula* diatoms from the coating in a marine environment. Other embodiments may include other pairs of R group attached in proportions greater or lesser than one another.

In another embodiment, the antifouling coating can include an amphiphilic SABC where the functionalized poly (isoprene) block has at least about 3% of the isoprene units functionalized with ether linked $R^3$ side chains, where the coating reduces the strength of *Ulva* sporeling attachment compared to PDMSe coatings, and/or promotes detachment of *Navicula* diatoms from the coating in a marine environment. Other embodiments may include other R groups, or combinations thereof, attached by ether linkages to the isoprene derived subunits.

In yet another embodiment, the antifouling coating results in less barnacle cyprid larvae settlement than poly(styrene-ethylene-butylene-styrene) polymer surfaces or poly(dimethyl-siloxane) surfaces in a marine environment. In other embodiments, such as polymers of formula I or II, at least about 5% of $m^3$ units may have $R^1$ side chains and at least about 3% of $m^3$ units may have $R^2$ side chains. In other embodiments, polymers of formula I or II can have functionalized poly(isoprene) block that have R groups attached to about 40-60% of the isoprene units. In other embodiments, isoprene mers can have R groups attached to about 45-55%, or any other percent recited in the Examples below.

The coating can exhibit antifouling properties toward marine organisms, for example, one or more of marine algae, algal spores or sporelings, bacterial cells, diatoms, protozoa, and barnacles, in a marine environment. Coatings that include an amphiphilic polymer as disclosed herein can provide a surface that resists settlement of spores, such as *Ulva* spores. The surface can also reduce the growth of sporelings, such as *Ulva* sporelings, as well as promote the release of *Ulva* sporelings from the coating in a marine environment. The polymers and coatings can also inhibit diatom settling, such as *Navicula* settling, as well as promote the release, and removal of such organisms. The improved removal can be, for example, compared to other surfaces, such as glass, PDMS, or in some embodiments, surfaces commonly found in marine environments (e.g., wood, common plastics, etc.). In some embodiments, the coating can be a bilayer coating that includes a soft base layer (e.g., a thermoplastic elastomer that has a Young's modulus of less than about 5 MPa, for example, MD6945), or in other embodiments, a hard base layer (e.g., a thermoplastic elastomer that has a Young's modulus of great than about 10, for example, G1652). In certain embodiments, a soft base layer is preferred.

General and specific methods for preparing polymer coatings are described in U.S. Patent Application Publication Nos. US 2006/0083854 (Ober et al.) and US 2007/0053867 (Ober et al.), which are incorporated herein by reference. The coatings can form single layer coatings, bi-layer coatings, or multi-layer coatings. Certain procedures for forming bilayer coatings are described in U.S. Pat. No. 6,750,296 (Ober et al.), which is incorporated herein by reference. These techniques can also be used to prepare bilayer coatings that include surface layers of the amphiphilic polymers described herein.

General Methods of Making Compounds and Polymers of the Invention

Processes for preparing the compounds, intermediates, and surface-active polymers described herein are provided as further embodiments of the invention. Such compounds and polymers can be prepared by any of the applicable techniques of organic synthesis. Numerous such techniques are well known in the art. However, many useful synthetic techniques are elaborated in *March's Advanced Organic Chemistry*, 5th Ed. (John Wiley & Sons, New York, 2001), and *Comprehensive Organic Synthesis*, 2nd Ed. (Richard C. Larock, Wiley-VCH, New York, 1999).

General methods of making block copolymers are reviewed by R. P. Quirk and J. Kim, in "Recent Advances in Thermoplastic Elastomer Synthesis", *Rubber Chemistry and Technology*, Volume 64, No. 3 (1991), which is incorporated herein by reference. The method of sequential anionic polymerization of monomers may be useful. Because the types of monomers that undergo living polymerization are relatively limited for anionic methods, with the most favorable being conjugated diolefins and styrenes, partial hydrogenation of anionic block copolymers may be useful to obtain partially hydrogenated polymers that can act as precursors to the polymers disclosed herein. Polymers containing olefinic unsaturation or both aromatic and olefinic unsaturation may be prepared using anionic initiators or polymerization catalysts. Such polymers may be prepared using bulk, solution or emulsion techniques. Other techniques useful when preparing polymers disclosed herein are described in U.S. Pat. No. 5,262,496 (Bening et al.), which is incorporated herein by reference.

Generally, reaction conditions such as temperature, reaction time, solvents, work-up procedures, and the like, will be those common in the art for the particular type of reaction to be performed. Typically the temperatures will be about −100° C. to about 200° C., solvents will be aprotic or protic depending on the conditions required, and reaction times will be about 1 minute to about 10 days. Work-up of standard organic transformation reactions typically consists of quenching any un-reacted reagents followed by partitioning between a water/organic layer biphasic system (extraction) and separation of the layer containing the product. Work-up of reactions with polymers typically consists of concentrating the reaction mixture by removing a quantity of solvent, followed by precipitation of the polymer using a solvent or solvent system in which the polymer has low or substantially no solubility, such as, for example, methanol, or a combination of water and methanol.

The triblock polymer precursors described herein may be be prepared using any of the solvents known in the art to be useful in the preparation of the such polymers. Suitable solvents include, for example, straight- and branched chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as alkyl-substituted derivatives thereof, aromatic and alkyl-substituted aromatic hydrocarbons such as benzene, naphthalene, toluene, xylene and the like; hydrogenated aromatic hydrocarbons such as tetralin, decalin and the like; and linear and cyclic ethers such as methyl ether, methylethyl ether, diethyl ether, tetrahydrofuran and the like.

The triblock polymers may optionally be partially hydrogenated before or after functionalization (for example, functionalization by epoxidation followed by side chain addition). Methods for preparation of polymers having controllable and predictable amounts of residual olefinic unsaturation are disclosed in U.S. Pat. No. 4,879,349 (Hoxmeier), which is incorporated herein by reference. Such processes include copolymerizing substituted and unsubstituted conjugated diolefins and hydrogenating the copolymer under conditions that are effective to substantially hydrogenate olefinic unsaturations lacking tertiary substitution (i.e., containing vinyl or 1,2-disubstitution), but leaving the remaining olefinic unsaturation substantially unhydrogenated. Partial hydrogenation in some embodiments can allow for control of the amount of residual unsaturation, leading to more controlled amounts of side chain incorporation after epoxidation. In certain embodiments, the poly(isoprene) block can be hydrogenated to provide about 20%, about 30%, about 40%, about 50%, about 60%, or about 70% residual unsaturation.

The terminal (end) groups of the polymer are determined by the method of polymerization as well as by the initiation and quenching procedure. One skilled in the art will readily understand the variety of terminal groups that can be provided by various initiators and quenching agents. Typical end groups include methyl, sec-butyl, bromo, and various N-alkoxyamine and dithioester groups. Other terminal groups may include hydrogen, hydroxy, and various silyl derivatives, for example, a dimethyl(2-perfluorooctyl)ethylsilyl group.

The triblock polymer precursors of the polymers disclosed herein can be synthetically modified, for example, by epoxidation followed by oxirane ring opening by the hydroxyl group of a side chain precursor, optionally catalyzed by a Lewis acid, resulting in side chain substituents on the mers of the backbone polymer. The mers can be substituted with side groups, such as, for example, semifluorinated (SF), poly(ethylene glycol) (PEG), ethoxylated fluoroalkyl (AMP) side groups, or any other side chain group described herein, or a combination thereof.

Prior to or after epoxidation, the polymer can be partially hydrogenated. The epoxidation can be such that at least 0.1 Meq/g polymer of epoxide moieties is in the polymer. Less than 0.1 Meq/g may provide insufficient functionality to provide a suitable number of side chain attachment points. In some embodiments, the range of epoxide moieties can be about 0.1 to about 15 Meq/g, about 0.1 to about 9 Meq/g, about 0.25 to about 5 Meq/g, or about 0.25 to about 3 Meq/g polymer.

The epoxidized copolymers can be prepared by the epoxidation procedures as described in the Examples below, and/or as generally described in the *Encyclopedia of Chemical Technology* 19, $3^{rd}$ ed., 251-266 (1980); D. N. Schulz, S. R. Turner, and M. A. Golub, *Rubber Chemistry and Technology*, 5, 809 (1982); W-K. Huang, G-H. Hsuie, and W-H. Hou, *Journal of Polymer Science, Part A: Polymer Chemistry*, 26, 1867 (1988); K. A. Jorgensen, *Chemical Reviews*, 89, 431 (1989), and Hermann, Fischer and Marz, *Angew. Chem. Int. Ed. Engl.* 30 (No. 12), 1638 (1991), and U.S. Pat. No. 5,262,496 (Bening et al.), each of which is incorporated herein by reference.

The variables and limitations described for one general or specific embodiment of any polymer described herein can optionally be applied to other embodiments, for example, other formulas and variations of the embodiments provided in the Examples.

The following Examples are intended to illustrate the invention described above and should not be construed as to narrow its scope. One skilled in the art will readily recognize that the Examples suggest other ways in which the present invention could be practiced. It should be understood that variations and modifications may be made while remaining within the scope of the invention.

EXAMPLES

General Materials

Polystyrene$_{8K}$-block-poly(ethylene-ran-butylene)$_{25K}$-block-polyisoprene$_{10K}$ (PS$_{8K}$-b-P(E/B)$_{25K}$-b-PI$_{10K}$) and the polystyrene$_{8K}$-block-poly(ethylene-ran-butylene)$_{25K}$-block-polyisoprene$_{20K}$ (PS$_{8K}$-b-P(E/B)$_{25K}$-b-PI$_{20K}$) triblock precursor copolymers were produced using anionic polymerization and subsequent catalytic hydrogenation. The polymers were obtained from Kraton Polymers (Houston, Tex.) at large scale (~0.5 kg).

1-Iodoperfluorodecane (I(CF$_2$)$_{10}$F, FW 648.98, 98%) was purchased from Synquest Labs and used as received. 9-Decen-1-ol (H$_2$C═CH(CH$_2$)$_8$OH, FW 156.27, 97%), 2,2'-azobisisobutyronitrile (N═C(CH$_3$)$_2$N═NC(CH$_3$)$_2$C═N, FW 164.21, 98%), and tributyltin hydride ((n-Bu)$_3$SnH, FW 291.06, 97%) were purchased from Sigma Aldrich and used as received in conjunction with the 1-iodoperfluorodecane to synthesize 10-perfluorodecyl-1-decanol (F10H10OH, F(CF$_2$)$_{10}$(CH$_2$)$_{10}$OH, FW 676.35).

3-Meta-chloroperoxybenzoic acid (mCPBA, 77%), boron trifluoride diethyl etherate (BF$_3$.Et$_2$O, 99.9%), and poly(ethylene glycol) methyl ether (PEG550, CH$_3$(OCH$_2$CH$_2$)$_x$OH, average M$_n$≈550, x≈12) were also purchased from Sigma Aldrich and used as received in the modification of the PS-b-P(E/B)-b-PI triblock precursor polymers. Anhydrous chloroform (CHCl$_3$), anhydrous toluene, and anhydrous α,α,α-trifluorotoluene (TFT) were purchased from Sigma Aldrich and used with no further purification. Chloroform, dichloromethane, methanol, toluene, 6.25 N sodium hydroxide, 96% sulfuric acid, 30 wt % hydrogen peroxide in water, 95% ethanol and all other reagents were used as received.

3-(Glycidoxypropyl)-trimethoxysilane (GPS, 99%) was purchased from Gelest and used as received. Two separate polystyrene-block-poly(ethylene-ran-butylene)-block-polystyrene (SEBS) triblock thermoplastic elastomers (Kraton G1652M and Kraton MD6945) and SEBS grafted with maleic anhydride (MA-SEBS, Kraton FG1901X) were provided by Kraton Polymers.

$^1$H NMR spectra were recorded using a Varian Gemini spectrometer with deuterated chloroform. The IR spectra of the polymers cast as films from THF solution on sodium chloride plates was collected using a Mattson 2020 Galaxy Series FTIR spectrometer. Gel permeation chromatography of a THF solution of polymers (1 mg/mL) was carried out using four Waters Styragel HT columns operating at 40° C. in conjunction with Waters 490 ultraviolet (λ=254 nm) and Waters 410 refractive index detectors. The molecular weight range of columns was from 500 to $10^7$ g/mol. THF was used as the eluent at a flow rate of 1 mL/minute, and toluene was used as a marker for flow calibration.

Example 1

Triblock Surface Active Block Copolymers

Triblock Surface Active Block Copolymers with Mixed Hydrophobic and Hydrophilic Side Chains Amphiphilic Marine Fouling-Release Polymers through Tuning of Hydrophobic and Hydrophilic Moieties.

The following Example describes the development of ambiguous amphiphilic polymeric antifouling coatings combining low surface energy with cell adhesion resistance through the random incorporation of discrete poly(ethylene glycol) and semifluorinated side chains with two specifically designed polystyrene-block-poly(ethylene-ran-butylene)-block-polyisoprene ("PS-b-P(E/B)-b-PI") ABC triblock copolymer precursors. Chemical characterization of the resultant surface active block copolymers (SABCs) is described and correlated to surface characterization using near-edge X-ray adsorption fine structure (NEXAFS) analysis, X-ray photoelectron spectroscopy (XPS) and dynamic water contact angle analysis. Additionally, biofouling assays of two sets of ambiguous amphiphilic SABCs are described, charting these materials' ability to resist and release fouling by both the green macroalga *Ulva* and the diatom *Navicula*. Specific trends in settlement and release behavior are identified.

Synthesis of 10-perfluorodecyl-1-decanol (F10H10OH)

The semifluorinated alcohol, 10-perfluorodecyl-1-decanol (F10H10OH) was produced in a manner analogous to that reported in Hopken et al. (J. Hopken, M. Moller, and S. Boileau, *New Polymeric Materials*, 1991, 2, 339). The procedure, which can be used for other length alkyl and fluoroalkyl groups, is illustrated in Scheme 1-1 below. 9-Decen-1-ol (14.07 g, 0.09 mol) and perfluorodecyliodide (38.76 g, 0.06 mol) were taken in a round bottom flask fitted with a condenser and septa. The reactants were purged with argon and the mixture was heated to 90° C. while stirring. AIBN (300 mg) was added incrementally over a period of 45 minutes. After 5 hours, the reaction temperature was reduced to 80° C. and 30 mL of anhydrous toluene was added, followed by additional AIBN (1.5 g) and tributyl tin hydride (52.38 g, 0.18 mol). The reaction mixture was stirred while heating at 80° C. for 24 hours and then an additional 60 mL of anhydrous toluene was added to the reaction mixture, which was then allowed to cool to room temperature. The crude F10H10OH product crystallized out of solution as a white solid, was collected by filtration, and was subsequently recrystallized from hot toluene three times to remove residual starting products and tributyl tin impurities. The purified F10H10OH was dried under reduced pressure at room temperature for 48 hours.

$^1$H NMR for F10H10OH (300 MHz, CDCl$_3$, δ): 3.63 (q, 2H, HOCH$_2$CH$_2$—), 2.07 (m, 2H, —CH$_2$CH$_2$CF$_2$—), 1.58 (m, 2H, —CF$_2$CH$_2$CH$_2$CH$_2$—); 1.30 (br s, 12H, —CF$_2$—CH$_2$—CH$_2$—(CH$_2$)$_6$— and 1H, —HOCH$_2$—). IR (dry film) υ$_{max}$ (cm$^{-1}$): 3250 (O—H stretching); 2925, 2850 (C—H stretching); 1470, 1452 (C—H bending); 1330-1095 (C—F stretching); 1055 (C—O stretch).

Scheme 1-1. Synthesis of semifluorinated 10-perfluorodecyl-1-decanol (F10H10OH).

F(CF$_2$)$_{10}$I
+  →(AIBN, 90° C., 5 hr)
CH$_2$=CH(CH$_2$)$_8$OH

F(CF$_2$)$_{10}$CH$_2$CH$_2$I(CH$_2$)$_8$OH →(Bu$_3$SnH, AIBN, toluene, 80° C., 24 hr)

F(CF$_2$)$_{10}$CH$_2$(CH$_2$)$_{10}$OH

Polymer Synthesis and Characterization. Surface active block copolymers were produced through a straight-forward two step modification of the Kraton PS-b-P(E/B)-b-PI precursor polymers depicted in Scheme 1-2 below. Functionalization of the PI block was achieved through epoxidation of the residual alkene groups followed by subsequent catalytic ring-opening etherification reactions using alcohols carrying PEG550 or F10H10 functionality. Side reactions can provide polymers where various amounts of R(R$_1$ and/or R$_2$) are H, OH, or an ether linkage to another portion of the functionalized poly(isoprene) block, or to another polymer chain.

Scheme 1-2. Synthesis of ether-linked surface active triblock copolymers containing PEG550 and/or F10h10 side chains.

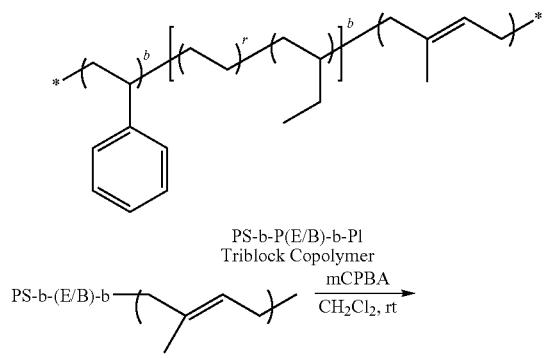

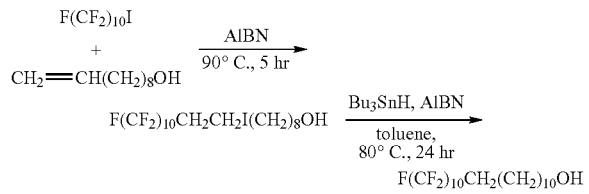

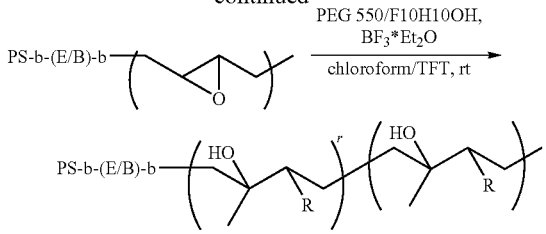

where each R is independently R$_1$ or R$_2$. R$_1$ is —(OCH$_2$CH$_2$)$_{12}$OCH$_3$ ("PEG550") and R$_2$ is —O(CH$_2$)$_{10}$(CF$_2$)$_{10}$F ("F10H10"). Side reactions may also result in R values of H or OH and the like, depending on experimental conditions employed.

In a typical epoxidation reaction, the PS$_{8K}$-b-P(E/B)$_{25K}$-b-PI$_{10K}$ SABC precursor polymer (5 g, 14.5 mmol of reactive isoprene sites) was dissolved in 100 mL of dichloromethane in a round bottomed flask. 3-Chloroperoxybenzoic acid (mCPBA, 3.9 g, 17.4 mmol) was added to the mixture, and the solution was stirred vigorously for 5 hours at room temperature. The polymer was then precipitated in methanol, collected by filtration, and reprecipitated from dichloromethane to remove residual mCPBA and its respective byproducts. The white, rubbery product was dried at room temperature under reduced pressure for 48 hours to remove remaining solvent. An analogous reaction and work-up was used to successfully epoxidize the PS$_{8K}$-b-P(E/B)$_{25K}$-b-PI$_{20K}$ SABC precursor polymer, scaled to 25 mmol of reactive isoprene sites per 5 g of precursor polymer.

$^1$H NMR for epoxidized PS$_{8K}$-b-P(E/B)$_{25K}$-b-PI$_{10K}$ (300 MHz, CDCl$_3$, δ): 6.57, 7.07, (5H, styrene), 2.66 (br s, 1H, epoxidized isoprene, —CH$_2$HCOC(CH$_3$)CH$_2$—), 0.80, 1.07, 1.22, 1.45, 1.57 (back-bone). IR (dry film) υ$_{max}$ (cm$^{-1}$): 2925, 2850 (C—H stretching); 1470 (C—H bending); 1070 (C—O stretching); 880 (C—O—C stretching); 700 (C—H bending, aromatic).

To produce ether-linked side chain surface active block copolymers, 2.1 g of epoxidized PS$_{8K}$-b-P(E/B)$_{25K}$-b-PI$_{10K}$ (5.8 mmol of epoxide) was taken in a round bottom flask in conjunction with a four times molar excess (23.2 mmol) of side-chain precursor alcohol (F10H10OH and/or PEG550). Seven different mixtures of F10H10OH relative to PEG550 were used in the feed to produce a range of different SABCs: 100% F10H10OH, 80% F10H10OH/20% PEG550, 60% F10H10OH/40% PEG550, 50% F10H10OH/50% PEG550, 40% F10H10OH/60% PEG550, 20% F10H10OH/80% PEG550 and 100% PEG550.

The reactants were purged with argon, and subsequently dissolved in about 150 mL of anhydrous chloroform. Anhydrous TFT was added as necessary to solvate the F10H10OH (indicated by the formation of a clear solution). Activated molecular sieves were added to the reaction mixture, which was allowed to stand for about 12 hours. Etherification was performed through the addition of boron trifluoride diethyl etherate catalyst (0.345 g, 2.4 mmol) followed by vigorous stirring at room temperature for at least 48 hours. Following the reaction, 6.25 N sodium hydroxide was added to quench any residual boron catalyst and the reaction mixture was concentrated under reduced pressure using a rotary evaporator. The resultant surface active triblock copolymers (SABCs) were precipitated into methanol, with water added as necessary to help isolate the PEGylated samples. The SABCs were collected by filtration and subsequently reprecipitated twice from chloroform to remove additional residual surface active side-chain alcohol precursors. Finally, the finished samples were dried under reduced pressure at room temperature for 48 hours to fully remove residual solvent.

$^1$H NMR for $PS_{8K}$-b-$P(E/B)_{25K}$-b-$PI_{10K}$ functionalized with PEG550 side chains (300 MHz, $CDCl_3$, δ): 6.56, 7.08, (5H, styrene), 3.63 (br s, 4H —$OCH_2CH_2O$—); 3.38 (s, 3H, —$OCH_3$); 2.24 (s, 1H, —OH); 0.83, 1.06, 1.24, 1.80 (backbone). IR (dry film) $\upsilon_{max}$ ($cm^{-1}$): 3350 (O—H stretching); 2935, 2865 (C—H stretching); 1455, 1375 (C—H bending); 1120 (C—O stretching); 700 (C—H bending, aromatic). Elemental analysis: C (76.1%), H (11.7%).

$^1$H NMR for $PS_{8K}$-b-$P(E/B)_{25K}$-b-$PI_{10K}$ functionalized with F10H10 side chains (300 MHz, $CDCl_3$, δ): 6.57, 7.07, (5H, styrene), 3.50 (br m, 2H —$OCH_2CH_2$—); 2.40 (br s, 2H —$CH_2CH_2CF_2$—); 0.82, 1.04, 1.24, 1.57, 2.03 (back-bone, —$OCH_2(CH_2)_8CH_2CF_2$). IR (dry film) $\upsilon_{max}$ ($cm^{-1}$): 3480 (O—H stretching); 2930, 2860 (C—H stretching); 1460, 1380 (C—H bending); 1220 (C—F stretching); 1090 (C—O stretching); 700 (C—H bending, aromatic). Elemental analysis: C (67.5%), H (9.4%), F (18.3%). Surface active block copolymers incorporating both types of side chain were found to have a blend of peaks that correlated to the amount of incorporation of each moiety.

Surface Preparation and Characterization. Surfaces for NEXAFS measurements, XPS, and dynamic water contact angle analysis were prepared on silicon wafers by spin-coating 3% (w/v) solutions of SABCs in TFT at 2000 rpm for 60 seconds. All surfaces prepared for study were annealed in a vacuum oven at reduced pressure at 120° C. for at least 12 hours followed by slow cooling to room temperature.

XPS measurements were performed using a Kratos Axis Ultra Spectrometer (Kratos Analytical, Manchester, UK) with a monochromatic Al Kα X-ray source (1486.6 eV) operating at 225 W under a vacuum of 1.0×10−8 Torr. Charge compensation was carried out by injection of low-energy electrons into the magnetic lens of the electron spectrometer. The pass energy of the analyzer was set at 40 eV for high-resolution spectra and 80 eV for survey scans, with energy resolutions of 0.05 and 1 eV, respectively. The spectra were analyzed using CasaXPS v.2.3.12Dev4 software. The C—C peak at 285 eV was used as the reference for binding energy calibration.

NEXAFS experiments were carried out on the U7A NIST/Dow materials characterization end-station at the National Synchrotron Light Source at Brookhaven National Laboratory (BNL). The general underlying principles of NEXAFS and a description of the beamline at BNL have been previously reported (Paik et al., S. *Langmuir*, 2007, 23, 5110 and Genzer et al., *Langmuir*, 2000, 16, 1993). The X-ray beam was elliptically polarized (polarization factor=0.85), with the electric field vector dominantly in the plane of the storage ring. The photon flux was about 1×10$^{11}$ photons per second at a typical storage ring current of 500 mA. A spherical grating monochromator was used to obtain monochromatic soft X-rays at an energy resolution of 0.2 eV. The C 1 s NEXAFS spectra were acquired for incident photon energy in the range 270-320 eV. The angle of incidence of the X-ray beam, measured from the sample surface, was 50°. The partial-electron-yield (PEY) signal was collected using a channeltron electron multiplier with an adjustable entrance grid bias (EGB). Data was reported for a grid bias of −150 V. The channeltron PEY detector was positioned in the equatorial plane of the sample chamber and at an angle of 36° relative to the incoming X-ray beam. The PEY C 1 s spectra were normalized by subtracting a linear pre-edge baseline and setting the edge jump to unity at 320 eV. The photon energy was calibrated by adjusting the peak position of the lowest π* phenyl resonance from polystyrene to 285.5 eV.

Water contact angles were measured using a contact angle goniometer (AST Products, Inc. model VCA Optima XE) at room temperature. Dynamic water contact angle measurements were performed through the addition and retraction of a small drop of water (about 2 μL) on the surface. The advancing and receding contact angle behavior was digitally recorded and image analysis software was used to measure the angles.

Preparation of Surfaces for Biofouling Assays. Glass Slides for Biofouling Assays with the green alga *Ulva* and *Navicula* diatoms were prepared as previously reported for SABCs using Kraton G1652M SEBS as a thermoplastic elastomer base layer (Krishnan et al., Langmuir, 2006, 22, 11255). Glass slides coated with SABCs based on the $PS_{8K}$-b-$P(E/B)_{25K}$-b-$PI_{10K}$ precursor for biofouling assays were prepared in an analogous fashion using the newly released Kraton MD6945 SEBS in place of G1652M, to for the bilayer coating. The elastic modulus of MD6945 is very low: 1.6 MPa compared to 13 MPa for G1652, while its chemical composition is similar. Low modulus polymers such as PDMS have been shown to have suitable fouling release characteristics. The elastic modulus of G1652M meanwhile is still roughly an order of magnitude greater than that of PDMS.

For all biofouling assays, glass microscope slides coated with a polydimethylsiloxane elastomer (PDMSe), Silastic® T2 (Dow Corning), prepared as described by Schumacher et al. (*Biofouling*, 2007, 23, 55) and either G1652M or MD6945 SEBS were used as standards. PDMSe was used as a control due to its release properties against macrofouling organisms such as *Ulva* sporelings, while the G1652M or MD6945 base layers were used to highlight the differences in performance between the base layer when used alone and with the multi-layer coatings.

Settlement and Strength of Attachment of *Ulva* Zoospores and Strength of Attachment of *Ulva* Sporelings (Young Plants). Twelve replicate test samples (9 for SABCs based on the $PS_{8K}$-b-$P(E/B)_{25K}$-b-$PI_{20K}$ precursor) were leached in a 30 L tank of recirculating deionized water at about 20° C. for a minimum of 24 hours. The slides were equilibrated in artificial seawater 1 hour prior to the start of the experiments. Zoospores were released from fertile plants of *Ulva linza* and prepared for assay as described previously (Callow et al., *Journal of Phycology*, 1997, 33, 938). A suspension (10 mL; 1×10$^6$ spores per mL) was pipetted into 12 compartments of Quadriperm polystyrene culture dishes (Greiner Bio-One), each containing a test slide. The test slides were incubated in the dark at about 20° C. for 1 hour and gently washed in seawater to remove zoospores that had not settled. Three slides were fixed using 2.5% glutaraldehyde in seawater. These replicates were used to quantify the density of zoospores attached to the surfaces as previously reported (Callow et al., *Biofouling*, 2002, 18, 237).

Three slides coated with the SABCs based on the $PS_{8K}$-b-$P(E/B)_{25K}$-b-$PI_{10K}$ precursor settled with zoospores for 1 hour by the above method, were exposed to a shear stress of 53 Pa created by the turbulent flow of seawater in a specially designed water channel. Following this, slides were fixed in gluteraldehyde as described above. The number of spores remaining attached was compared with unexposed control slides (the same as used to determine settlement).

*Ulva* sporelings (young plants) were cultured on 6 replicates of each coating (Chaudhury et al., *Biofouling*, 2005, 21, 41). After washing, the samples were transferred to dishes containing nutrient enriched seawater for 7 days. Growth was estimated by direct measurement of fluorescence from chlorophyll contained within the chloroplasts of the sporelings using a Tecan plate reader (GENios Plus) (Casse et al., *Biofouling*, 2007, 23, 267). Fluorescence was recorded as Relative Fluorescence Units (RFU) from direct readings. The slides (6 replicates) were read from the top, 300 readings per slide, taken in blocks of 30×10.

The strength of attachment of the sporelings was determined by jet washing using a water jet (Finlay et al., *Biofouling*, 2002, 18, 251). The range of impact pressures used was chosen to provide maximum information on the strength of attachment of the sporelings. RFU readings (80 per slide) were taken from the central part of the slide that was exposed to the water jet. Percentage removal was calculated from the mean RFU reading before and after exposure to the water jet. From the percentage removal data, the critical water pressure required to remove 50% of the sporelings was derived.

Settlement and Strength of Attachment of *Navicula* Diatoms. *Navicula* cells were cultured in F/2 medium contained in 250 mL conical flasks. After 3 days the cells were in log phase growth. Cells were washed 3 times in fresh medium before harvesting and diluted to give a suspension with a chlorophyll a content of approximately 0.25 µg mL$^{-1}$. Cells were settled in individual dishes containing 10 mL of suspension at about 20° C. on the laboratory bench. After 2 hours the slides were gently washed in seawater to remove cells that had not properly attached (submerged wash). Slides were fixed using 2.5% glutaraldehyde in seawater. The density of cells attached to the surface was counted on each slide using an image analysis system attached to a fluorescence microscope. Counts were made for 30 fields of view (each 0.064 mm$^2$) on each slide. Slides settled with *Navicula* were exposed to a shear stress of 23 Pa (32 US gal min$^{-1}$) in a water channel. The number of cells remaining attached was counted using the image analysis system described above.

Results and Discussion.

Polymer Synthesis and Characterization. The synthesis of these two series of amphiphilic SABCs containing mixed discrete hydrophobic semifluorinated side-chains and hydrophilic PEGylatd side chains was closely followed using both infrared spectroscopy and $^1$H NMR. Following the epoxidation reaction, $^1$H NMR clearly showed that there was no longer evidence of any alkene protons, and a significant peak at about 2.7 ppm appeared indicating the presence of protons adjacent to the newly formed oxirane rings on the PI backbone. Additionally, infrared spectroscopy clearly showed the appearance of a C—O—C stretching peak at roughly 880 cm$^{-1}$ associated with the epoxide ring. This indicated that virtually all of the residual unsaturated alkene groups were successfully converted to their epoxidized form.

Subsequent catalytic ring-opening using F10H10OH and/or PEG550 alcohols led to the disappearance of the epoxide peak in the $^1$H NMR spectra. Further analysis of the $^1$H NMR spectra demonstrated the appearance of peaks at about 3.3 and 3.6 ppm for the PEG550 functionalized sample in conjunction with the appearance of a peak at about 3.5 ppm for the F10H10OH functionalized sample demonstrated successful attachment of the side groups. These findings were supported by infrared spectroscopy which demonstrated the appearance of a strong C—O stretching peak at 1120 cm$^{-1}$ for samples functionalized with PEG550 and a strong C—F stretching peak at 1200 cm$^{-1}$ for samples functionalized with F10H10OH. For mixed samples functionalized with both moieties, peak intensity generally varied with the amount of incorporation of the side chain.

Table 1-1 illustrates the percentage of attachment of PEG550 and F10H10OH for each different feed molar ratio for both PS-b-P(E/B)-b-PI precursors. The percentage of PEG550 and F10H10OH successfully attached was calculated by $^1$H NMR integration and elemental analysis of fluorine, respectively. Specifically, the percent attachment of PEG550 was obtained by comparing the total amount of aromatic protons (associated with the PS block) in the $^1$H NMR spectra with the number of protons associated with the PEG side chain. Meanwhile, the weight percent of fluorine obtained by elemental analysis allowed the back calculation of F10H10OH attachment by comparing this value to that which would have been obtained assuming 100% attachment. The attachment of both PEG550 and F10H10OH generally depended on the molar ratios in the feed. The overall attachment relative to epoxidized isoprene was generally about 22 to 30% for the $PS_{8K}$-b-P(E/B)$_{25K}$-b-PI$_{20K}$ precursor and about 33 to 54% for the $PS_{8K}$-b-P(E/B)$_{25K}$-b-PI$_{10K}$ precursor.

TABLE 1-1

Percentage attachment of PEG550 and F10H10OH groups.

| Feed % F10H10 | Feed % PEG550 | Attach % F10H10 | Attach % PEG550 | Overall Attachment | Weight % F | Nomenclature |
|---|---|---|---|---|---|---|
| $PS_{8K}$-b-P(E/B)$_{25K}$-b-PI$_{20K}$ Precursor | | | | | | |
| 20 | 80 | 3 | 28 | 31 | 2.7 | $PS_{8K}$-b-P(E/B)$_{25K}$-b-PI$_{20K}$-3F-28P |
| 40 | 60 | 5 | 18 | 23 | 7.2 | $PS_{8K}$-b-P(E/B)$_{25K}$-b-PI$_{20K}$-5F-18P |
| 60 | 40 | 9 | 13 | 22 | 11.1 | $PS_{8K}$-b-P(E/B)$_{25K}$-b-PI$_{20K}$-9F-13P |
| 80 | 20 | 17 | 7 | 24 | 18.4 | $PS_{8K}$-b-P(E/B)$_{25K}$-b-PI$_{20K}$-17F-7P |
| $PS_{8K}$-b-P(E/B)$_{25K}$-b-PI$_{10K}$ Precursor | | | | | | |
| 0 | 100 | 0 | 33 | 33 | 0 | $PS_{8K}$-b-P(E/B)$_{25K}$-b-PI$_{10K}$-0F-33P |
| 20 | 80 | 22 | 27 | 49 | 8.4 | $PS_{8K}$-b-P(E/B)$_{25K}$-b-PI$_{10K}$-22F-27P |
| 40 | 60 | 19 | 28 | 47 | 6.9 | $PS_{8K}$-b-P(E/B)$_{25K}$-b-PI$_{10K}$-19F-28P |
| 50 | 50 | 24 | 24 | 48 | 9.2 | $PS_{8K}$-b-P(E/B)$_{25K}$-b-PI$_{10K}$-24F-24P |
| 60 | 40 | 28 | 19 | 47 | 10.4 | $PS_{8K}$-b-P(E/B)$_{25K}$-b-PI$_{10K}$-28F-19P |
| 80 | 20 | 41 | 13 | 54 | 15.2 | $PS_{8K}$-b-P(E/B)$_{25K}$-b-PI$_{10K}$-41F-13P |
| 100 | 0 | 50 | 0 | 50 | 18.3 | $PS_{8K}$-b-P(E/B)$_{25K}$-b-PI$_{10K}$-50F-0P |

Using GPC, the polydispersity of the samples was found to increase from 1.06 for both of the PS-b-P(E/B)-b-PI precursors to about 1.12 for their epoxidized forms. Finished, substituted SABC samples containing F10H10 and/or PEG550 side chains generally had a polydispersity between 1.2 and 1.3. This rise in polydispersity combined with the observation of complete reaction of the epoxide despite less than 100% attachment suggested that some of the epoxide was most likely lost to intermolecular cross linking reactions. Intramolecular reactions in combination with epoxide ring-opening by residual water molecules in the reaction mixture may have contributed to the lowered observed attachment.

Dynamic Water Contact Angles. For the samples derived from the $PS_{8K}$-b-$P(E/B)_{25K}$-b-$PI_{20K}$ precursor polymer, advancing and receding water contact angles seemed largely dependent on the amount of hydrophobic F10H10 and hydrophilic PEG550 side chains that were incorporated in the SABC (Table 1-2). As the amount of PEG550 incorporated in the coating increased in conjunction with a decrease in the amount of F10H10, water contact angles decreased from 1280 to 103° (advancing) and from 67° to 28° (receding), suggesting that the presence of the surface active groups was greatly influencing wettability. The samples derived from the $PS_{8K}$-b-$P(E/B)_{25K}$-b-$PI_{10K}$ precursor polymer did not show quite as clear a trend however, with all the coatings except for $PS_{8K}$-b-$P(E/B)_{25K}$-b-$PI_{10K}$-0F-33P showing an advancing water contact angle on the order of about 125°. Receding angles did show a slight trend however, varying from 21° for $PS_{8K}$-b-$P(E/B)_{25K}$-b-$PI_{10K}$-0F-33P to 42° for $PS_{8K}$-b-$P(E/B)_{25K}$-b-$PI_{10K}$-50F-0P. High water contact angle hysteresis was demonstrated for both sets of SABCs, suggesting a dynamic surface capable of significant reorganization was realized in all cases. Contact angle hysteresis was generally more pronounced for polymers derived from the $PS_{8K}$-b-$P(E/B)_{25K}$-b-$PI_{10K}$ precursor however. These observed differences in wettability behavior between each set of SABCs may be attributed to the combination of higher attachment and significantly higher side chain grafting density realized for the $PS_{8K}$-b-$P(E/B)_{25K}$-b-$PI_{10K}$ derived samples.

TABLE 1-2

Advancing and receding dynamic water contact angle measurements for SABCs.

| Sample | Θw, a | Θw, r |
|---|---|---|
| $PS_{8K}$-b-$P(E/B)_{25K}$-b-$PI_{20K}$ Precursor | | |
| $PS_{8K}$-b-$P(E/B)_{25K}$-b-$PI_{20K}$-3F-28P | 103 ± 5 | 28 ± 3 |
| $PS_{8K}$-b-$P(E/B)_{25K}$-b-$PI_{20K}$-5F-18P | 118 ± 4 | 48 ± 3 |
| $PS_{8K}$-b-$P(E/B)_{25K}$-b-$PI_{20K}$-9F-13P | 124 ± 2 | 54 ± 2 |
| $PS_{8K}$-b-$P(E/B)_{25K}$-b-$PI_{20K}$-17F-7P | 128 ± 4 | 67 ± 4 |
| $PS_{8K}$-b-$P(E/B)_{25K}$-b-$PI_{10K}$ Precursor | | |
| $PS_{8K}$-b-$P(E/B)_{25K}$-b-$PI_{10K}$-0F-33P | 104 ± 3 | 21 ± 4 |
| $PS_{8K}$-b-$P(E/B)_{25K}$-b-$PI_{10K}$-22F-27P | 125 ± 3 | 25 ± 3 |
| $PS_{8K}$-b-$P(E/B)_{25K}$-b-$PI_{10K}$-19F-28P | 128 ± 3 | 26 ± 4 |
| $PS_{8K}$-b-$P(E/B)_{25K}$-b-$PI_{10K}$-24F-24P | 128 ± 3 | 27 ± 4 |
| $PS_{8K}$-b-$P(E/B)_{25K}$-b-$PI_{10K}$-28F-19P | 127 ± 3 | 28 ± 3 |
| $PS_{8K}$-b-$P(E/B)_{25K}$-b-$PI_{10K}$-41F-13P | 127 ± 2 | 31 ± 2 |
| $PS_{8K}$-b-$P(E/B)_{25K}$-b-$PI_{10K}$-50F-0P | 126 ± 2 | 42 ± 4 |

Figure 1:
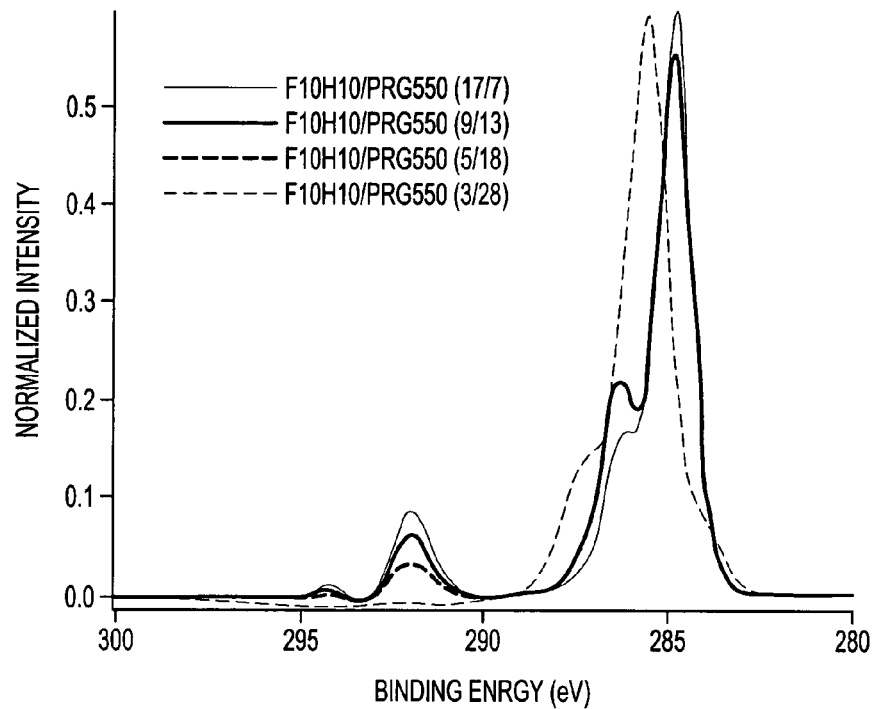
FIG. 1 illustrates an X-ray photoelectron spectroscopy (XPS) spectra of the surfaces of amphiphilic SABCs derived from the $PS_{8K}$-b-P(E/B)$_{25K}$-b-$PI_{20K}$ precursor polymer taken at a 0° incident angle, according to one embodiment.

X-Ray Photoelectron Spectroscopy (XPS). FIG. 1 shows high-resolution C 1 s XPS spectra of amphiphilic SABCs derived from the $PS_{8K}$-b-$P(E/B)_{25K}$-b-$PI_{20K}$ precursor with different attachment percents of PEG550 and F10H10. The spectra are normalized so that the total area under the carbon peaks is equal to unity. All polymers showed strong intensity peaks from C=C and C—C near 285 eV, indicative of the block copolymer backbone. There was clear evidence for all but the least fluorinated sample of peaks associated with —$CF_2$— and —$CF_3$ near 292 and 294 eV, respectively. The intensities of both —$CF_2$— and —$CF_3$ decreased with increasing attachment of PEG550 and decreasing attachment of F10H10 in the mixture. The spectra for $PS_{8K}$-b-$P(E/B)_{25K}$-b-$PI_{20K}$-3F-28P seemed to have no evidence of —$CF_2$— and —$CF_3$. However, the polymer contained a small amount of the fluorinated moiety based on both infrared spectroscopy and elemental analysis. Thus, for this sample the fluorinated groups may be obscured by the relatively large amounts of PEG550, making detection difficult. Additionally, a pronounced shoulder at about 287 eV associated with C—O became increasingly apparent with increasing incorporation of PEG550 side chain, indicating the presence of this moiety near the surface.

Near-Edge X-Ray Adsorption Fine Structure (NEXAFS) Analysis.

Normalized C 1 s NEXAFS spectra of spin-coated surfaces of amphiphilic SABCs derived from the $PS_{8K}$-b-$P(E/B)_{25K}$-b-$PI_{20K}$ precursor with different amounts of PEG550 and F10H10 side chains attached taken at an angle of 50° between the surface and the soft X-ray beam were recorded. The characteristic C 1 s→$\pi^*_{C=C}$ signals derived from the polystyrene block were observed near 285.5 eV for all four of the spectra, but the intensity of this peak was low because the SABC surfaces were dominated by the PEG550 and F10H10 side chains. Other peak assignments were based on calibrated NEXAFS spectra of poly(ethylene oxide) and poly(methyl methacrylate) as discussed in Krishnan et al. (Langmuir, 2006, 22, 5075).

A sharp resonance peak near 288 eV was be attributed to the C 1 s→$\sigma^*_{C-H}$ signal. This peak was particularly prevalent for the $PS_{8K}$-b-$P(E/B)_{25K}$-b-$PI_{20K}$-3F-28P sample, likely due to the absence of fluorinated moieties, indicating a surface dominated by some combination of PEG and the low surface energy P(E/B) block. The characteristic signals near 293 eV and 295.8 eV was clearly observed in the other three samples, indicative of both the C 1 s→$\sigma^*_{C-F}$ and C 1 s→$\sigma^*_{C-O}$ resonances, demonstrating the presence of the semifluorinated groups on the surfaces with possible contributions from the PEG containing side chains. However, little evidence of C 1s→$\sigma^*_{C-F}$ signal could be detected for the $PS_{8K}$-b-$P(E/B)_{25K}$-b-$PI_{20K}$-3F-28P sample, likely because of the small amount of fluorine (2.7 wt %). The intensity profiles of C 1 s $\sigma^*_{C-F}$ signal were quite similar to those in XPS spectra, which decreased with increasing incorporation of PEG550 and decreasing incorporation of F10H10OH in the mixture.

Normalized C 1 s NEXAFS spectra of spin-coated surfaces of amphiphilic SABCs derived from the $PS_{8K}$-b-$P(E/B)_{25K}$-b-$PI_{10K}$ precursor with different amounts of PEG550 and F10H10 side chains attached taken at an angle of 50° between the surface and the soft X-ray beam were recorded. The data very closely correlates to that for the $PS_{8K}$-b-$P(E/B)_{25K}$-b-$PI_{20K}$ derived samples with the same signals present. Of particular interest are the $PS_{8K}$-b-$P(E/B)_{25K}$-b-$PI_{10K}$-50F-0P and $PS_{8K}$-b-$P(E/B)_{25K}$-b-$PI_{10K}$-0F-33P samples that effectively demonstrate the characteristics of a surface with solely PEG550 or F10H10 side chains present.

Settlement and Removal of *Ulva* Spores and Removal of *Ulva* Sporelings.

Figure 2A:
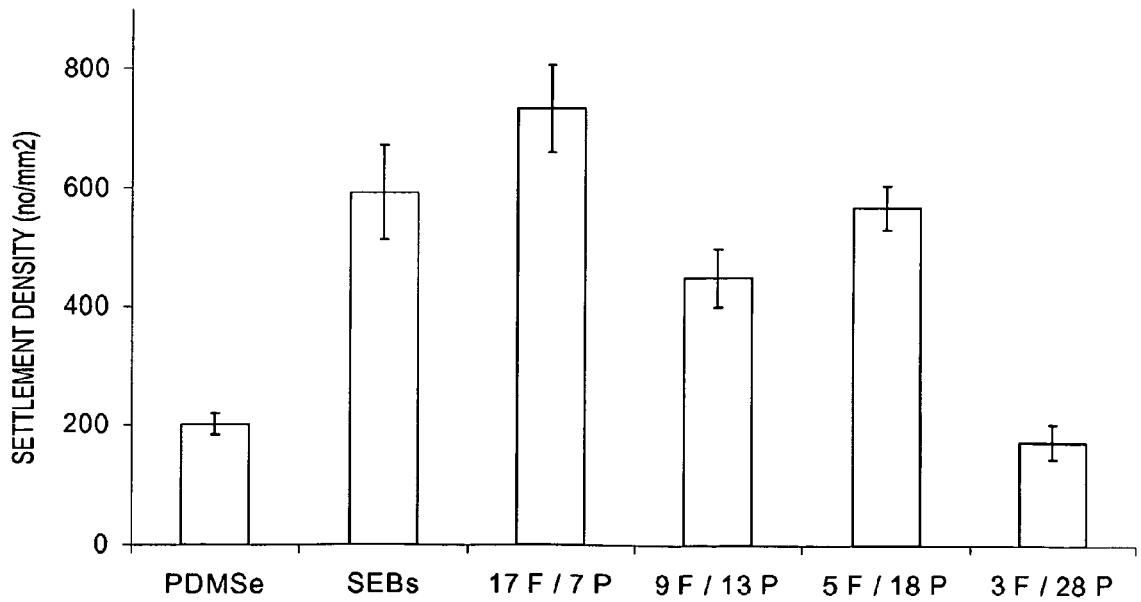
FIG. 2 illustrates: A) The settlement of Ulva spores on G1652M SEBS, PDMSe and $PS_{8K}$-b-P(E/B)$_{25K}$-b-$PI_{20K}$ derived amphiphilic SABCs. Each point is the mean from 90 counts on 3 replicate slides. Bars show 95% confidence limits. B) The growth of Ulva sporelings on G1652M SEBS, PDMSe and $PS_{8K}$-b-P(E/B)$_{25K}$-b-$PI_{20K}$ derived amphiphilic SABCs. Each point is the mean biomass from 6 replicate slides measured using a fluorescence plate reader. Bars show standard error of the mean. C) The removal of Ulva sporelings from G1652M SEBS, PDMSe and $PS_{8K}$-b-P(E/B)$_{25K}$-b-$PI_{20K}$ derived amphiphilic SABCs. Slides were exposed to a water jet over a range of pressures. One slide was used for each pressure.
Figure 2B:
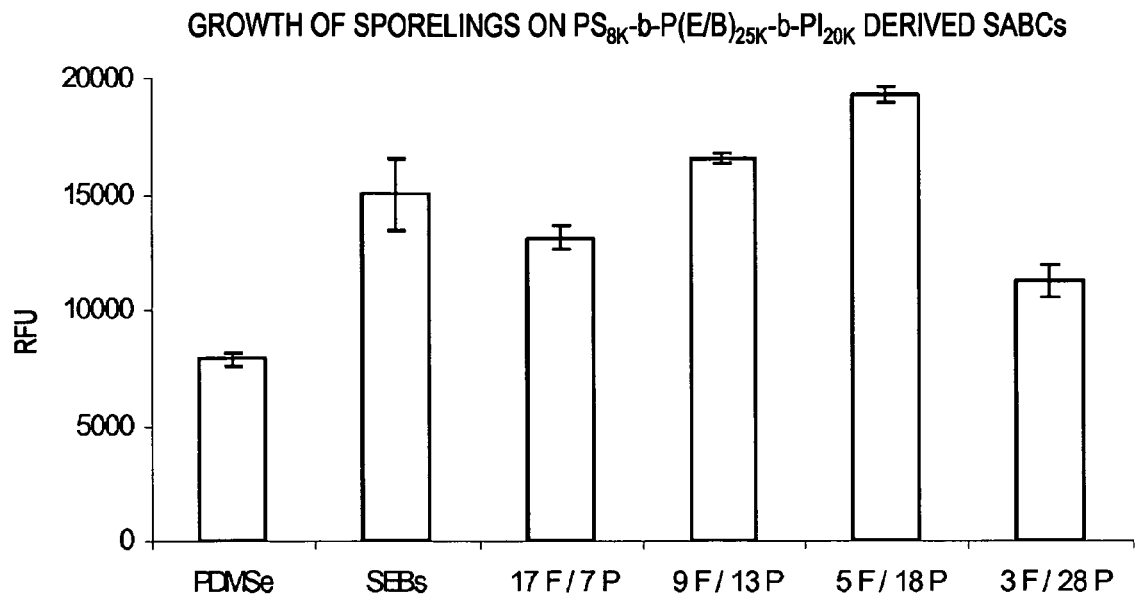
Figure 2C:
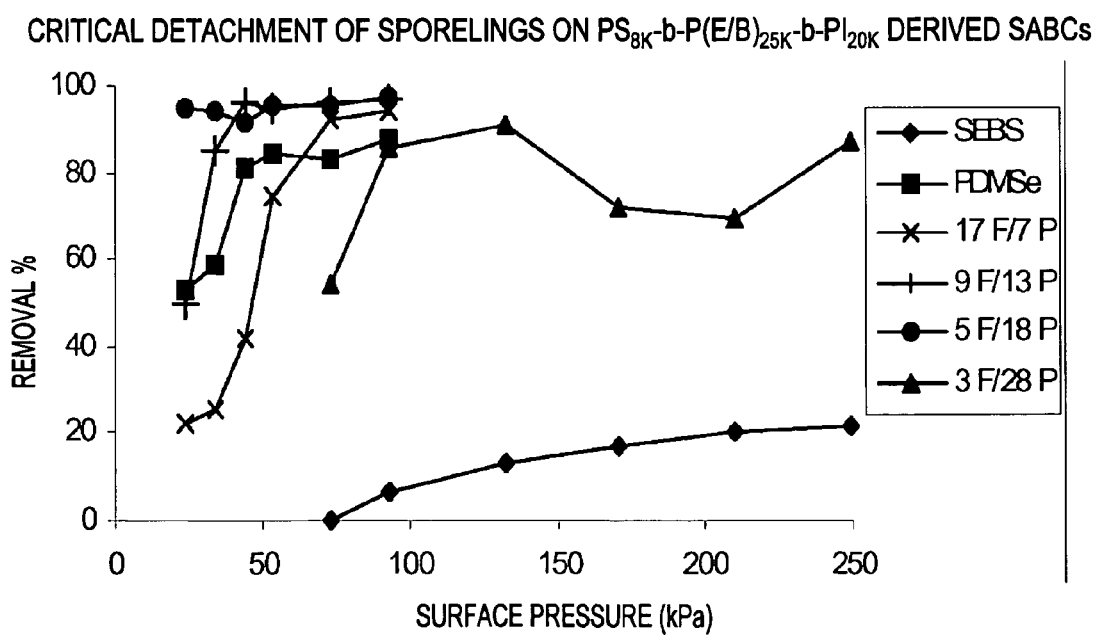

FIG. 2A shows the settlement density of *Ulva* spores on PDMSe, G1652M SEBS and amphiphilic SABCs derived from the $PS_{8K}$-b-$P(E/B)_{25K}$-b-$PI_{20K}$ precursor. For the coatings, the lowest settlement was shown on the surface with 3% attachment of F10H10 and 28% attachment of PEG550. Meanwhile, the growth of *Ulva* sporelings, depicted in FIG. 2B, largely reflected the number of spores settled, confirming no unexpected toxicity from the experimental coatings. The percentage removal of *Ulva* sporelings from the experimental coatings at a range of applied water jet pressures is shown in FIG. 2C.

Sporelings were removed from the PDMSe standard at low water jet pressures reflecting the fouling-release characteristics of this low surface energy elastomer (Krishnan et al., *Biomacromolecules*, 2006, 7, 1449 and Casse et al., *Biofouling*, 2007, 23, 267). The applied water jet pressure required to remove *Ulva* sporelings from the amphiphilic SABCs surfaces derived from the $PS_{8K}$-b-$P(E/B)_{25K}$-b-$PI_{20K}$ precursor largely depended on the incorporation of PEG550 and F10H10 side-chains. The surface with 3% attachment of F10H10 and 28% attachment of PEG550, which demonstrated the lowest spore settlement, required the highest applied water jet pressure of the four surfaces. It was notable that the surfaces derived from the $PS_{8K}$-b-$P(E/B)_{25K}$-b-$PI_{20K}$-5F-18P and $PS_{8K}$-b-$P(E/B)_{25K}$-b-$PI_{20K}$-9F-13P SABCs required lower impact pressure than PDMSe for effective *Ulva* sporeling release. This was evident for the surface of $PS_{8K}$-b-$P(E/B)_{25K}$-b-$PI_{20K}$-5F-18P, for which about 95% sporelings were removed from the surface with an applied water jet pressure of only 24 kPa, reflecting the excellent fouling-release properties of this polymer. The set of SABCs derived from the $PS_{8K}$-b-$P(E/B)_{25K}$-b-$PI_{10K}$ polymer were also evaluated for *Ulva* spore settlement, and *Ulva* sporeling growth and release.

Figure 3A:
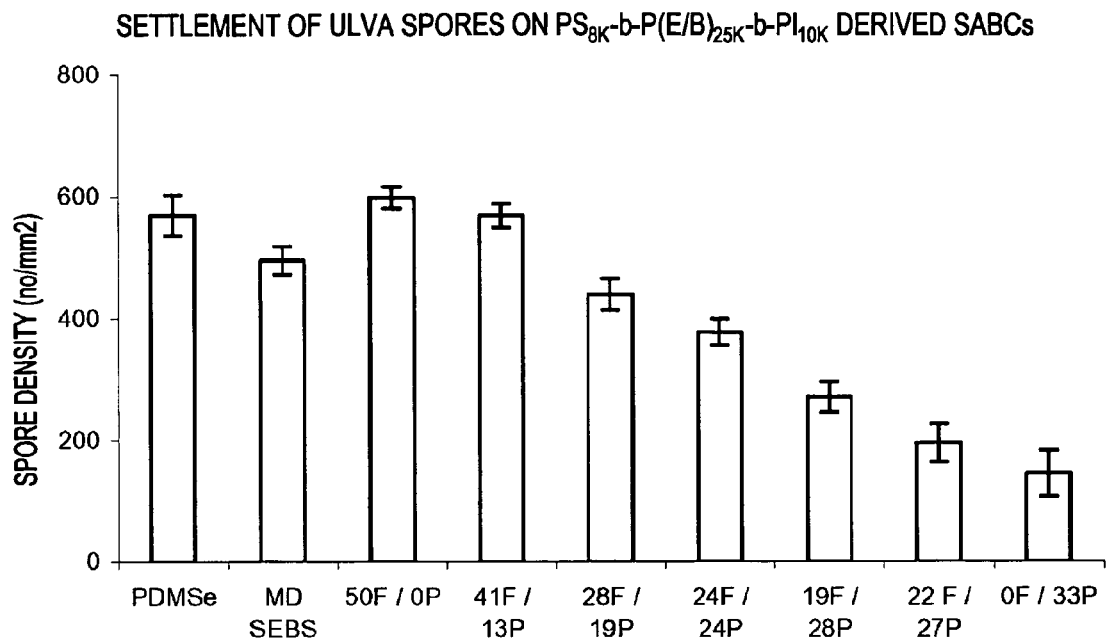
FIG. 3 illustrates: A) The settlement densities of Ulva spores on $PS_{8K}$-b-P(E/B)$_{25}$K-b-$PI_{10K}$ derived SABCs. B) The removal of Ulva spores from $PS_{8K}$-b-P(E/B)$_{25K}$-b-$PI_{10K}$ derived SABCs coatings. Each point is the mean from 90 counts on 3 replicate slides. Bars show 95% confidence limits.
Figure 3B:
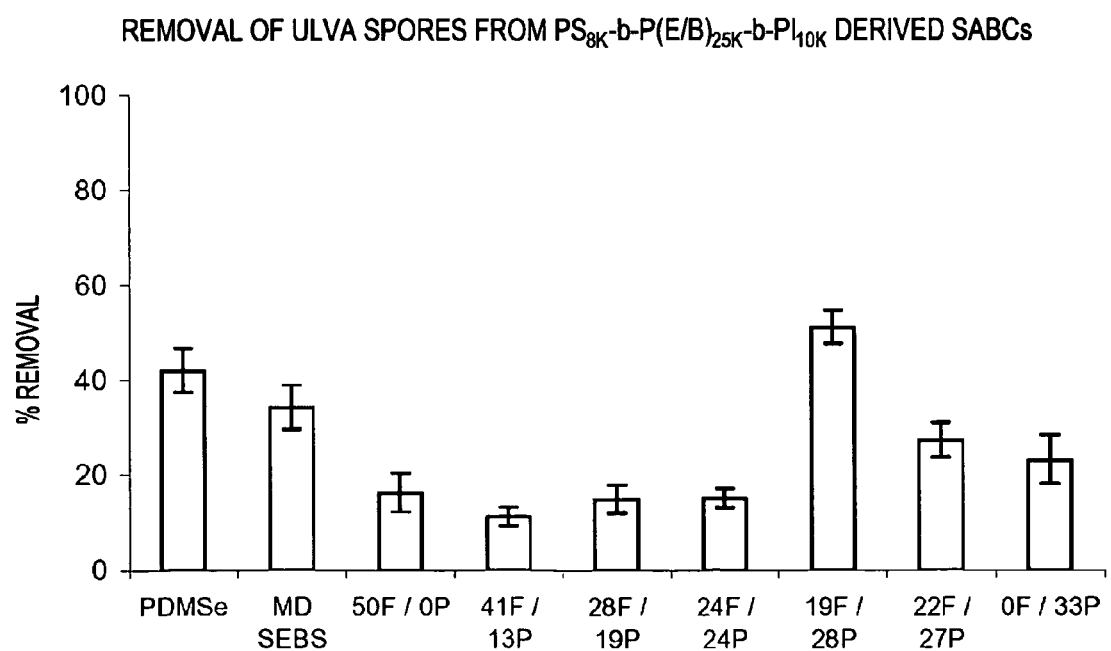

FIG. 3A shows the settlement density of *Ulva* spores on PDMSe, MD6945 SEBS and SABCs derived from the $PS_{8K}$-b-$P(E/B)_{25K}$-b-$PI_{10K}$ precursor. Trends correlated very closely with the $PS_{8K}$-b-$P(E/B)_{25K}$-b-$PI_{20K}$ derived samples, with the samples incorporating greater amounts of the PEG550 side chain showing the lowest settlement. As expected in this case, the hydrophobic PDMSe control showed a high amount of settlement. The removal of *Ulva* spores for the $PS_{8K}$-b-$P(E/B)_{25K}$-b-$PI_{10K}$ derived samples (FIG. 3B) showed a trend similar to that which was seen for *Ulva* sporeling release from the $PS_{8K}$-b-$P(E/B)_{25K}$-b-$PI_{20K}$ derived samples with some mixture of hydrophilic PEG550 and hydrophobic F10H10 side chains providing exceptional release properties. For example, the polymer with 19% attachment of F OHIO side chains and 28% attachment of PEG550 side chains show about 51% removal of *Ulva* spores, significantly better than the 42% removal demonstrated by the PDMSe control.

Figure 4A:
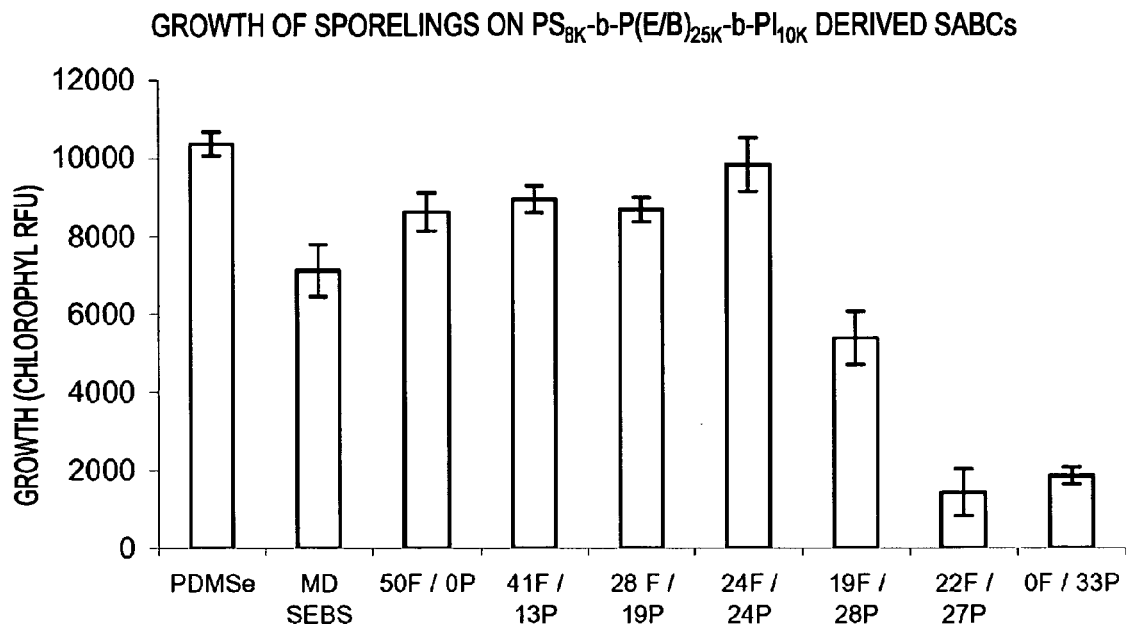
FIG. 4 illustrates: A) The growth of Ulva sporelings on $PS_{8K}$-b-P(E/B)$_{25}$K-b-$PI_{10K}$ derived SABCs after 7 days. Each point is the mean biomass from 6 replicate slides measured using a fluorescence plate reader (RFU; relative fluorescence unit). Bars show standard error of the mean. B) Detachment of Ulva sporelings from $PS_{8K}$-b-P(E/B)$_{25K}$-b-$PI_{10K}$ derived SABCs. Coated slides were exposed to the water jet over a range of water pressures. One slide was used at each pressure.
Figure 4B:
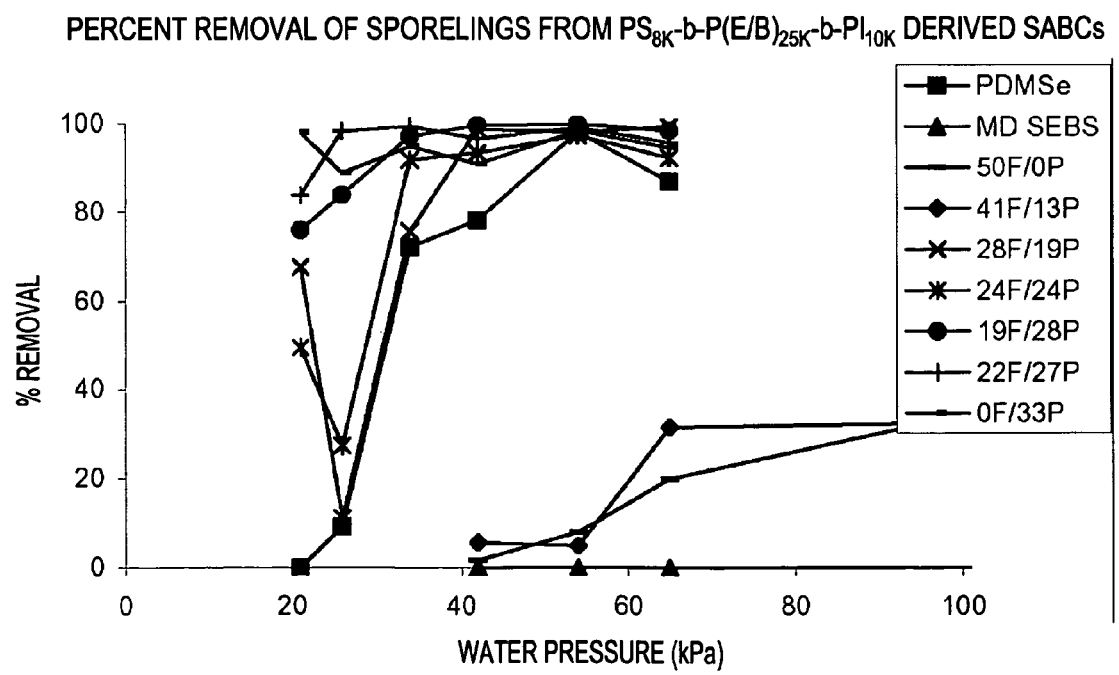

Another test with regards to bulk and surface characterization (derived from 22% attachment of F10H10 side chains and 27% attachment of PEG550 side chains) demonstrated about 27% removal of *Ulva* spores, indicating that the optimal "mixture" of side chains for *Ulva* spore release may be sensitive and may still be further optimized. Growth of *Ulva* sporelings as depicted in FIG. 4A was generally consistent with the settlement density of spores, suggesting no inherent coating toxicity. FIG. 4B depicts the results of removal testing of the *Ulva* sporelings using a range of water jet pressures. Both $PS_{8K}$-b-$P(E/B)_{25K}$-b-PI derived coatings incorporating slightly more PEGylated than fluorinated side chains, along with the purely PEGylated samples, showed good fouling-release characteristics.

In view of these experiments, in conjunction with the spore release data, the sample incorporating 19% F10H10 and 28% PEG550 side chains appears to be highly effective with regard to *Ulva* spore settlement, release, and growth and release of sporelings.

Table 1-3 summarizes the estimated critical pressure to release 50% of the attached *Ulva* sporelings for both sets of coatings. The combination of the $PS_{8K}$-b-$P(E/B)_{25K}$-b-$PI_{10K}$ derived SABCs with the MD6945 thermoplastic elastomer base layer led to a wide range of coatings that perform similar or better than the PDMSe control.

TABLE 1-3

Critical surface pressures for 50% removal of *Ulva* sporeling biofilm derived from *Ulva* sporeling removal curves in FIGS. 2C and 4B.

| Sample | Est. Surface Pressure for 50% Removal (kPa) |
|---|---|
| $PS_{8K}$-b-$P(E/B)_{25K}$-b-$PI_{20K}$ Precursor | |
| $PS_{8K}$-b-$P(E/B)_{25K}$-b-$PI_{20K}$-3F-28P | 70 |
| $PS_{8K}$-b-$P(E/B)_{25K}$-b-$PI_{20K}$-5F-18P | <25 |
| $PS_{8K}$-b-$P(E/B)_{25K}$-b-$PI_{20K}$-9F-13P | 25 |
| $PS_{8K}$-b-$P(E/B)_{25K}$-b-$PI_{20K}$-17F-7P | 45 |
| PDMSe | 25 |
| G165M SEBS | >250 |
| $PS_{8K}$-b-$P(E/B)_{25K}$-b-$PI_{10K}$ Precursor | |
| $PS_{8K}$-b-$P(E/B)_{25K}$-b-$PI_{10K}$-0F-33P | <21 |
| $PS_{8K}$-b-$P(E/B)_{25K}$-b-$PI_{10K}$-22F-27P | <21 |
| $PS_{8K}$-b-$P(E/B)_{25K}$-b-$PI_{10K}$-19F-28P | <21 |
| $PS_{8K}$-b-$P(E/B)_{25K}$-b-$PI_{10K}$-24F-24P | 29 |
| $PS_{8K}$-b-$P(E/B)_{25K}$-b-$PI_{10K}$-28F-19P | 31 |
| $PS_{8K}$-b-$P(E/B)_{25K}$-b-$PI_{10K}$-41F-13P | 165 |
| $PS_{8K}$-b-$P(E/B)_{25K}$-b-$PI_{10K}$-50F-0P | 250 |
| PDMSe | 31 |
| MD 6945 SEBS | >288 |

Figure 5A:
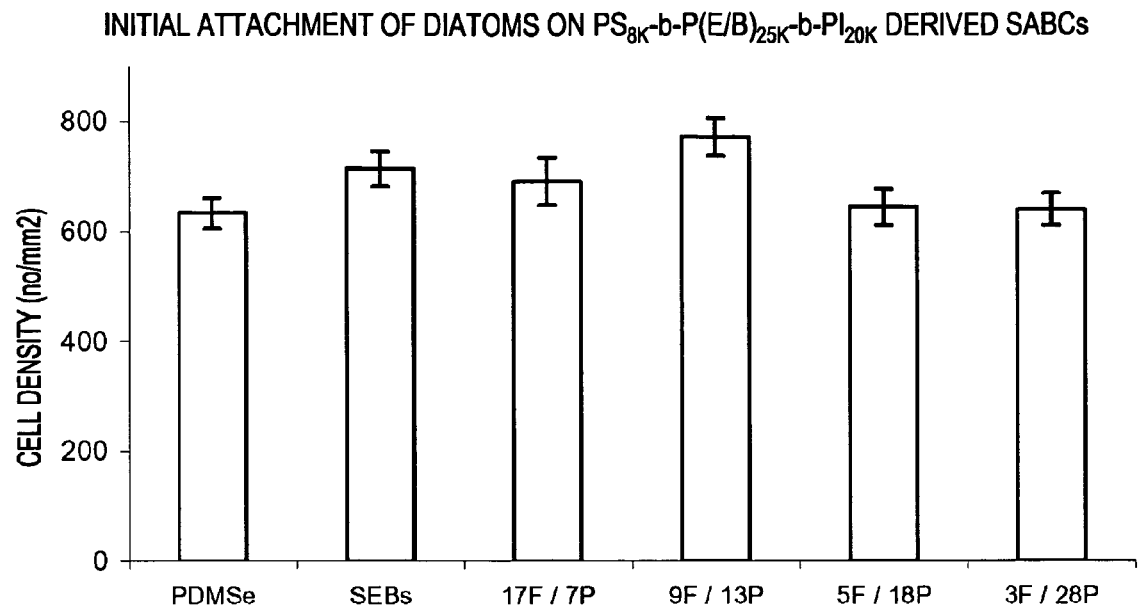
FIG. 5 illustrates: A) Initial attachment after gentle washing of Navicula diatoms to $PS_{8K}$-b-P(E/B)$_{25K}$-b-$PI_{20K}$ derived amphiphilic SABCs. B) Detachment of Navicula diatoms from $PS_{8K}$-b-P(E/B)$_{25K}$-b-$PI_{20K}$ derived amphiphilic SABCs as a result of exposure to a shear stress of 23 Pa. Each point is the mean from 90 counts on 3 replicate slides. Bars show 95% confidence limits.
Figure 5B:
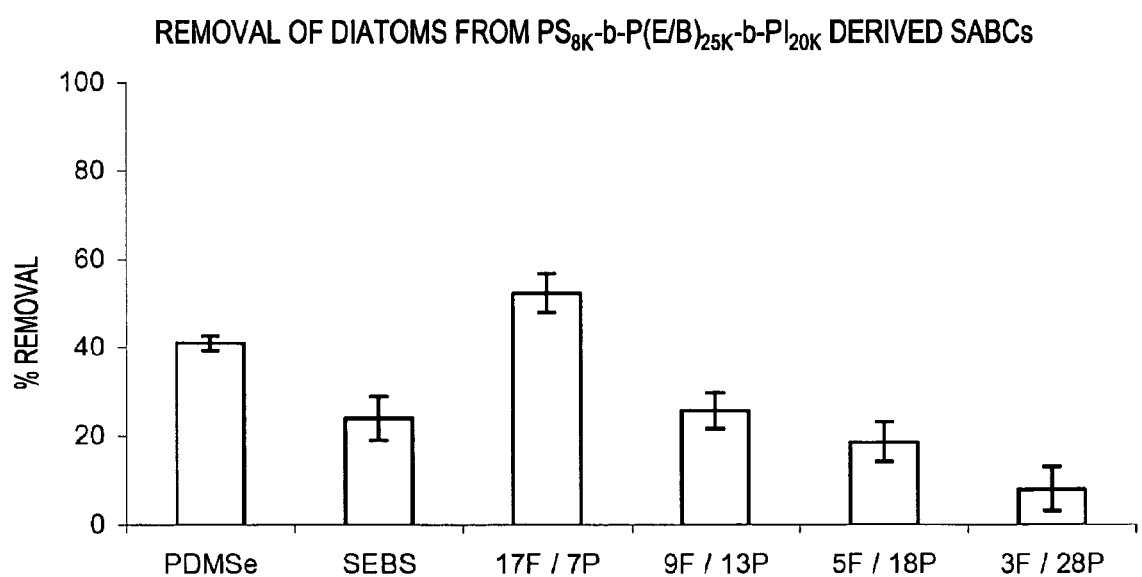

Settlement and Removal of *Navicula* Diatoms. The behaviors of *Navicula* diatoms with regards to settlement and release on PDMSe, G1652M SEBS and amphiphilic SABCs derived from $PS_{8K}$-b-$P(E/B)_{25K}$-b-$PI_{20K}$ was different from what was observed for *Ulva* settlement and release on these surfaces. The settlement densities in FIG. 5A do not show significant differences among the surfaces, likely due to *Navicula's* behavior as a gravitational settler (exploration of the surface in a similar manner as *Ulva* spores cannot be performed). The detachment of *Navicula* in the water flow channel, depicted in FIG. 5B, was dependent on the relative incorporation of PEG550 to F10H10 in the polymer. The removal steadily increased with increasing incorporation of F10H10 side-chains. The surface with 17% attachment of F10H10 and 7% attachment of PEG550 showed the highest removal of *Navicula* diatoms (~52%) among the experimental surfaces, significantly higher than that for the PDMSe control (~41%). This trend of increasing *Navicula* diatom removal with increasing incorporation of hydrophobic chemical moieties is counter to the usually observed behavior of *Navicula* strength of adhesion increasing with increasing hydrophobicity (Krishnan et al., *Biomacromolecules*, 2006, 7, 1449), which indicates the ability of the coating surface to readily reorganize in an aqueous environment.

Figure 6:
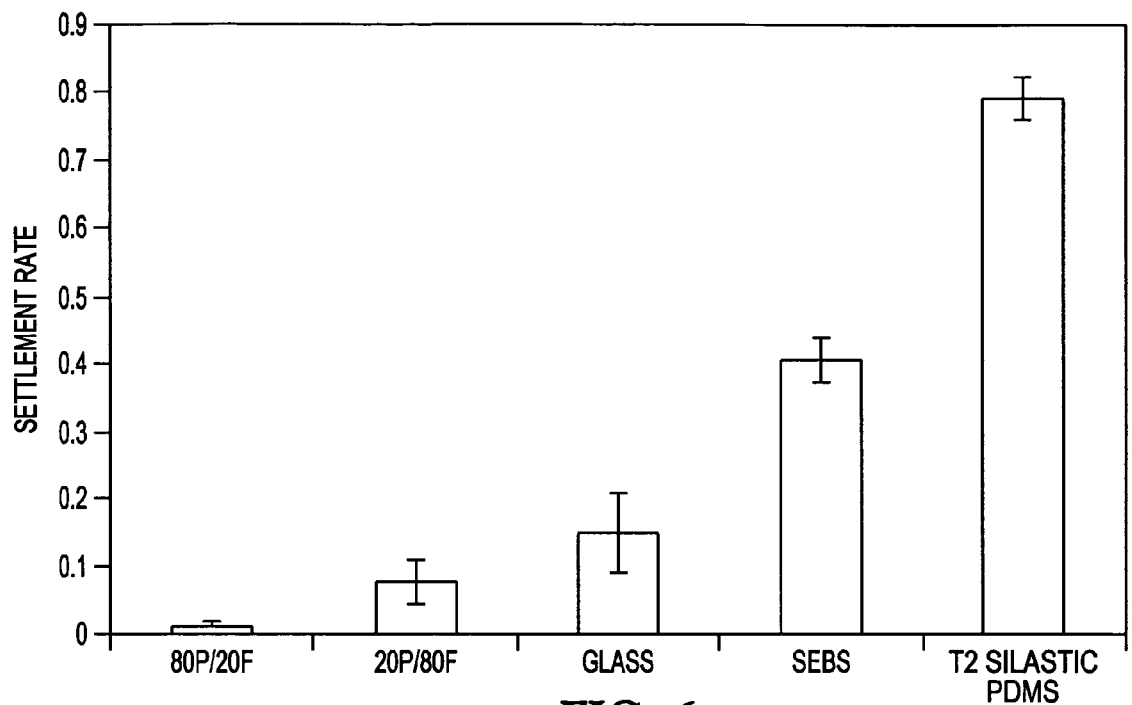
FIG. 6 illustrates mean relative barnacle cyprid larvae settlement on two mixed SABC coatings compared to glass, SEBS, and PDMS controls. Settlement 'rate' is the fraction of larvae (present in the larval suspension used in the assay) that settle on the test surfaces.

In summary, amphiphilic marine antifouling/fouling-release coatings were developed by chemical modification of two different polystyrene-block-poly(ethylene-ran-butylene)-block-polyisoprene ABC triblock copolymers with different combinations of hydrophilic PEG550 and hydrophobic F10H10 side chains. Resultant polymers were characterized using a combination of infrared spectroscopy, $^1$H NMR spectroscopy, and elemental analysis, confirming a broad range of different relative amounts of PEG550 and F10H10 incorporation. The surfaces of the polymers showed high water contact angle hysterisis suggesting a dynamic surface capable of significant reorganization. An increase in the incorporation of F10H10 side-chains to the polymer resulted in an increase in the intensity of the —$CF_2$— and —$CF_3$ peaks for C 1 s XPS analysis and 1s→σ*$_{C-F}$ resonance for C 1 s NEXAFS measurements, indicating segregation of this low surface energy moiety to the surface. Barnacle cyprid larvae settlement assays on both the 20%-PEG550/80%-F10H10 (80P/20F)

and the 80%-PEG550/20%-F10H10 (20P/80F) PS-b-P(E/B)-b-PI surface active block copolymer coatings showed significantly less settlement than SEBS and T2 silastic PDMS controls (see FIG. 6).

The settlement and removal of *Ulva* spores/sporelings and *Navicula* diatoms showed different behavioral trends. In general, the lowest settlement for *Ulva* spores were seen for coatings with a large amount of PEG550 side-chains incorporated. *Navicula* settlement was similar across all coatings tested. Analysis of *Ulva* spore removal using a flow channel and *Ulva* sporeling removal using a water jet suggested that optimal mixtures of hydrophobic and hydrophilic side chains can be obtained with bias toward a majority incorporation of PEG550. *Navicula* diatoms showed more straightforward detachment results, with removal favored on the coatings containing the greatest amount of hydrophobic F10H10 moieties.

Example 2

Antifouling ABC Triblock Copolymers with Grafted Functionality

A series of poly(styrene)-block-poly(ethylene-ran-butylene)-block-poly(isoprene) (PS-b-P(E/B)-b-PI) based ABC triblock SABCs were synthesized. Semifluorinated, PEGylated, and amphiphilic ethoxylated fluoroalkyl side ("AMP") chains were all incorporated as grafted surface active side chains. Polymer modification was performed using a simple two step etherification synthesis. Biofouling assays of the green alga *Ulva* and *Navicula* diatoms were conducted. Surface structure was probed using contact angle analysis and near edge X-ray absorption fine structure (NEXAFS). All three SABCs showed effective antifouling and fouling release behaviors with the amphiphilic side chain SABC showing good results for both *Ulva* and *Navicula*.

Block copolymers with grafted functional side chains can be used as the surface layer of a multilayer antifouling/fouling-release coating system. Hydrophobic, semifluorinated side chains were used to control surface energy. Hydrophilic, poly(ethylene glycol) (PEG) containing side chains were used to provide the polymer with PEG's propensity to resist protein adsorption. Amphiphilic, ethoxylated fluoroalkyl side chains provided ambiguous wettability characteristics.

Materials. A PS-b-P(E/B)-b-PI triblock copolymer was synthesized, at large scale (0.5 kg), to a specifically tailored molecular architecture with high monodispersity (PDI≈1.06). Poly(ethylene glycol) methyl ether (average $M_n$≈550 g/mol, PEG550) and the ethoxylated fluoroalkyl surfactant, Zonyl® FSO-100 (average $M_n$≈725 g/mol according to the supplier), were obtained from Sigma-Aldrich and were used as received. The semifluorinated alcohol, 10-perfluoro-decyl-1-decanol (F10H10) was prepared as described in Example 1 above.

Synthesis and Characterization. The PS-b-P(E/B)-b-PI derived SABCs were synthesized as illustrated in Scheme 2-1 below. The precursor PS-b-P(E/B)-b-PI triblock copolymer was produced by a combination of anionic polymerization and catalytic hydrogenation.

Scheme 2-1. General scheme for producing PS-b-P(E/B)-b-PI derived ABC triblock SABCs.

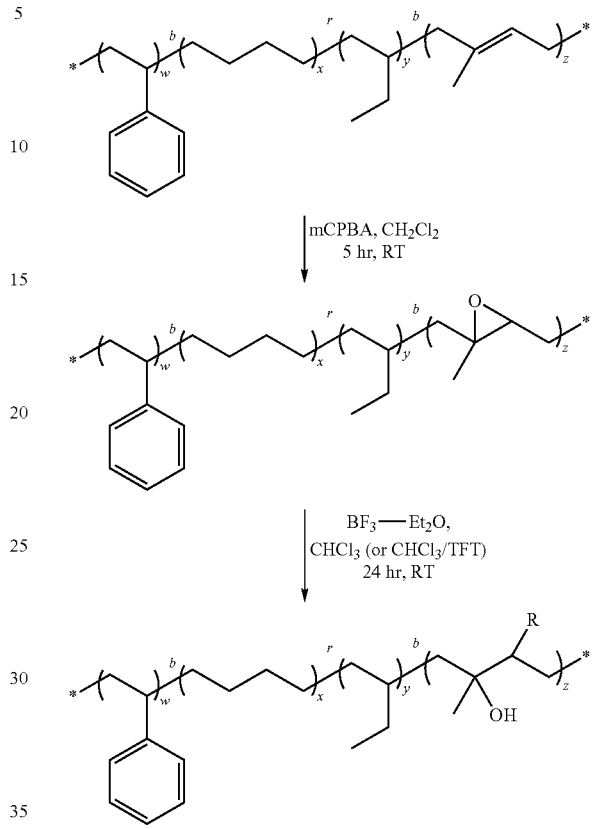

where each R is independently $R_1$, $R_2$, or $R_3$. $R_1$ is —$(OCH_2CH_{12})_{12}OCH_3$ (PEG550), $R_2$ is —$O(CH_2)_{10}(CF_2)_{10}F$ (F10H10), and $R_3$ is —$(OCH_2CH_2)_q(CF_2CF_2)_rF$ (ethoxylated fluoroalkyl, "AMP"); where each q is 1 to about 25, and each r is 0 to about 18; w is about 75, x+y is about 600, and z is about 150 or about 300.

The $R_3$ side chains were obtained by oxirane ring opening reactions using Zonyl® FSO-100 surfactant. The variables q and r are typically about 3 to about 15 each. Side reactions may also result in $R_{1-3}$ values of H or OH and the like, or they may be another polymer chain due to a side reaction with another oxirane group, depending on the reaction conditions employed.

The residual unsaturated carbon-carbon bonds of the PI block of PS-b-P(E/B)-b-PI were epoxidized using mCPBA in dichloromethane. The product was precipitated in cold methanol and purified by reprecipitation. The oxirane rings of the modified PI block were subsequently opened through a catalyzed etherification reaction using $BF_3.Et_2O$ in either chloroform (PEG550 and AMP) or a 1:1 mixture of chloroform and TFT (F10H10). After 24 hours, the reaction was quenched with 30% sodium hydroxide solution, concentrated under reduced pressure, and precipitated in cold methanol (F10H10), 1:1 (v:v) methanol:water (AMP) or a water/ice mixture at 0° C. (PEG550).

NMR analysis indicated that epoxidation of the PS-b-P(E/B)-b-PI precursor converted residual unsaturated carbon-carbon double bonds of the PI block to oxirane rings with very high (≈100%) efficiency. Etherification reactions of the epoxidized PS-b-P(E/B)-b-PI precursor resulted in a high degree of attachment for all three surface active groups as characterized by a combination of NMR (PEG550 and AMP) and elemental analysis (F10H10O). Attachment of surface active side-chains relative to epoxy was found to be on the order of 47% for PS-b-P(E/B)-b-PI-PEG550, 46% for PS-b-P(E/B)-b-PI-AMP and 50% for PS-b-P(E/B)-b-PI-F10H10.

$^1$H NMR for PS-b-P(E/B)-b-PI-PEG550 (300 MHz, CDCl$_3$, δ): 6.6 and 7.1 (5H, styrene); 3.69 (br s, 2H —OCH$_2$CH$_2$O—); 3.38 (s, 3H —OCH$_3$); 1.80, 1.30, 0.84 (back-bone).

$^1$H NMR for PS-b-P(E/B)-b-PI-AMP (300 MHz, CDCl$_3$, δ): 6.6 and 7.1 (5H, styrene); 3.64 (br s, 2H —OCH$_2$CH$_2$O—); 2.43 (m, 2H, —CH$_2$CF$_2$—); 1.72, 1.30, 0.82 (back-bone).

$^1$H NMR for PS-b-P(E/B)-b-PI-F10H10 (300 MHz, CDCl$_3$, δ): 6.6 and 7.1 (5H, styrene); 3.5 (br s, 2H —OCH$_2$CH$_2$O—); 1.56, 1.38, 0.86 (back-bone).

Surface Preparation and Characterization. Surfaces for NEXAFS spectroscopy and contact angle measurements were prepared on silicon wafers by spin-coating 3% (w/v) solutions of the grafted triblock copolymers in chloroform (using a CPK Industries model POLOS Spin 150 spin coater). Surfaces for the *Ulva* and *Navicula* biofouling assays were prepared by spray-coating 3% (w/v) solutions on glass microscope slides covered with Kraton SEBS (G1652) thermoplastic elastomer. TFT was used as the solvent for the AMP and F10H10 polymers, while the PEG550 polymer was dissolved in chloroform. The SABC surface-coverage was roughly 2.0 mg/cm$^2$. All surfaces were annealed in a vacuum oven at 60° C. for at least 24 hours immediately followed by about 12 hours at 120° C. Dynamic water contact angles were measured using a VCA Optima XE surface analysis system. NEXAFS experiments were performed and partial electron yield (PEY) C 1 s spectra were normalized by subtracting a linear pre-edge baseline and setting the edge jump to unit at 320 eV.

Contact Angle Analysis. Water contact angle analysis on spin coated surfaces of PS-b-P(E/B)-b-PI-PEG 550, PS-b-P(E/B)-b-PI-AMP, and PS-b-P(E/B)-b-PI-F 10H10 demonstrated fundamental differences in the surfaces of the three SABCs. For PS-b-P(E/B)-b-PI-PEG550, $\theta_{w,adv}=87\pm2°$, $\theta_{w,rec}=28\pm2°$. PS-b-P(E/B)-b-PI-AMP meanwhile showed a surface capable of greater surface reorganization with $\theta_{w,adv}=107\pm2°$, $\theta_{w,rec}=26\pm2°$. Finally, PS-b-P(E/B)-b-PI-F10H10 showed the most hydrophobic surface with $\theta_{w,adv}=122\pm2°$, $\theta_{w,rec}=53\pm3°$.

Figure 7:
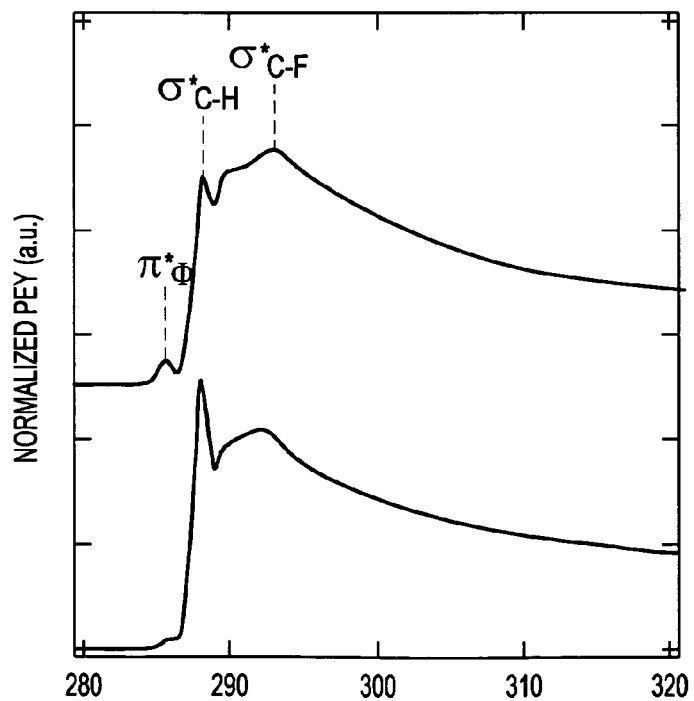
FIG. 7 illustrates C is NEXAFS spectra of PS-b-P(E/B)-b-PI-AMP (top) and PS-b-P(E/B)-b-PI-PEG550 (bottom) SABCs obtained at an X-ray incidence angle of 50° and an entrance grid bias of −150 V at the channeltron electron detector. PS-b-P(E/B)-b-PI-AMP refers to a PS-b-P(E/B)-b-PI polymer where the PI block has been functionalized with ethoxylated fluoroalkyl side chains (e.g., side chains derived from Zonyl® FSO-100). PS-b-P(E/B)-b-PI-PEG550 refers to a PS-b-P(E/B)-b-PI polymer where the PI block has been functionalized with PEG550 side chains.

NEXAFS Spectroscopy. FIG. 7 shows the C 1 s partial electron yield NEXAFS spectra of the PS-b-P(E/B)-b-PI-AMP (top) and PS-b-P(E/B)-b-PI-PEG550 (bottom) SABC surfaces spin coated on silicon. The AMP SABC exhibits the characteristic C 1 s→σ*$_{C-F}$ peak, arising from the C atoms of the perfluorinated carbons of the side chains. The sharp peak near 288 eV is a result of C 1→σ*$_{C-H}$ transitions. Ketone formation on the back-bone is a possible side reaction of the etherification reaction. If this reaction occurs to a significant extent, a C 1 s →π*$_{C=O}$ peak is expected in the vicinity of 288 eV.

Figure 8:
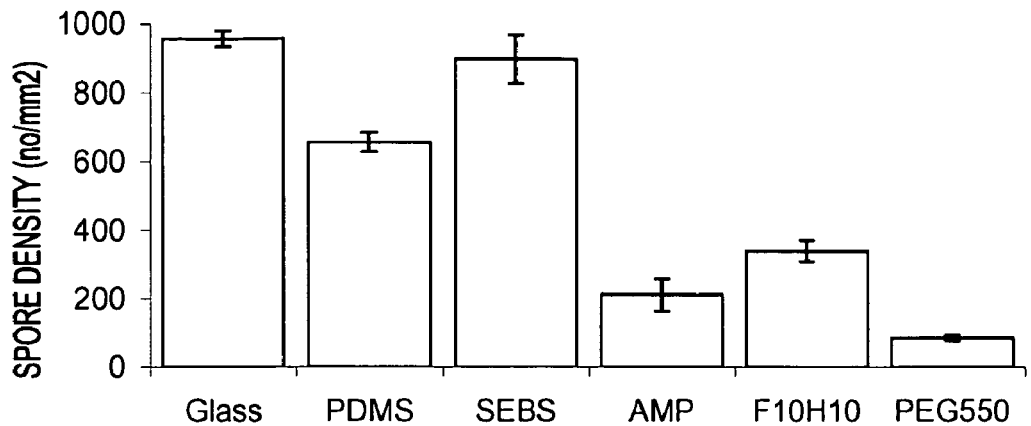
FIG. 8 illustrates the settlement of Ulva spores on SABCs relative to glass, PDMS, and SEBS controls. Each point is the mean from 90 counts on 3 replicate slides. Bars show 95% confidence limits. The labels AMP, F10H10, and PEG550 refer to the polymers described in Example 2.
Figure 9:
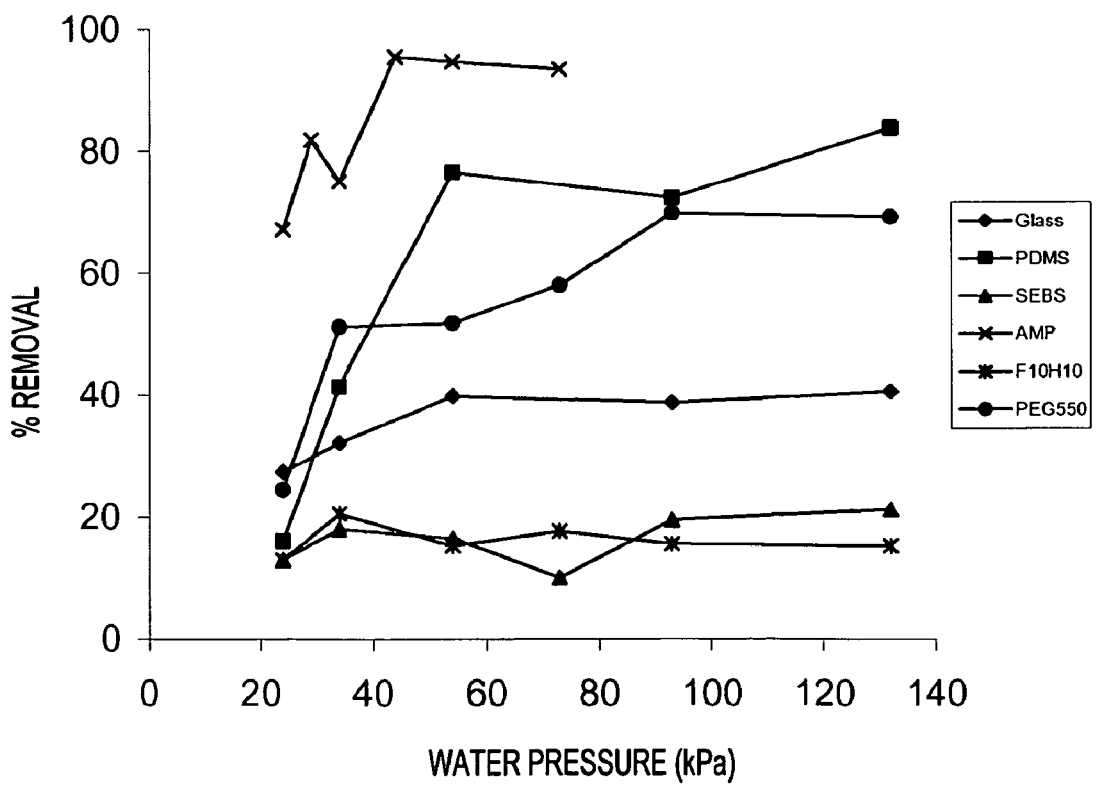
FIG. 9 illustrates detachment of Ulva sporelings from SABCs relative to glass, PDMS and SEBS controls. Slides were exposed to a water jet over a range of pressures. One slide was used at each pressure. The labels AMP, F10H10, and PEG550 refer to the polymers described in Example 2.

*Ulva* and *Navicula* Biofouling Assays. Biofouling assays with the algae *Ulva linza* and *Navicula* diatoms were conducted as described by Krishnan and coworkers (*Langmuir* 2006, 22, 5075-5086). Settlement and adhesion on the SABC surfaces were studied using a water jet. FIG. 8 demonstrates the propensity of all three surfaces to resist settlement by *Ulva* spores. FIG. 9 demonstrates the extremely low water pressure needed to remove *Ulva* sporelings from the PS-b-P(E/B)-b-PI-AMP surface. *Navicula* release meanwhile was higher on all three test surfaces (AMP=51±5%, F10H10=42±4%, PEG550=21±7%) than for the hydrophobic PDMS control (5±3%). The higher *Navicula* release of the hydrophobic PS-b-P(E/B)-b-PI-F10H10 surface in conjunction with the lower than expected *Ulva* release of the PS-b-P(E/B)-b-PI-PEG550 surface shows that the surface properties of the SABCs may be influenced by the hydroxyl groups on the polymer backbone.

In summary, new triblock copolymers with ether-linked hydrophilic, hydrophobic and amphiphilic surface active groups were synthesized. Surface properties were studied using contact angle analysis and NEXAFS spectroscopy. All three SABCs showed significant antifouling and fouling release behaviors with the amphiphilic side chain SABC showing good results for both *Ulva* and *Navicula*.

Example 3

Settlement, Growth and Strength of Attachment Studies

Part I. Settlement, Growth and Strength of Attachment of *Ulva* Spores and Sporelings on Surface Active Triblock Copolymers.

The antifouling properties of amphiphilic polymers toward the settlement, growth, and release of *Ulva* spores and sporelings were evaluated. Experiments showed that surface thermoplastic elastomers consisting of a base layer of styrene-ethylene/styrene-butylene (SEBs) and a top-layer of functionalized polystyrene-based surface-active block copolymers (SABCs) can have desirable foul-release properties. Two different types of SABC layers (K3 and K4) were used on top of a SEBs base, so that the final coatings were ABC poly(styrene-b-ethylene/butylene-b-isoprene) derived surface active block copolymer bilayers (SABC on SEBS).

The K3 and K4 coatings differed in the size of the isoprene (PI) precursor blocks. The K3 precursor polymer included a PI block of about 10,000 g/mol, and the K4 precursor polymer included a PI block of about 20,000 g/mol (~150 units for K3, and 300 units for K4). The SABC layer was further modified by the addition of amphiphilic (ethoxylated fluoroalkyl, AMP), semifluorinated (F10H10), or PEGylated (PEG550) side chains.

The functionalizing agent of the amphiphilic side chains was the Dupont Zonyl® FSO-100 surfactant. Fluorinated samples employed semifluorinated chains of F10H10, a ten carbon aliphatic spacer with ten perfluorinated carbons. PEGylated samples had side chains of PEG550 (550 g/mol average, with about 12 repeat units).

The surface active triblock copolymer structures were as follows. K3 and K4 are two different PS-b-P(E/B)-b-PI precursors. The polystyrene blocks are on the order of 8000 g/mol, the ethylene/butylene block is 25,000 g/mol, and the isoprene precursor block is 10,000 g/mol for K3 and 20,000 g/mol for K4. Kraton ABC triblock derived SABCs, in some embodiments, are polymers of Formula 3-1:

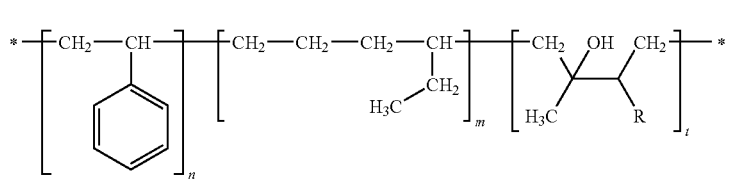

(3-1)

where n is about 75, m is about 600, t is about 150 (for K3) or about 300 (for K4), and each R is independently H, OH, $R_1$, $R_2$, or $R_3$, where $R_1$ is —$(OCH_2CH_2)_{12}OCH_3$ ("PEG550") for K3P; $R_2$ is —$O(CH_2)_{10}(CF_2)_{10}F$ (F10H10) for K3F; and $R_3$ is —$(OCH_2CH_2)_q(CF_2CF_2)_rF$ (ethoxylated fluoroalkyl, AMP) for K3A and K4A, where each q is 1 to about 25, and each r is 1 to about 18. As would be recognized by one of skill in the art, in some instances, the tertiary alcohol and the group R in subunit t may be interchanged on various subunits t, and block m is merely a schematic representation of a poly(ethylene)-ran-poly(butylene) polymer block.

Formula 3-1 can be prepared to include combinations of $R_1$, $R_2$, and $R_3$ side chains. For $R_3$, q and r are typically about 3-15. In one set of experiments, side chain attachment was about 50% for K3F, about 47% for K3P, and about 45% for K3A, and about 15 to 20% for K4A. K3F attachment was calculated using elemental analysis, and K3P, K3A, and K4A were all calculated using NMR integration. The four types of surface active triblock copolymer and SEBs standards were evaluated. Acid washed glass slides and PDMSE (T2 Silastic) were included as standards, as shown in Table 3-1.

TABLE 3-1

Surface active triblock copolymer coatings.

| Label | Coating | Side chains |
|---|---|---|
| SEBs | SEBS base standard slides | — |
| K3a | Kraton ABC triblock | Amphiphilic (AMP) |
| K3f | Kraton ABC triblock | Semi-fluorinated (F10H10) |
| K3p | Kraton ABC triblock | PEGylated (PEG550) |
| K4a | Kraton ABC triblock | Amphiphilic (AMP) |

Methods.

Leaching. Coatings K3a and K4a were leached in distilled water for 10 days, and the remainder of the coatings for 5 days. Leaching ensured there was no residual un-reacted side chains left within the samples. All coatings were immersed in seawater for one hour before initiating the experiment.

Settlement of spores. Zoospores were obtained from mature *Ulva* plants by the standard method. Zoospores were settled in individual dishes containing 10 mL of zoospores ($1.0 \times 10^6$ ml$^{-1}$) in the dark at ~20° C. After 1 hour the slides were gently washed in seawater to remove unsettled zoospores. Slides were fixed using 2.5% glutaraldehyde in seawater. The density of zoospores attached to the surface was counted on each of 3 replicate slides using an image analysis system attached to a fluorescent microscope. Spores were visualised by autofluorescence of chlorophyll. Counts were made for 30 fields of view (each 0.17 mm 2) on each slide.

Growth of sporelings. Spores were settled at the same time and from the same batch as those in the settlement assay, but were grown for 7 days to the stage of sporelings (young plants). Sporeling biomass was determined in situ by measuring the fluorescence of the chlorophyll contained within cells of the sporelings that covered the slides, in a Tecan fluorescence plate reader. The biomass was quantified in terms of relative fluorescence units (RFU). The RFU value for each slide is the mean of 70 point fluorescence readings. The data are expressed as the mean RFU of six replicate slides; bars show SEM (standard error of the mean).

Attachment strength of sporelings. The water jet was used to measure strength of attachment of the sporelings. One of each of the six replicate slides was subjected to a single impact pressure by the water jet. A series of water pressures were used and the proportion of biomass removed was estimated using the fluorescence plate reader. From the % removal data, the critical water pressure required to remove 50% of the sporelings was derived.

Results & Discussion

Coating conditions. All coatings were smooth and not visibly affected by immersion in seawater. Contact angles after immersion in DI water for several days are shown Table 3-2.

TABLE 3-2

Static contact angle measurements on SABC coatings.

| Label | Contact angle |
|---|---|
| SEBs | 100° |
| K3a | 37° |
| K3f | 105° |
| K3p | 81° |
| K4a | 80° |

The contact angle for the K3p sample was higher than expected. The K4a contact angle was higher than that for the K3a samples, potentially due to the higher isoprene content and lower number of amphiphilic chains. Measurements taken after immersion in fresh water. Coatings K3a and K4a immersed for 8 days; the remaining samples for 4 days.

Spore settlement. Spore settlement density was much higher on the glass, PDMSe, and SEBs standards than on the K3 surface active triblock copolymers (FIG. 10). The settlement density on the K4a surface active triblock copolymer was higher than on the K3 series and was similar to that on PDMSe. The higher isoprene content of the K4a sample appeared to have reduced the settlement density of the spores, possibly by increasing the wettability of the coating (Table 3-2). However, amongst the test surfaces as a group, settlement density was not closely correlated with wettability.

Sporeling growth. The biomass production on each surface was largely proportional to the spore settlement density (FIG. 11). The highest production was on the glass, PDMSe and SEBs standards with generally lower growth on the test surfaces. Images of the sporeling biofilms were recorded and less growth was observed on K3 coatings, but not on K4 coatings, potentially reflecting higher settlement on the latter. Growth on all the surfaces was normal. Where spore density was lower, e.g., on K3p, the sporelings grew longer because they were not restricted by competition for nutrients or light as they would have been if grown in a denser sward.

Sporeling strength of attachment. The surface active triblock copolymers can be divided into three general groups with respect to foul-release properties (FIG. 12). First, the K3a and K4a coatings had excellent detachment profiles with removal well above that of the PDMSe standard at each pressure tested (see FIG. 10). Second, the performance of the K3p coating was similar to that of the PDMSe. Third, sporelings were much more strongly attached to the K3f coatings, with strengths similar to those on glass. For K3f, the detachment from glass was slightly higher than normal at around 30%, but did not increase with increasing pressure.

Comparisons between the surface active triblock copolymers clearly show the higher performance of the amphiphilic surfaces and suggests that a mixture of surface energies can destabilize attachment strength of the sporelings. The similarity between the performance on both the K3a and K4a materials shows the strength of this type of embodiment.

Conclusions. Spore settlement was lower on the K3 surface active triblock copolymers than on the glass, PDMSe and SEBs standards. Spore settlement on the K4 surface active triblock copolymers was higher than on the K3 coatings and was similar to that on PDMSe. Sporeling biomass production on the K3 and K4 surface active triblock copolymers was proportional to spore settlement density. Sporeling growth was normal on all coatings with no signs of toxicity. Sporeling strength of attachment on the K3a and K4a surface active triblock copolymers was lower than on PDMSe standard. Sporeling strength of attachment on the K3p surface active triblock copolymers was similar to that on PDMSe, but on K3f was stronger than on glass.

The foul-release performance of the K3a and K4a coatings was exceptional. The K3a coating had the lower settlement and growth, giving it overall a desirable antifouling profile. The poor performance of the K3f compared to the K3p coating was evident, however weak attachment strength of sporelings on the K3a and K4a coatings was noted. A "softer" MD6945 base layer was used to examine the effect of modulus on the fouling settlement and release behavior of multilayer coating systems. Direct comparison of data using a soft base layer (MD6945) indicated an advantage of over using a hard base layer (G1652) when using ethoxylated fluoroalkyl side chain SABCs.

Part II. Settlement and Adhesion of Diatoms on Triblock Copolymers

The antifouling and foul-release properties of SABCs of Part I were assessed using the unicellular diatom *Navicula inserta*. Diatom adhesives are different than those of *Ulva* spore/sporeling because they fulfill the dual functions of attachment and locomotion. Furthermore, unlike *Ulva* spores that are motile and can 'choose' a settlement point, the non-motile diatom cells reach a surface by falling through a water column. Thus, all surfaces in these experiments have the same number of cells in contact with the surface at the end of the settlement period. After gentle washing, only the adhered cells remain attached. This is referred to as initial attachment and is the starting point for the adhesion assay whereby slides are exposed to shear stress in a flow channel.

Diatoms usually adhere more strongly to hydrophobic rather than hydrophilic surfaces, which is opposite of the trend generally seen with *Ulva*, excluding extremely wettable surfaces. However, wettability is not the only criterion determining attachment strength of diatoms. Comparisons between the attachment of diatoms with *Ulva* allow broad spectrum antifouling activity to be identified. The four types of surface active triblock copolymer (and SEBs standards) evaluated in Part I were also evaluated with respect to *Navicula* settlement.

Methods

Leaching. Coatings K3a and K4a were leached in distilled water for 20 days, and the remainder of the coatings for 15 days. All coatings were immersed in seawater for one hour before the start of the experiment.

Initial attachment (density of cells attached after gentle washing). *Navicula* cells were cultured in F/2 medium contained in 250 mL conical flasks. After 3 days the cells were in log phase growth. Cells were washed 3 times in fresh medium before harvesting and diluted to give a suspension with a chlorophyll a content of approximately 0.25 $\mu g \, mL^{-1}$. Cells were settled in individual dishes containing 10 mL of suspension at 20° C. on laboratory benches. After 2 hours, the slides were gently washed in seawater to remove cells that had not properly attached (submerged wash). Slides were fixed using 2.5% glutaraldehyde in seawater. The density of cells attached to the surface was counted on each slide using an image analysis system attached to a fluorescent microscope. Counts were made for 30 fields of view (each 0.064 $mm^2$) on each slide.

Detachment of diatoms in a water channel. Slides settled with *Navicula* were exposed to a shear stress of 32.5 Pa (40 US gall $min^{-1}$) in a water channel. The number of cells remaining attached were counted using the image analysis system described above.

Results & Discussion

Coating conditions. The coatings were in good condition and had not visibly changed during the leaching period. However, after immersion in water all the contact angles for the surface active triblock copolymer were within the range 75-99 degrees (Table 3-3). Leached coating measurements were taken after immersion in fresh water. Coatings K3a and K4a were immersed for 20 days; the rest for 15 days. Dry coating measurements were taken on dry samples on silicon wafers. Excess water was removed from the surface by shaking prior to measurement.

TABLE 3-3

Static contact angle measurements taken on SABC coatings.

| | Leached Coatings | Dry Coatings | |
|---|---|---|---|
| Label | Static contact angle | Advancing | Receding |
| SEBs | 95° | | |
| K3a | 85° (up from 37) | 99° | 23° |
| K3f | 99° | 122° | 53° |
| K3p | 90° | 87° | 28° |
| K4a | 75° | 94° | 41° |

As indicated in Part I above, the contact angle measured for the PEGylated K3p sample was higher than expected being nearly the same as the advancing contact angle measured before leaching. Also the contact angle for the K3a sample was higher than when measured in the previous experiment.

Initial attachment of diatoms. Diatoms sank through the water column reaching the surface under the influence of gravity. In terms of diatom numbers, the challenge is the same for all surfaces, but on some surfaces the diatoms fail to make a firm attachment and are easily washed away by movement of the dishes and gentle washing. The differences in attachment (settlement) after gentle washing thus reflect differences in the ability of cells to adhere.

The densities of diatoms remaining on each coating was variable (FIG. 13). The highest numbers were on the SEBs base, PDMSe and the fluorinated K3f, which are all hydrophobic surfaces. The density of the attached cells on the amphiphilic K3a and K4a, PEGylated K3p and glass surfaces was low.

Detachment of diatoms in a water channel. The strength of attachment of diatoms on the standard materials followed a pattern, with low removal from the PDMSe and SEBs and high removal from glass (FIG. 14). The highest removal was from the amphiphilic K3a and K4a surface active triblock copolymers. These also showed a good foul-release profile with *Ulva* sporelings in Part I above, indicating broad spectrum activity.

Contrary to expectations, diatoms attached more strongly to the PEGylated K3p than to the fluorinated K3f. This is opposite to the initial attachment data, which showed a greater density of diatoms on the hydrophobic (K3f) surface. However, in the previous *Ulva* experiment the attachment strength of sporelings on these surfaces was also reversed. This is potentially due in part to the hydrophobicity of the PEGylated coating, which after leaching, had a higher contact angle than anticipated.

Conclusions. Initial diatom attachment (after gentle washing) was highest on the fluorinated K3f and lowest on the PEGylated K3p surface active triblock copolymers. Diatom attachment strength was lowest on the amphiphilic K3a and K4a surface active triblock copolymers. Diatom attachment was stronger on the PEGylated K3p than on the fluorinated K3f surface active triblock copolymers.

Although the strength of attachment of diatoms to the surface active triblock copolymers was not exceptionally low (compared to glass), it was much lower than on the PDMSE or SEBs standards. Combining this with the good release profile for *Ulva* sporelings demonstrated in Part I above, the indications are that the amphiphilic coatings have good anti-algal characteristics.

Part III. Settlement, Growth and Strength of Attachment of *Ulva* Spores and Sporelings on Fluorinated and PEGylated Triblock Copolymers.

A set of $PS_{8K}$-b-$P(E/B)_{25K}$-b-$PI_{20K}$ ("K4") amphiphilic elastomers was examined for antifouling potential using *Ulva* spores and sporelings. The K4 amphiphilic elastomers were modified by various ratios of side chains with of fluorinated (F10H10) and PEGylated (PEG550) groups (e.g., $R_1$ and $R_2$ groups of Formula 3-1). The study showed that spore settlement decreased with increasing PEG content. Also, sporeling strength of attachment was greatest on the most fluorinated coatings. Sporelings were more easily removed from two of the samples than from the PDMSe.

Antifouling and fouling-release properties toward *Ulva* spores and sporelings were then evaluated on a similar set of K3 amphiphilic triblock copolymers ($PS_{8K}$-b-$P(E/B)_{25K}$-b-$P_{10K}$). This set was also combined with a new lower modulus SEBS base, MD6945. A higher overall grafting density of side chains was therefore achieved and the range of triblocks was extended to include control samples with only PEG and only F10H10 side chains. Thus, a series of amphiphilic triblock copolymer samples containing discrete ratios of F10H10 and PEG550 side chains and a SEBS base control were prepared and evaluated, as shown in Table 3-4. The theoretical ratios are described in the second column and actual percentage attachment is shown in the last two columns. Acid washed glass and T2 Silastic (PDMSe) standards were also included.

TABLE 3-4

Description of fluorinated and PEGylated triblock copolymer coatings.

| Label | F10H10 to PEG550 Ratio | SEBs layer | SABC layer | Attachment of F10H10 | Attachment of PEG550 |
|---|---|---|---|---|---|
| MD | MD6945 | MD6945 | — | — | — |
| 100F | K3-100F-0P | MD6945 | $PS_{8K}$-b-$P(E/B)_{25K}$-b-$PI_{10K}$ | 50% | 0% |
| 80F | K3-80F-20P | MD6945 | $PS_{8K}$-b-$P(E/B)_{25K}$-b-$PI_{10K}$ | 41% | 13% |
| 60F | K3-60F-40P | MD6945 | $PS_{8K}$-b-$P(E/B)_{25K}$-b-$PI_{10K}$ | 28% | 19% |
| 50F | K3-50F-50P | MD6945 | $PS_{8K}$-b-$P(E/B)_{25K}$-b-$PI_{10K}$ | 24% | 24% |
| 40F | K3-40F-60P | MD6945 | $PS_{8K}$-b-$P(E/B)_{25K}$-b-$PI_{10K}$ | 19% | 28% |
| 20F | K3-20F-80P | MD6945 | $PS_{8K}$-b-$P(E/B)_{25K}$-b-$PI_{10K}$ | 22% | 27% |
| 0F | K3-0F-100P | MD6945 | $PS_{8K}$-b-$P(E/B)_{25K}$-b-$PI_{10K}$ | 0% | 33% |

Methods.

Coatings were leached in deionized water for 24 hours. All coatings were then immersed in seawater for one hour before conducting experiments. The settlement of the spores was carried out as described in Part I above. Slides, settled with zoospores for 1 hour by the above method, were exposed to a shear stress of 53 Pa created by the turbulent flow of seawater in a specially designed water channel. The slides were then fixed in gluteraldehyde as described above. The number of spores remaining attached was compared with unexposed control slides (the same as used to determine settlement). The growth of the sporelings was carried out as described in Part I. Bars in FIGS. 11-13 and 16 show SEM (standard error of the mean). Sporeling attachment strength was measures as described in Part I.

Results & Discussion

Coating conditions. The coatings were smooth, unpigmented and transparent. Contact angles (Table 3-5) indicated that even the unfluorinated 0F sample had a relatively high advancing contact angle. The differences in advancing and receding contact angles between the samples was relatively small. FIG. 15 illustrates the contact angles for the sprayed coatings of Table 3-5. The data was plotted to allow comparison with FIGS. 16-18.

TABLE 3-5

Advancing and receding contact angle measurements on triblock copolymer coatings.

| | $\Theta w, a$ | $\Theta w, r$ |
|---|---|---|
| 100F | 126 +/− 2 | 42 +/− 4 |
| 80F | 127 +/− 2 | 31 +/− 2 |

TABLE 3-5-continued

Advancing and receding contact angle measurements on triblock copolymer coatings.

| | Θw, a | Θw, r |
|---|---|---|
| 60F | 127 +/− 3 | 28 +/− 3 |
| 50F | 128 +/− 3 | 27 +/− 4 |
| 40F | 128 +/− 3 | 26 +/− 4 |
| 20F | 125 +/− 3 | 25 +/− 3 |
| 0F | 104 +/− 3 | 21 +/− 4 |

Spore settlement. Spore settlement density decreased as the F10H10 content decreased and as the PEG550 content increased (FIG. 16). The highest settlement density was on the 100F modified samples and was similar to that on the glass, PDMSe and SEBS standards. Settlement density was lowest on the 0F sample, which had only 25% of the spore density that was on the 100F sample.

Strength of attachment of spores. Spore removal from the samples with F10H10 side chain content between 100-50% was low and similar to that from the glass standard (FIG. 17). The highest removal was from the 40F sample (51% removed) which was greater than from the PDMSe standard (34% removed). Removal from the 20F and 0F samples was intermediate between the 40F and the 100-50F samples. Overall, the strength of attachment of spores was weaker on the more hydrophilic coatings with a peak in weakness on the 40F sample.

Sporeling growth. Biomass production on the triblocks was broadly in line with spore settlement densities (FIG. 18). Growth was greatest on the triblocks containing the highest proportions of F10H10 side chains (the lowest proportions of PEG550) and lowest on those containing low proportions of F10H10 side chains (high proportions of PEG550).

Strength of attachment of sporelings. Sporeling strength of attachment on the triblock copolymers decreased as the F10H10 content decreased and the PEG550 content increased (FIGS. 19 and 20). On copolymers 60-0F sporeling strength of attachment was equal or lower than on the PDMSe standards. Images taken after exposure to a water jet of 42 kPa show a widening of the area cleared by the water jet as the series goes from high to low fluorination (see FIGS. 21 and 22). This demonstrates a weakening in attachment strength along the series as the PEGylated content increased. Attachment strength on the 100F and 80F triblock samples was as strong as on the glass standard and SEBS base.

FIGS. 21 and 22 illustrate before and after data for each individual water jet testing experiment. FIG. 21 (before) is based on the average reading. The FIG. 21 readings can occasionally be lower than the FIG. 22 reading for low applied pressures under certain circumstances due to statistical variance (only one data point taken for each measurement). As stated in the strength of attachment of spores section, spores were more weakly attached to the 40F sample than to the other copolymers. However, this was not the case for sporeling attachment and the removal data followed a progressive trend as described above.

Conclusions. Spore settlement densities were positively correlated with the F10H10 content and negatively correlated with the PEG550 content of certain triblock copolymers. Spore strength of attachment was generally higher on the copolymers with high F10H10 and lower PEG550 content. Sporelings grew normally on all the coatings. Sporeling strength of attachment was negatively correlated with the F10H10 content and positively correlated with the PEG550 content of the triblock copolymer. Sporeling strength of attachment on the 40, 20 and 0F triblocks was weaker than on the PDMSe standard.

The data show that the polymers described above have significant and advantageous antifouling properties. Both spore settlement and sporeling removal were closely correlated to the ratio of fluorinated to PEGylated side chains in the coating. Although the composition of these triblock copolymers is not exactly the same as that used for Examples 1-3 above, the data correlate well with the trends that were identified in those Examples. The trend between spore settlement densities and the fluorinated and PEGylated side chain content of the triblocks did not show a strong correlation with either the advancing or receding contact angles or the hysteresis between them. However, because surfaces such as these are likely to reconstruct under water, a closer correlation might be found with captive bubble contact angle measurements. Sporeling strength of attachment on the 40, 20 and 0F samples was weaker than on the PDMSe standards and attachment strength to the 60 and 50F was the same as on the PDMSe standards.

Example 4

Functionalized polystyrene-b-poly(ethylene-r-butylene)-b-polyisoprene (PS-b-P(E/B)-b-PI) Derived Block Copolymers for Marine Anti-Fouling Applications Block copolymers containing tethered side-chains were prepared for use as the surface layer of a multilayer antifouling/fouling-release coating system. Self assembly of these block copolymers aids segregation of the functional surface active groups to the polymer surface, thereby forming surfaces capable of resisting or releasing marine fouling. A PS-b-P(E/B)-b-PI based SABC containing amphiphilic ethoxylated fluoroalkyl side chains demonstrated good anti-fouling and fouling-release properties with regards to the green alga *Ulva* and *Navicula* diatoms. Such polymers were found to have high contact angle hysteresis, indicating a surface capable of restructuring, depending on its local environment. Three SABCs containing amphiphilic side chains were synthesized and analyzed, as shown in Scheme 4-1.

Scheme 4-1. General structure of PS-b-P(E/B)-b-PI derived SABCs.

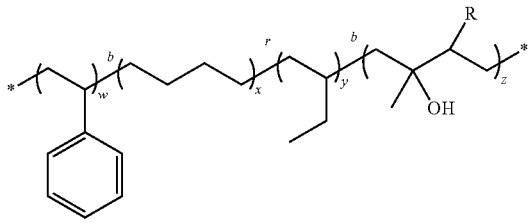

where each R is independently $R_4$, $R_5$, or $R_6$, where $R_4$ is —$(OCH_2OCH_2)_9OC_6H_4(CH_2)_8CH_3$; $R_5$ is —$(OCH_2OCH_2)_{10}(CH_2)_{15}CH_3$; and $R_6$ is —$(OCH_2OCH_2)_{11}(CH_2)_3Si(Me)(OSiMe_3)_2$. The block variables w, x, y, and z can be selected to correspond with the PS-b-P(E/B)-b-PI derived SABC precursors described herein. Side reactions may also result in $R_{4-6}$ values of H or OH and the like, or another polymer chain due to side reaction with another oxirane group, depending on experimental conditions. The side chains can also be any one or more of $R_{1-3}$ described in Example 2 above.

Functionalization of the PI block of the triblock precursor was achieved through epoxidation of the residual alkene groups followed by subsequent catalytic ring-opening etherification reactions using non-ionic surfactant alcohols carrying amphiphilic functionality. Thus, polymers with side chains $R_4$, $R_5$, and $R_6$ can be obtained by adding the appropriate $R_4$, $R_5$, or $R_6$ alcohol to PS-b-P(E/B)-b-PI having epoxidized PI subunits, for example, in the presence of a Lewis acid. $R_4$, $R_5$, and $R_6$ precursors can include Brij 56® (Croda International PLC, $CH_3(CH_2)_{15}(OCH_2CH_2)_nOH$, n=about 10, $M_n \approx 683$), Tergitol NP-9® (Union Carbide Chemicals and Plastics Technology Corporation, $CH_3(CH_2)_8C_6H_4(OCH_2CH_2)_9OH$, FW 616.82); and Silwet L-408 ($[(CH_3)_3SiO]_2CH_3Si(CH_2)_3(OCH_2CH_2)_nOH$, n=about 11, M≈720; obtained from Momentive Performance Materials). Polystyrene-block-poly(ethylene-ran-butylene)-block-polystyrene (SEBS) triblock thermoplastic elastomers (Kraton G1652M) and SEBS grafted with maleic anhydride (MA-SEBS, Kraton FG1901X) were obtained from Kraton Polymers.

In a typical epoxidation reaction, the $PS_{8K}$-b-P(E/B)$_{25K}$-b-$PI_{10K}$ SABC precursor polymer (5 g, 14.5 mmol of reactive isoprene sites) was dissolved in 100 mL of dichloromethane in a round bottomed flask. 3-Chloroperoxybenzoic acid (mCPBA, 3.9 g, 17.4 mmol) was added to the mixture, and the solution was stirred vigorously for 5 hours at room temperature. Subsequently, the polymer was precipitated in methanol, collected by filtration, and reprecipitated from dichloromethane to remove residual mCPBA and its respective byproducts. The white, rubbery product was dried at room temperature under reduced pressure for 48 hours to remove remaining solvent.

$^1$H NMR for epoxidized $PS_{8K}$-b-P(E/B)$_{25K}$-b-$PI_{10K}$ (300 MHz, $CDCl_3$, δ): 6.57, 7.07, (5H, styrene), 2.66 (br s, 1H, epoxidized isoprene, —$CH_2HCOC(CH_3)CH_2$—), 0.80, 1.07, 1.22, 1.45, 1.57 (back-bone). IR (dry film) $\upsilon_{max}$ (cm$^{-1}$): 2925, 2850 (C—H stretching); 1470 (C—H bending); 1070 (C—O stretching); 880 (C—O—C stretching); 700 (C—H bending, aromatic).

To produce ether-linked side chain surface active block copolymers, 2.1 g of epoxidized $PS_{8K}$-b-P(E/B)$_{25K}$-b-$PI_{10K}$ (5.8 mmol of epoxide) was taken in a round bottom flask in conjunction with a four times molar excess (23.2 mmol) of side-chain precursor non-ionic surfactant alcohol (Brij 56, Tergitol NP-9, or Silwet L-408). The reactants were purged with argon, and subsequently dissolved in about 150 mL of anhydrous chloroform. Activated molecular sieves were added to the reaction mixture and it was allowed to sit for about 12 hours to optimize the adsorption of water. Etherification was performed through the addition of boron trifluoride diethyl etherate catalyst (0.345 g, 2.4 mmol) followed by vigorous stirring at room temperature for at least 48 hours. Following the reaction, 6.25 N sodium hydroxide was added to quench any residual boron catalyst and the reaction mixture was concentrated under reduced pressure using a rotary evaporator. The resultant surface active triblock copolymers were precipitated into methanol. The SABCs were collected by filtration and subsequently reprecipitated twice from chloroform to remove additional residual surface active side-chain alcohol precursors. Finally, the finished samples were dried under reduced pressure at room temperature for 48 hours to fully remove residual solvent.

$^1$H NMR for $PS_{8K}$-b-P(E/B)$_{25K}$-b-$PI_{10K}$ functionalized with Brij 56 side chains (300 MHz, $CDCl_3$, δ): 6.58, 7.10, (5H, styrene), 3.65 (br s, 40H, —$(OCH_2CH_2)_{10}$—; 3.43 (t, 2H, —$(CH_2CH_2O)_{10}CH_2(CH_2)_{14}$—); 0.82, 1.06, 1.24, 1.82 (31H, $CH_3(CH_2)_{14}CH_2$— of Brij 56 side chain, and back-bone). IR (dry film) $\upsilon_{max}$ (cm$^{-1}$): 3480 (O—H stretching); 2930, 2855 (C—H stretching); 1460, 1380 (C—H bending); 1115 (C—O stretching); 765, 700 (C—H bending, aromatic).

$^1$H NMR for $PS_{8K}$-b-P(E/B)$_{25K}$-b-$PI_{10K}$ functionalized with Tergitol NP-9 side chains (300 MHz, $CDCl_3$, δ): 6.56, 6.84, 7.10, (5H, styrene; 4H, Tergitol NP-9 side chain), 4.10 (t, 2H, —$C_6H_4OCH_2CH_2O$—); 3.85 (t, 2H, —$C_6H_4OCH_2CH_2O$—); 3.66 (br m, —$C_6H_4OCH_2CH_2(OCH_2CH_2)_8$—); 0.84, 1.06, 1.24, 1.75 (19H, $CH_3(CH_2)_8$— of Tergitol NP-9 side chain, and back-bone). IR (dry film) $\upsilon_{max}$ (cm$^{-1}$): 3510 (O—H stretching); 2925, 2860 (C—H stretching); 1460, 1380 (C—H bending); 1120 (C—O stretching); 770, 700 (C—H bending, aromatic).

$^1$H NMR for $PS_{8K}$-b-P(E/B)$_{25K}$-b-$PI_{10K}$ functionalized with Silwet L-408 side chains (300 MHz, $CDCl_3$, δ): 6.58, 7.08, (5H, styrene), 3.65 (br s, 44H, —$(OCH_2CH_2)_{11}$—); 3.40 (t, 2H, —$(CH_2)_2CH_2(OCH_2CH_2)_{11}$—); 0.83, 1.06, 1.25, 1.81 (back-bone), 0.43 (m, 2H, $[(CH_3)_3SiO]_2CH_3SiCH_2(CH_2)_2$—); 0.08 (br s, 18H, $[(CH_3)_3SiO]_2CH_3Si(CH_2)_3$—); 0.00 (s, 3H, $[(CH_3)_3SiO]_2CH_3Si(CH_2)_3$—). IR (dry film) $\upsilon_{max}$ (cm$^{-1}$): 3480 (O—H stretching); 2925, 2855 (C—H stretching); 1460, 1360 (C—H bending); 1110 (C—O stretching); 765, 700 (C—H bending, aromatic).

Surfaces for XPS and dynamic water contact angle analysis were prepared on silicon wafers by spin-coating 3% (w/v) solutions of SABCs in toluene at 2000 rpm for 60 seconds. All surfaces prepared for study were annealed in a vacuum oven at reduced pressure at 120° C. for at least 12 hours followed by slow cooling to room temperature.

Water contact angle studies demonstrated high hysteresis (Table 4-1), indicating surfaces prone to surface reconstruction, indicating promising antifouling and fouling-release properties.

TABLE 4-1

Chemical and surface characterization of PS-b-P(E/B)-b-PI derived SABCs.

| Side Chain | Attachment | $\Theta_w$, adv. | $\Theta_w$, rec. |
|---|---|---|---|
| $R_4$ | 27.6% | 111° | 34° |
| $R_5$ | 18.0% | 113° | 21° |
| $R_6$ | 25.5% | 106° | 27° |

Percent attachment of side chains was determined using $^1$H NMR.

For the coatings prepared, the lowest settlement was shown on the surface incorporating the Brij 56 non-ionic surfactant. Dynamic water contact angle analysis indicated that all three non-ionic surfactant derived SABCs had similar advancing and receding water contact angles, indicating a hydrophobic surface in a non-polar environment, capable of reordering and becoming hydrophilic once placed in a marine environment. The amount of *Ulva* spore settlement was dependent on the type non-ionic surfactant incorporated in the SABC coating despite the similar wettability parameters of all three samples. Settlement of *Ulva* spores was minimized on the Brij 56 derived SABC. Also, the SABC derived from the Brij 56 non-ionic surfactant demonstrated more robust release of *Ulva* sporelings than the PDMS control.

Characterization of samples produced by both spin coating and spray coating indicated significant process dependent differences in surface functionality. In the biofouling assays, spore settlement of the green alga *Ulva* was significantly reduced relative to a PDMS control for SABCs derived from two of the non-ionic surfactant-derived polymers, with the non-ionic surfactant combining a PEG group with an aliphatic moiety demonstrating the best performance (least settlement). Additionally, a fouling release assay using *Ulva* sporelings indicated that the SABC derived from the PEG and aliphatic containing non-ionic surfactant also out-performed PDMS as a fouling release material. Accordingly, these polymers can be used in marine coatings to provide antibiofouling properties. Their application to surfaces, as described herein, can be used to address the many current problems relating to marine biofouling.

Example 5

Antifouling Coating Preparation

The materials of Example 3 were used to prepare panels for ocean testing. Aluminum base panels were sand blasted and coated with a primer layer of Amerlock® 400 epoxy coating. Within the open time of the primer (less than 24 hours) the panels were roll coated with a thin layer of G1701 (a maleated SEBS from Kraton Polymers) from a 10% solution in cyclohexane. After drying, a 5 mm layer of MD6945 was compression molded onto the panels at 250° C. using mirror finish chrome plates to produce a smooth surface.

The SABC was applied by spraying a 3% solution of various materials of Example 3 onto the surface, using trifluorotoluene (TFT) as a solvent. The surface was allowed to dry, and the resultant panel was exposed to salt water for approximately six weeks. Evaluation of the panels indicated that bilayer coatings that incorporate a soft base layer and an amphiphilic SABC as described herein provide significantly better biofouling properties than the corresponding bilayers that incorporate a hard base layer. Thus, improved antifouling properties can be obtained by preparing antifouling coatings with a soft base layer, for example, with a Young's modulus of less than about 5 MPa, or less 4 MPa, for example, a thermoplastic elastomer such as MD6945.

The data showed that improved antifouling bilayer coatings can be provided by using a soft base layer in a bilayer coating. Both spore settlement and sporeling removal were closely correlated to the ratio of fluorinated to PEGylated side chains in the coating. Although not every polymer of Examples 1-4 was evaluated, the data correlate well with the trends that were identified in those Examples. The trend between spore settlement densities and the fluorinated and PEGylated side chain content of the triblocks did not show a strong correlation with either the advancing or receding contact angles or the hysteresis between them. Sporeling strength of attachment on the 40, 20 and 0F samples was weaker than on the PDMSe standards and attachment strength to the 60 and 50F was the similar to that of PDMSe standards. However, use of a soft base layer provided better antibiofouling properties than the corresponding bilayers that incorporated a hard base layer.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A polymer comprising at least three blocks, the first block comprising poly(styrene), the second block comprising poly(ethylene-random-butylene), and a third block comprising functionalized poly(isoprene);
   wherein repeating units of the functionalized poly(isoprene) block comprise hydroxyl groups and one or more ether linked side chains comprising $R^1$, $R^2$, $R^3$, $R^4$, $R^5$, $R^6$, or a combination thereof;
   wherein $R^1$ is —$(OCH_2CH_2)_nOCH_3$ wherein each n is independently 8-16;
   $R^2$ is —$O(CH_2)_x(CF_2)_yF$ wherein each x and y are independently 2-12;
   $R^3$ is —$(OCH_2CH_2)_q(CF_2CF_2)_rF$ wherein each q is independently 1 to about 25 and each r is independently 0 to about 18;
   $R^4$ is —$(OCH_2OCH_2)_nOC_6H_4(CH_2)_nCH_3$ wherein each n is independently 6-16;
   $R^5$ is —$(OCH_2OCH_2)_n(CH_2)_nCH_3$ wherein each n is independently 8-16;
   $R^6$ is —$(OCH_2OCH_2)_n(CH_2)_3Si(CH_3)(OSi(CH_3)_3)_2$ wherein each n is independently 8-16.

2. The polymer of claim 1 wherein the poly(styrene) block has a molecular weight of about 4,000 to about 12,000, the poly(ethylene-random-butylene) block has a number average molecular weight of about 15,000 to about 50,000, and the functionalized poly(isoprene) block is derived from a poly(isoprene) block of a number average molecular weight of about 5,000 to about 25,000.

3. The polymer of claim 1 wherein the one or more ether linked side chains comprise at least $R^1$ and $R^2$, and wherein at least about 5% of the repeating units of the functionalized poly(isoprene) block have $R^1$ side chains and at least about 3% of the repeating units of the functionalized poly(isoprene) block have $R^2$ side chains.

4. The polymer of claim 1 wherein the one or more ether linked side chains comprise at least $R^1$, and wherein n of $R^1$ is about 12.

5. The polymer of claim 1 wherein the one or more ether linked side chains comprise at least $R^2$, and wherein each x and each y of $R^2$ are independently about 2, 4, 6, 8, or 10.

6. The polymer of claim 1 wherein the one or more ether linked side chains comprise at least $R^3$, and wherein each q and each r of $R^3$ are about 3 to about 15.

7. The polymer of claim 1 wherein the one or more ether linked side chains comprise at least $R^4$, $R^5$, and $R^6$, and wherein each n of $R^4$ is about 7 to about 10; each n of $R^5$ is about 10 to about 15; and each n of $R^6$ is about 10.

8. The polymer of claim 1 wherein about 5% to about 40% of the repeating units of the functionalized poly(isoprene) block have $R^1$ side chains.

9. The polymer of claim 1 wherein about 3% to about 60% of the repeating units of the functionalized poly(isoprene) block have $R^2$ side chains.

10. An antifouling coating comprising a surface layer comprising the polymer of claim 1 and a base layer comprising a thermoplastic elastomeric polymer, and optionally one or more adhesion layers, primer layers, or both.

11. The antifouling coating of claim 10 wherein the coating exhibits antifouling properties toward one or more of marine algae, algal spores or sporelings, bacterial cells, diatoms, protozoa, and barnacles, in a marine environment.

12. The antifouling coating of claim 10 wherein the one or more ether linked side chains comprise at least $R^1$ and $R^2$, and the functionalized poly(isoprene) block has a higher percentage of $R^1$ side chains than $R^2$ side chains, wherein the coating promotes release of *Ulva* sporelings from the coating in a marine environment.

13. The antifouling coating of claim 10 wherein the one or more ether linked side chains comprise at least $R^1$ and $R^2$, and wherein the functionalized poly(isoprene) block is derived from a poly(isoprene) block having a average molecular weight of about 8,000 to about 22,000, the functionalized poly(isoprene) block has a higher percentage of $R^1$ side chains than $R^2$ side chains, and the coating resists settlement of *Ulva* spores to a greater extent than poly(dimethylsiloxane) coatings.

14. The antifouling coating of claim 10 wherein the one or more ether linked side chains comprise at least $R^1$ and $R^2$, and wherein the functionalized poly(isoprene) block has a higher percentage of $R^2$ side chains than $R^1$ side chains, wherein the coating promotes detachment of *Navicula* diatoms from the coating in a marine environment.

15. The antifouling coating of claim 10 wherein the coating results in less barnacle cyprid larvae settlement than poly(styrene-ethylene-butylene-styrene) polymer surfaces or poly(dimethylsiloxane) surfaces in a marine environment.

16. A polymer comprising formula I:

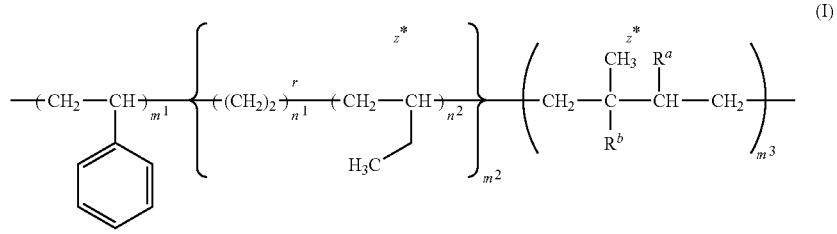

(I)

wherein
$m^1$ is about 50 to about 120;
$n^1$ and $n^2$ are selected so that block $m^2$ has a number average molecular weight of about 15,000 to about 50,000;
$m^3$ is about 75 to about 375;
r indicates that the arrangement of individual $n^1$ and $n^2$ units within block $m^2$ is random;
$Z^*$ indicates that the arrangement of individual $n^2$ units and $m^3$ units is reversible such that the ethyl side group may reside on either carbon of the $n^2$ unit, and $R^a$ may reside on either of the internal carbons of the $m^3$ unit;
in each individual subunit $m^3$, one of $R^a$ and $R^b$ is —OH and the other is $R^1$, $R^2$, $R^3$, $R^4$, $R^5$, $R^6$, H, or OH;
wherein $R^1$ is —(OCH$_2$CH$_2$)$_n$OCH$_3$ wherein each n is independently 8-16;
$R^2$ is —O(CH$_2$)$_x$(CF$_2$)$_y$F wherein each x and y are independently 2-12;

$R^3$ is —(OCH$_2$CH$_2$)$_q$(CF$_2$CF$_2$)$_r$F wherein each q is independently 1 to about 25 and each r is independently 0 to about 18;
$R^4$ is —(OCH$_2$OCH$_2$)$_n$OC$_6$H$_4$(CH$_2$)$_n$CH$_3$ wherein each n is independently 6-16;
$R^5$ is —(OCH$_2$OCH$_2$)$_n$(CH$_2$)$_n$CH$_3$ wherein each n is independently 8-16;
$R^6$ is —(OCH$_2$OCH$_2$)$_n$(CH$_2$)$_3$Si(CH$_3$)(OSi(CH$_3$)$_3$)$_2$ wherein each n is independently 8-16;
and at least 1% of $R^a$ and $R^b$ groups, combined, are $R^1$, $R^2$, $R^3$, $R^4$, $R^5$, $R^6$, or a combination thereof.

17. A polymer comprising at least three blocks, the first block comprising poly(styrene), the second block comprising poly(ethylene-random-butylene), and a third block comprising functionalized poly(isoprene);
wherein repeating units of the functionalized poly(isoprene) block comprise hydroxyl groups and ether linked side chains $R^1$ and $R^2$;
wherein $R^1$ is —(OCH$_2$CH$_2$)$_n$OCH$_3$ wherein each n is independently 8-16, and $R^2$ is —O(CH$_2$)$_x$(CF$_2$)$_y$F wherein each x and y are independently 2-12; and
wherein at least about 5% of the repeating units of the functionalized poly(isoprene) block have $R^1$ side chains and at least about 3% of the repeating units of the functionalized poly(isoprene) block have $R^2$ side chains.

18. A polymer comprising formula II:

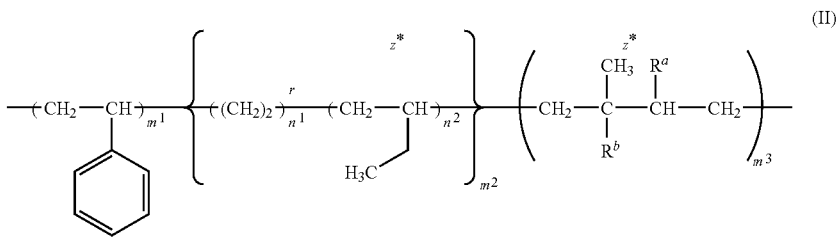

(II)

wherein
$m^1$ is about 50 to about 120;
$n^1$ and $n^2$ are selected so that block $m^2$ has a number average molecular weight of about 20,000 to about 30,000;
$m^3$ is about 75 to about 375;
r indicates that the arrangement of individual $n^1$ and $n^2$ units within block $m^2$ is random;
$z^*$ indicates that the arrangement of individual $n^2$ units and $m^3$ units is reversible such that the ethyl side group may reside on either carbon of the $n^2$ unit, and $R^a$ may reside on either of the internal carbons of the $m^3$ unit;

in each individual subunit $m^3$, one of $R^a$ and $R^b$ is —OH and the other is $R^1$, $R^2$, H, or OH;

wherein $R^1$ is —$(OCH_2CH_2)_nOCH_3$ wherein n is 8-16, and $R^2$ is —$O(CH_2)_x(CF_2)_yF$ wherein x and y are each independently 2-12; and wherein at least about 5% of $m^3$ is units have $R^1$ side chains and at least about 3% of $m^3$ units have $R^2$ side chains.

19. A polymer comprising at least three blocks, the first block comprising poly(styrene), the second block comprising poly(ethylene-random-butylene), and a third block comprising functionalized poly(isoprene);

wherein repeating units of the functionalized poly(isoprene) block comprise hydroxyl groups and ether linked side chains $R^3$;

wherein $R^3$ is —$(OCH_2CH_2)_q(CF_2CF_2)_rF$ where each q is independently 1 to about 25 and each r is independently 1 to about 18; and wherein at least about 3% of the repeating units of the functionalized poly(isoprene) block have $R^3$ side chains.

20. A polymer comprising formula III:

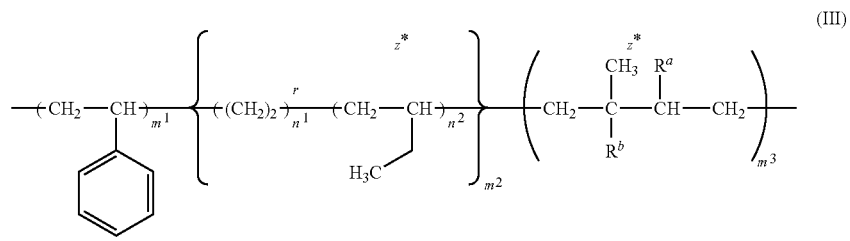

wherein
$m^1$ is about 50 to about 120;
$n^1$ and $n^2$ are selected so that block $m^2$ has a number average molecular weight of about 20,000 to about 30,000;
$m^3$ is about 75 to about 375;
r indicates that the arrangement of individual $n^1$ and $n^2$ units within block $m^2$ is random;
z* indicates that the arrangement of individual $n^2$ units and $m^3$ units is reversible such that the ethyl side group may reside on either carbon of the $n^2$ unit, and $R^a$ may reside on either of the internal carbons of the $m^3$ unit;
in each individual subunit $m^3$, one of $R^a$ and $R^b$ is —OH and the other is $R^3$, H, or OH;
wherein $R^3$ is —$(OCH_2CH_2)_q(CF_2CF_2)_rF$ where each q is independently 1 to about 25 and each r is independently 1 to about 18; and at least about 3% of $m^3$ is units have $R^3$ side chains.

21. An antifouling coating comprising a surface layer comprising the polymer of claim 1, and a base layer comprising a thermoplastic elastomeric polymer having a Young's modulus of less than 5 MPa.

* * * * *

UNITED STATES PATENT AND TRADEMARK OFFICE
CERTIFICATE OF CORRECTION

PATENT NO. : 7,887,926 B2
APPLICATION NO. : 12/397976
DATED : February 15, 2011
INVENTOR(S) : Christopher K. Ober et al.

It is certified that error appears in the above-identified patent and that said Letters Patent is hereby corrected as shown below:

On Sheet 1 of 14, Figure 1, line 1, delete "ENRGY" and insert -- ENERGY --, therefor.

On Sheet 9 of 14, Figure 13, line 1, delete "ATTACHEMENT" and insert -- ATTACHMENT --, therefor.

On Sheet 10 of 14, Figure 15, line 1, delete "ANFLES" and insert -- ANGLES --, therefor.

In column 3, line 41, delete "n and n" and insert -- $n^1$ and $n^2$ --, therefor.

In column 5, line 36, delete "m/z" and insert -- $m^2$ --, therefor.

In column 6, line 43, delete "$PS_{8K}$-b-$P(E/B)_{25}K$-b-$PI_{10K}$" and insert -- $PS_{8K}$-b-$P(E/B)_{25K}$-b-$PI_{10K}$ --, therefor.

In column 6, line 50, delete "$PS_{8K}$-b-$P(E/B)_{25}K$-b-$PI_{10K}$" and insert -- $PS_{8K}$-b-$P(E/B)_{25K}$-b-$PI_{10K}$ --, therefor.

In column 7, line 4, delete "is" and insert -- 1s --, therefor.

In column 7, line 58, after "18-20" insert -- . --.

In column 18, line 25, delete "may be" and insert -- maybe --, therefor.

In column 18, line 33, delete "thereof," and insert -- thereof; --, therefor.

In column 19, line 59, delete "(N≡C(CH$_3$)$_2$N" and insert -- (N≡CC(CH$_3$)$_2$N --, therefor.

In column 20, line 35, after "Chains" insert -- : --.

In column 21, line 35, delete "F(CF$_2$)$_{10}$CH$_2$(CH$_2$)$_{10}$OH" and insert -- F(CF$_2$)$_{10}$(CH$_2$)$_{10}$OH --, therefor.

In column 21, line 52, delete "F10h10" and insert -- F10H10 --, therefor.

Signed and Sealed this
Seventeenth Day of May, 2011

David J. Kappos
*Director of the United States Patent and Trademark Office*

CERTIFICATE OF CORRECTION (continued)
U.S. Pat. No. 7,887,926 B2

In column 25, line 62, delete "PEGylatd" and insert -- PEGylated --, therefor.

In column 27, line 15, delete "1280" and insert -- -128° --, therefor.

In column 28, line 39, delete "C 1 s σ*$_{C-F}$" and insert -- C 1s→ σ*$_{C-F}$ --, therefor.

In column 29, line 38, delete "F OH1O" and insert -- F10H10 --, therefor.

In column 30, line 60, delete "hysterisis" and insert -- hysteresis --, therefor.

In column 32, line 39, delete "—(OCH$_2$CH$_{12}$)$_{12}$OCH$_3$" and insert -- —(OCH$_2$CH$_2$)$_{12}$OCH$_3$ --, therefor.

In column 33, line 4, delete "(F10H10O)." and insert -- (F10H10). --, therefor.

In column 33, line 42, delete "PEG 550," and insert -- PEG550, --, therefor.

In column 33, line 43, delete "F 10H10" and insert -- F10H10 --, therefor.

In column 33, line 58, delete "C 1→σ*$_{C-H}$" and insert -- C 1s→σ*$_{C-H}$ --, therefor.

In column 34, line 50, delete "300" and insert -- ~300 --, therefor.

In column 35, line 61, delete "mm 2)" and insert -- mm$^2$) --, therefor.

In column 38, line 17, delete "20° C." and insert -- ~20° C. --, therefor.

In column 40, line 4, delete "P$_{10K}$)." and insert -- PI$_{10K}$). --, therefor.

In column 42, line 59, delete "—(OCH$_2$OCH$_2$)$_{11}$ (CH$_2$)$_3$" and insert -- —(OCH$_2$OCH$_2$)$_{11}$(CH$_2$)$_3$ --, therefor.

In column 46, line 19, in Claim 2, after "a" insert -- number average --.

In column 47, line 4, in Claim 13, after "a" insert -- number --.

In column 47, line 57, in Claim 16, delete "Z*" and insert -- z* --, therefor.